United States Patent
Griffin et al.

(10) Patent No.: US 8,185,169 B2
(45) Date of Patent: May 22, 2012

(54) ROTARILY CONFIGURABLE HANDHELD COMMUNICATION DEVICE

(75) Inventors: Jason T. Griffin, Kitchener (CA); Todd Wood, Guelph (CA); Norman M. Ladouceur, Waterloo (CA)

(73) Assignee: Research In Motion Limited, Waterloo (CA)

( * ) Notice: Subject to any disclaimer, the term of this patent is extended or adjusted under 35 U.S.C. 154(b) by 542 days.

(21) Appl. No.: 12/302,602

(22) PCT Filed: May 31, 2007

(86) PCT No.: PCT/CA2007/000964
§ 371 (c)(1),
(2), (4) Date: Apr. 2, 2009

(87) PCT Pub. No.: WO2007/137428
PCT Pub. Date: Dec. 6, 2007

(65) Prior Publication Data
US 2009/0186663 A1    Jul. 23, 2009

(30) Foreign Application Priority Data

May 31, 2005   (EP) .................................... 06114793
May 31, 2006   (EP) .................................... 06114792
May 31, 2006   (EP) .................................... 06114798
May 31, 2006   (EP) .................................... 06114799

(51) Int. Cl.
*H04B 1/38* (2006.01)
(52) U.S. Cl. .................................... 455/575.3; 345/168
(58) Field of Classification Search ............... 455/575.3; 345/168
See application file for complete search history.

(56) References Cited

U.S. PATENT DOCUMENTS

| 5,646,649 A | 7/1997 | Iwata |
| 6,829,139 B1 | 12/2004 | Duarte |
| 7,050,767 B2 | 5/2006 | Hickey et al. |
| 2004/0018861 A1* | 1/2004 | Shapiro et al. ............. 455/575.1 |
| 2004/0203485 A1* | 10/2004 | Lenchik et al. ............. 455/90.1 |

(Continued)

FOREIGN PATENT DOCUMENTS

DE    102004031409    2/2006

(Continued)

OTHER PUBLICATIONS

Extended European search Report dated Sep. 26, 2007. In corresponding application No. 07252230.3.

(Continued)

*Primary Examiner* — Joseph Chang
(74) *Attorney, Agent, or Firm* — Fitch, Even, Tabin & Flannery, LLP

(57) ABSTRACT

Handheld electronic communication device rotarily transitionable between compact and expanded configurations. The device includes an elongate display panel positioned adjacent and in parallel orientation with an elongate keyboard panel in the compact configuration. The display panel and keyboard panel are coupled together by a rotary connection that interconnects with the keyboard panel in an upper quadrant area of a front face thereof at a distance from a vertical centerline of the keyboard panel. The interconnection enables relative rotation between the panels and maintains the panels parallel to one another through out rotational transition between the compact and expanded configurations. The elongate display panel includes a display screen having a greater length than width and a lengthwise oriented centerline, the lengthwise oriented centerline being horizontally oriented when the device is configured in the expanded configuration.

24 Claims, 33 Drawing Sheets

U.S. PATENT DOCUMENTS

| | | |
|---|---|---|
| 2004/0206876 A1 | 10/2004 | Kato |
| 2005/0078443 A1 | 4/2005 | Lee et al. |
| 2005/0111172 A1 | 5/2005 | Wang |
| 2006/0035678 A1 | 2/2006 | Jaakkola |
| 2006/0066740 A1 | 3/2006 | Cheng et al. |
| 2006/0270455 A1* | 11/2006 | Zuo et al. ............ 455/558 |
| 2006/0281448 A1 | 12/2006 | Plestid et al. |

FOREIGN PATENT DOCUMENTS

| | | |
|---|---|---|
| EP | 0802659 | 10/1997 |
| EP | 1271897 | 1/2003 |
| EP | 1312999 | 5/2003 |
| EP | 1357726 | 10/2003 |
| EP | 1533984 | 5/2005 |
| EP | 1548544 | 6/2005 |
| EP | 1600843 | 11/2005 |
| EP | 1622342 | 2/2006 |
| EP | 1699209 | 9/2006 |
| EP | 1764672 | 3/2007 |
| JP | 20030338866 | 11/2003 |
| WO | 0184728 | 11/2001 |
| WO | 03050665 A1 | 6/2003 |
| WO | 2004054210 | 6/2004 |
| WO | 2005064435 | 7/2005 |
| WO | 2005104504 | 11/2005 |
| WO | 2005119407 | 12/2005 |
| WO | 2006034949 A1 | 4/2006 |
| WO | 2006060259 | 6/2006 |

OTHER PUBLICATIONS

Extended European Search Report dated Aug. 28, 2009. In corresponding application No. 08157500.3.

Preliminary Report on Patentability dated Dec. 18, 2008. In corresponding application No. PCT/CA2007/000964.

* cited by examiner

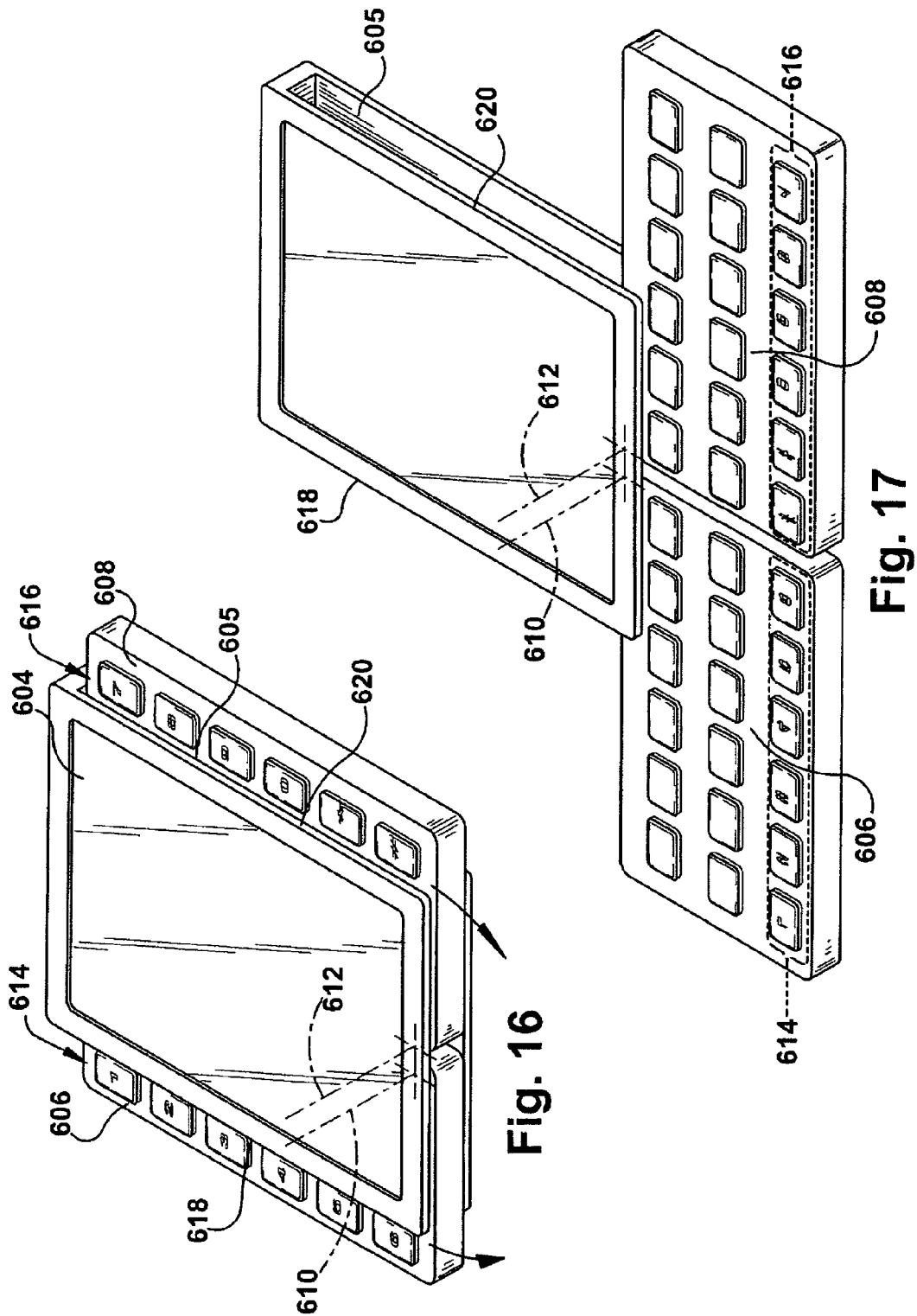

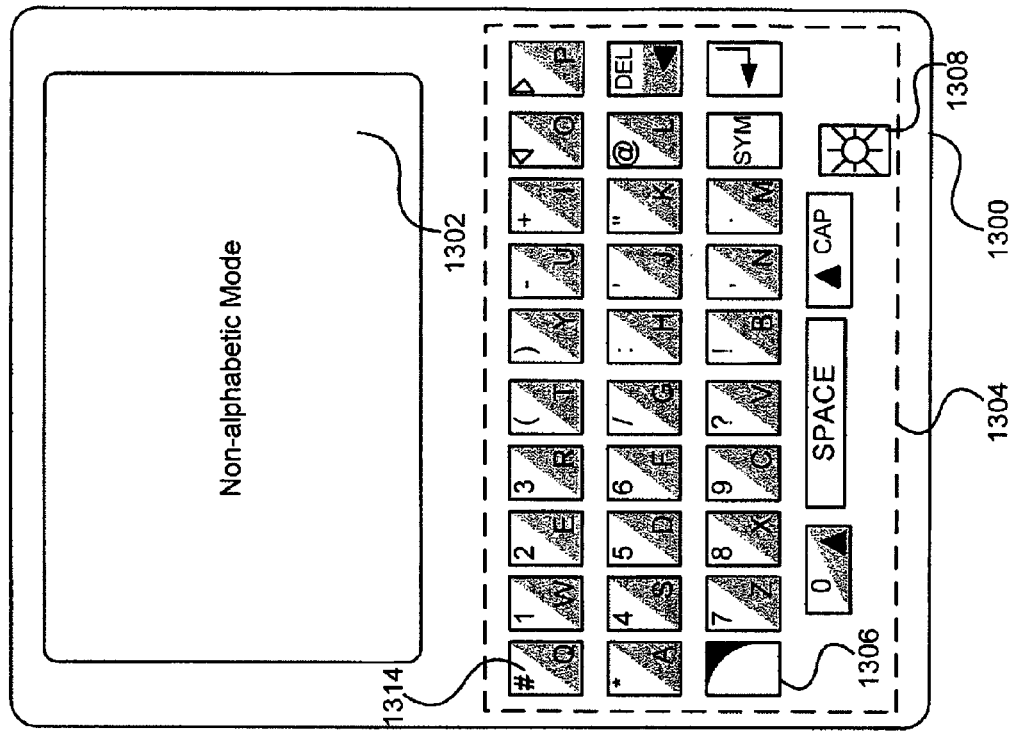
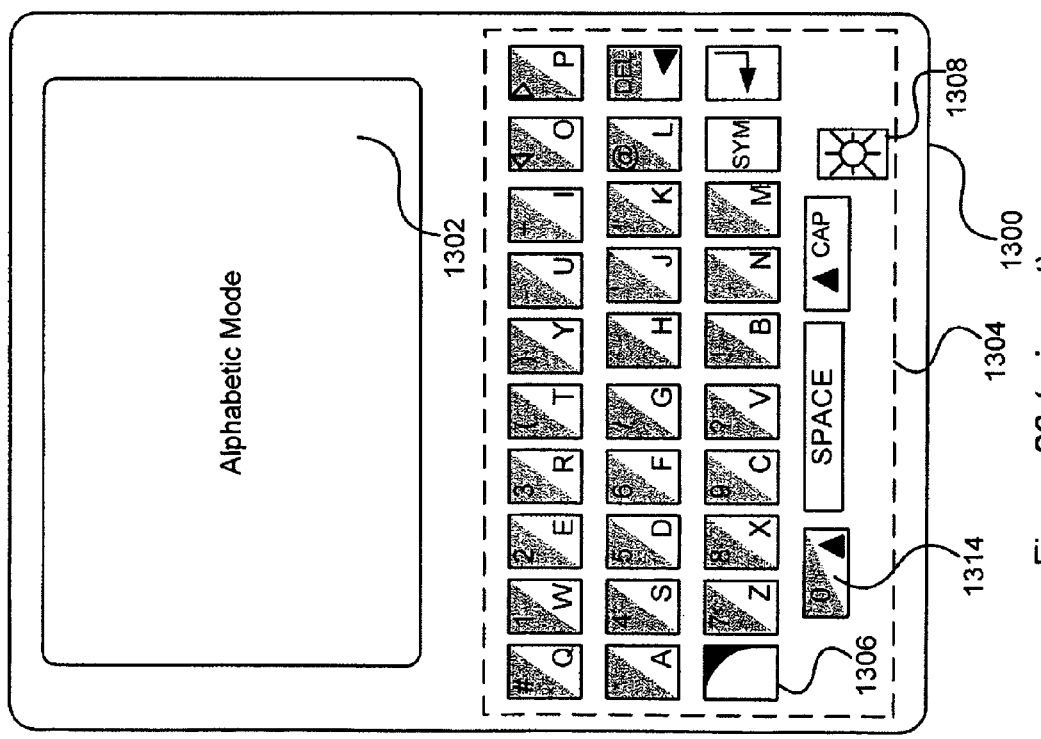
Figure 23 (prior art)
Figure 24 (prior art)

ROTARILY CONFIGURABLE HANDHELD COMMUNICATION DEVICE

The technology described in this patent document relates generally to the field of handheld communication devices. More particularly, the patent document describes rotating keypads and displays for such devices.

In a first aspect, the present application discloses a handheld electronic communication device that is rotarily transitionable between compact and expanded configurations. The device includes or comprises an elongate display panel that is positioned adjacent to and in substantial parallel orientation with an elongate keyboard panel when the device is configured in the compact configuration. The display and keyboard panels are coupled together by a rotary connection. The rotary connection interconnects with the keyboard panel in an upper quadrant area of a front face of the keyboard panel at a distance from a vertical centerline of the front face of that panel in the compact configuration. Further, the rotary connection is configured to enable relative rotation between the display and keyboard panels and to maintain the panels in parallel orientation to one another through out relative rotation that occurs during transition between the compact and expanded configurations. The elongate display panel includes a display screen having a greater length than width and a lengthwise oriented centerline that is horizontally oriented in the expanded configuration.

In a related aspect, the present application describes another handheld electronic communication device that is transitionable between compact and expanded configurations. In this embodiment, the device also includes an elongate display panel positioned adjacent to and in substantial parallel orientation with an elongate keyboard panel when the device is configured in the compact configuration. The display panel and keyboard panel, however, in this embodiment are coupled together by a rotation and translation accommodating interconnection, but which is also configured to maintain the panels in parallel orientation to one another through out transition between the compact and expanded configurations. Here, the device has an elongate front-facing profile in the compact configuration and a generally top-crossed T-shaped front-facing profile in the expanded configuration. Further, the elongate display panel comprises a display screen having a greater length than width and a lengthwise oriented centerline that is horizontally oriented when the device is configured in the expanded configuration whereby the elongate display panel forms a top-cross portion of the T-shaped front-facing profile in the expanded configuration.

Different standard keyboard arrangements are known. The most widely used English-language alphabetic key arrangement is the QWERTY arrangement. Other types of standard English-language alphabetic key arrangements include the QWERTZ arrangement, the AZERTY arrangement, and the DVORAK arrangement. Each of these arrangements, when presented as a full-size keyboard, utilizes 26 keys for 26 different characters.

Numeric characters are often presented along with alphabetic characters on keyboards of communication devices, such as telephones. One standard setting body, the International Telecommunications Union ("ITU"), has established phone standards for the arrangement of alphanumeric keys. One such standard, corresponds to ITU Standard E.161, entitled "Arrangement of Digits, Letters, and Symbols on Telephones and Other Devices That Can Be Used for Gaining Access to a Telephone Network" (also known as ANSI TI.703-1995/1999 and ISO/IEC 9995-8:1994). According to this standard, ten keys are used to present the alphabetic characters A-Z and the numbers 0-9. In order to enter alphabetic characters, the operator may be required to tap the keys multiple times until the desired character appears on a display screen, among other known entry techniques.

Mobile communication devices that include a combined alphabet entry keyboard and a telephony keyboard are known. Examples of such mobile communication devices include mobile stations, cellular telephones, wireless personal digital assistants (PDAs), two-way paging devices, and others. Combining a traditional-style text-entry keyboard (e.g., a QWERTY-style keyboard) with a traditional-style telephony keyboard on the same mobile communication device typically involves undesirable ergonomic and/or non-intuitive user interface compromises. Furthermore, a certain keypad configuration that is desirable for one application will not always be desirable for a second or third application. The size of the keyboard is often limited by the size of the device, making the keyboard more difficult to use. It is thus desirable to have fewer but larger keys to perform alphanumeric and telephony functions.

A mobile device may comprise a display portion and a keypad portion. The display portion has a front side that includes a display screen and a back side. The keypad portion is rotatably coupled to the display portion between a plurality of operational configurations. The keypad portion has a front side that includes a plurality of input devices and an outer edge, with the front side of the keypad portion having a depressed area surrounding and including an area where the keypad portion and display portion are rotatably coupled. At least one of the plurality of input devices is situated in the depressed area. The front side of the keypad portion and the front side of the display portion face in the same direction while rotating between the plurality of operational configurations. The plurality of operational configurations includes at least a first configuration and a second configuration.

The device may also include a rotatable coupling associated with both the display portion and the keypad portion. The rotatable coupling may have a single pivot point.

The depressed area may be in close proximity to the back side of the display portion so that the depressed portion operates as a support backing for the display portion. The display portion may be rotatably coupled to the keypad portion in the vicinity of the outer edge of the front side of the keypad portion. The rotatable coupling may be located off the center of the keypad portion in at least one direction.

In a first configuration, a first set of input devices may be exposed for operation by an operator. In a second configuration, a second set of input devices may be exposed for operation by an operator. In the first configuration, one or more of the second set of input devices may be positioned behind the display portion and is inoperable. In the second configuration, one or more of the first set of input devices may be positioned behind the display portion and is inoperable. In the first configuration, a part of the keypad portion may prevent further rotation of the display portion with respect to the keypad portion in one direction. In a second configuration, a part of the keypad portion may prevent further rotation with respect to the display portion in the opposite direction.

The display screen may be rectangular, having a long side and a short side. In the first configuration, the long side of the display screen may be vertical with respect to the keypad portion. In the second configuration, the short side of the display screen may be vertical with respect to the keypad portion. The display portion may further comprise at least one input device positioned thereon.

Another example mobile device comprises a display portion and a keypad portion. The display portion has a front side that includes a display screen. The keypad portion is rotatably coupled to the display portion and has a front side that includes at least one input device. A first recess is defined in the keypad portion for receiving a part of the display portion, the recess has a bottom and at least one side. The keypad portion and display portion are rotatable with respect to each other between at least a first operational configuration and a second operational configuration. The front side of the keypad portion and the front side of the display portion face in the same direction while rotating between the operational configurations.

In the first configuration a first part of the display portion is received into the first recess. The device may further comprise a second recess having at least one side and a bottom. In the second configuration, a second part of the display portion may be received in the second recess. The first recess may be at least partly disposed on a first side of the keypad portion and the second recess may be disposed on an adjacent side of the keypad portion.

The display screen may be rectangular, having a long side and a short side. In a first configuration, the display screen long side may be vertical. In a second configuration, the display portion is rotated relative to the first configuration so that the display screen short side is vertical. The display portion may further comprise at least one input device.

Another example mobile device comprises a display portion and a keypad portion. The display portion has a front side that includes a display screen. The keypad portion has a front side that includes at least one input device. The keypad portion is rotatably coupled to the display portion so that the keypad portion and display portion can be rotated with respect to each other between at least a first configuration and a second configuration. In the first configuration, the display portion is at least partially superimposed over the keypad portion, and a first set of input devices is exposed for operation by an operator. The first set of input devices includes a three-by-four telephone keypad. In the second configuration, the keypad portion is rotated approximately 180 degrees relative to the first configuration in a plane that is parallel to a plane of the display portion so that the front side of the keypad portion and the front side of the display portion face the same direction while rotating. A second set of input devices is exposed for operation by an operator. The second set of input devices includes a keyboard having at least fifteen keys.

The device may further comprise a multiple-function set of input devices. The multiple-function set of input devices is a subset of the input devices positioned on the keypad portion. The multiple-function set of input devices is part of both the first and second sets so that they are operable in both the first and second configurations.

The display portion may further comprise at least one input device. The keypad portion may include a recess defined in the front side thereof for receiving the display portion in both the first and second configurations. The device may further comprise a roller wheel input device positioned on the keypad portion. The roller wheel input device is operable in both the first and second configurations. The device may further comprise means for selectively lighting at least some of the input devices.

In a further example, a mobile device comprises a display portion having a front side that includes a display screen and a keypad portion. The keypad portion has a front side that includes at least one input device, with the front side of the keypad portion having a first level and a second level. The keypad portion and display portion are rotatably coupled to one another at a back side of the display portion and the front side of the second level of the keypad portion. The front side of the keypad portion and the front side of the display portion face in the same direction while rotating between a plurality of operational configurations. The plurality of operational configurations include at least a first operational configuration and a second operational configuration.

In the first operational configuration, a first set of input devices may comprise a plurality of keys exposed for operation by an operator. The first set of input devices may include a three-by-four telephone keypad. In the second configuration, a second set of input devices may be exposed for operation by an operator. The second set of input devices may include a keyboard with at least 24 keys for text-entry.

The keypad portion and display portion may be rotatably coupled to one another at a coupling and the coupling may have a rotational axis that runs from the front side of the display portion to the back of the keypad portion. The device may further comprise programming stored within the device for displaying visual output on the display screen. When the device is rotated from one configuration to another, the orientation and size of the visual output on the display screen may automatically change to be upright with respect to the keypad portion in each configuration.

A processor may be housed within either the keypad portion or the display portion and is operable to run a plurality of software applications. The plurality of software applications may include at least a first software application corresponding to the first configuration, and a second software application corresponding to the second configuration. The processor may be operable to automatically select and run either the first or second software application depending upon whether the device is positioned in the first or second operational configuration.

In the first configuration, a first set of input devices may be exposed for operation by an operator. In the second configuration, a second set of input devices may be exposed for operation by an operator. The device may further comprise a multiple-function set of input devices comprising input devices on the keypad portion. The input devices of the multiple-function set may be part of both the first and second sets so that they are operable in both the first and second configurations. The display portion may further comprise at least one input device.

In another example, a mobile device comprises a display portion and a keypad portion. The display portion includes a display screen. The keypad portion includes at least one input device. The keypad portion is rotatably coupled to the display portion so that the keypad portion and display portion are rotatable with respect to each other between multiple operational configurations that include at least a first configuration and a second configuration. The keypad portion has a first recess for receiving a first part of the display portion in the first configuration. The display portion and keypad portion face in the same direction while rotating between the multiple operational configurations.

When the device is positioned in the first operational configuration, rotation of the keypad portion relative to the display portion may be blocked in one of either a clockwise or counterclockwise direction. When the device is positioned in the second operational configuration, rotation of the keypad portion relative to the display portion may be blocked in the opposite direction.

The display portion may be rotatably coupled to the keypad portion via a coupling. The coupling may be positioned off the center of the keypad portion.

In the first configuration, a first set of input devices in the form of keys may be operable by an operator and includes a three-by-four telephone arrangement of keys. In a second configuration, a second set of input devices in the form of keys may be operable by an operator, the second set of input devices including at least fifteen keys for text-entry. Rotation into and out of each of the operational configurations may be inhibited.

The device may further include a processor that is housed within either the keypad portion or the display portion and is operable to run a plurality of software applications. The plurality of software applications may include at least a first software application corresponding to the first configuration, and a second software application corresponding to the second configuration. The processor may be operable to automatically select and run either the first or second software application depending upon the operational configuration of the device.

The first recess may be configured to provide a close fit for receiving the first part of the display portion therein to enhance the rigidity and stability of the device. A second recess may be provided on the keypad portion for receiving a second part of the display portion. The second recess may be configured to provide a close fit to receive the second part of the display portion to enhance the rigidity and stability of the device.

The first part of the display portion may include part of the display screen. In the first configuration, part of the display screen may be concealed by the first recess.

The device may further comprise programming stored within the device for displaying visual output on the display screen. When the device is rotated from one configuration to another, the orientation and size of the visual output on the display screen may automatically changed to be upright with respect to the keypad portion in each configuration.

BRIEF DESCRIPTION OF THE DRAWINGS

FIG. 16 shows a perspective view of the seventh example mobile device in a first configuration;
FIG. 17 shows a frontal view of the seventh example device in a second configuration;
FIG. 23 is an illustration of an example mobile device in an alphabetic mode with partial key illumination;
FIG. 24 is an illustration of the example mobile device of FIG. 23 in a non-alphabetic mode.

DESCRIPTION OF PREFERRED EMBODIMENTS

Figure 1:
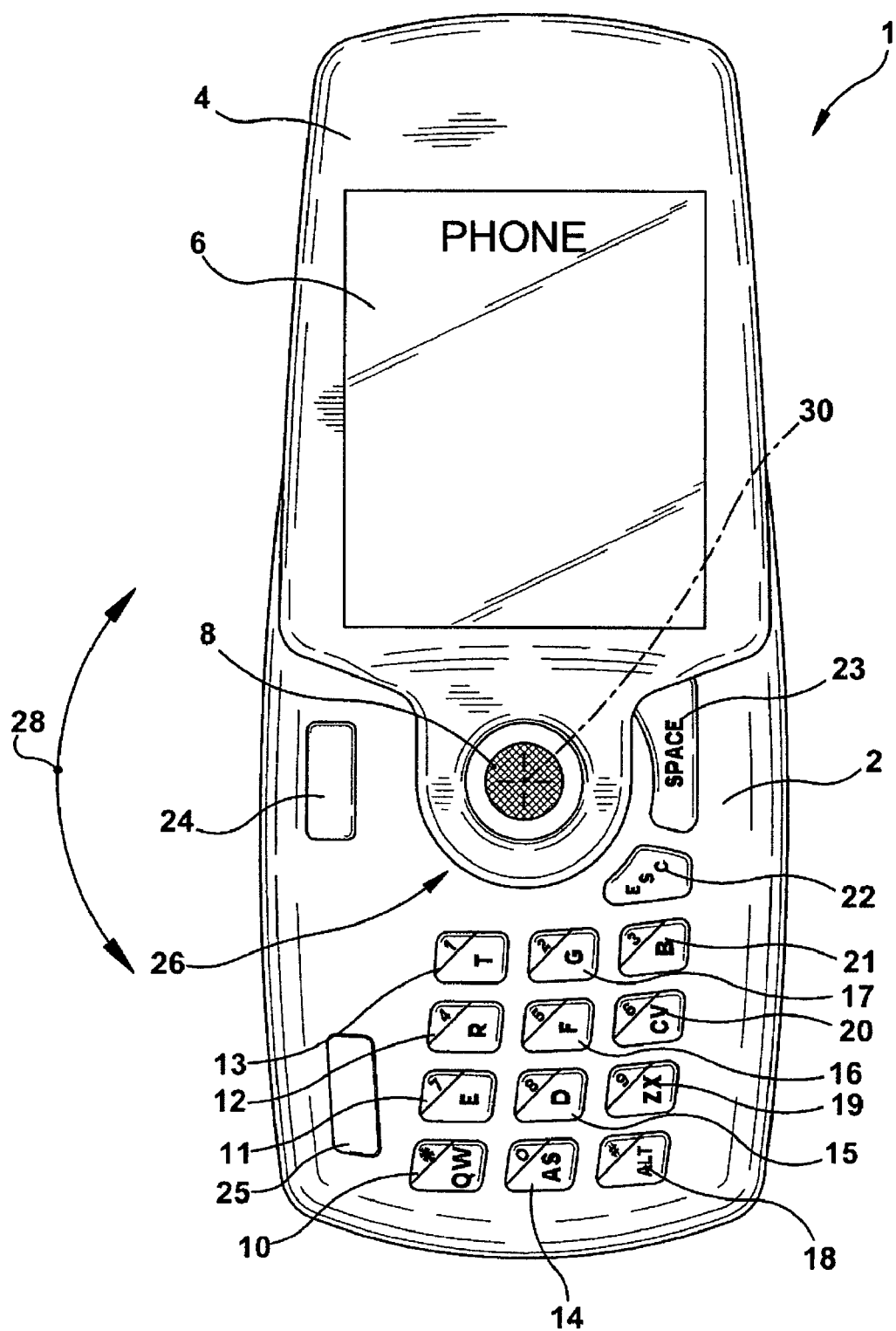
FIG. 1 shows a frontal view of a first example mobile device in a first configuration.

Examples of mobile devices that are rotatably coupled and that are useable in two or more configurations are described and claimed below. A configuration is a set location for two or more movable parts of the example device in relation to each other. The example devices below have several ergonomic or other interface enhancing advantages. The examples described below can be equipped to automatically switch the application that is running on the device when the operator manipulates the device into each configuration. Furthermore, each configuration may be tailored to be optimal for the associated application. A group of applications may also be tied to a certain configuration, rather than just a single application. For example, a first configuration could be optimized for a cellular telephone mode and FAX mode, and a second configuration could be optimized for web-browsing, e-mailing, and word processing. This enhances the user interface by making applications quickly and easily accessible and provides for better ergonomics and more intuitive use of the mobile device.

Some examples reuse one or more keys for different applications in different configurations. This results in a decrease in the size of the device since keys are multi-functional. Some examples have a display that automatically changes display qualities such as orientation and size when the operator manipulates the device into each configuration. In these examples, the display configuration, such as wide view or narrow view, can be better matched with the application. Some examples partially conceal and protect the display screen in one configuration while revealing a part of the screen that was previously covered. When the screen is exposed, greater amounts of data can be viewed. Concealing the screen helps to protect the unused portion of the screen from being damaged. Some examples are configured to provide enhanced stability and durability. Furthermore, some examples have two keypad portions that are rotatably connected to a display portion providing further opportunities for matching configurations to specific applications.

One aspect of the examples disclosed herein is that the keypad portion and display portion are rotatably coupled, so that the front side of the keypad portion and the front side of the display portion face toward the same direction while rotating. This rotation is about an axis that runs from the front of the device to the back of the device. This is opposed to some conventional mobile devices that "flip" open by rotating about an axis that runs from one side to another side of a device. The fact that the display portion and keypad portion face the same direction while rotating to two or more configurations allows the operator to view the display while rotating and allows the display to be in multiple orientations and locations relative to the keypad and still be usable with the keypad in each of these configurations. It allows the operator to turn the device on its side or upside down and have a screen that changes to an upright orientation.

Another aspect of the examples disclosed herein is a system of keyboard labeling that displays two or more characters on a single key with a first character in a first orientation that corresponds to a first configuration, and a second character that is rotated at an approximately 90 or 180 degree angle compared to the first character. In one example, a set of characters can be selectively lit up according to which configuration the device is in. Both of these aspects allow the operator to readily distinguish which function the key will have in each configuration.

Some of the teachings of this disclosure may also be applied to devices that "flip" open and closed on a side-to-side axis. Furthermore, each of the example devices may also include a hinge that allows the device to not only rotate but also to "flip" open and closed on a side-to-side axis.

I. TYPE A

Referring now to FIG. 1, an example mobile device 1 is shown in a first of three designated configurations. The example device 1 has two main sections: a keypad portion 2 and a display portion 4. The display portion 4 is coupled to and partially superimposed over the keypad portion 2. The display portion 4 includes a display screen 6 and an input device 8. The input device 8, in this example, is a trackball. In other examples, it could also be a pointing stick, a key, a rollerball, a joystick, a wheel, or other known input devices. The input device could also be positioned at a different location, such as the side of the device. The keypad portion 2 in this first configuration has a set of keys 10-25 that are exposed and available for operating. The trackball 8 and the set of keys 10-25 form a first set of input devices 8-25 that are exposed and available for operating in the first configuration. Other keys, thumbwheels, sliding switches, or other types of input devices could alternatively be included on the keypad portion 2 or display portion 4. Notably, there are other keys that are hidden underneath the display portion 4 in this configuration.

The keypad portion 2 and the display portion 4 are joined together by a rotatable coupling 26. The coupling 26 is not visible in FIG. 1, but is located underneath the input device 8, and at the center of the keypad portion 2. The coupling 26 allows the display portion 4 to be rotated with respect to the keypad portion 2. The rotational motion is indicated by the arrow 28, and the axis of rotation 30 runs through the device from the front, where the keys are exposed, to the back that faces opposite the front of the device. The display portion 4 and the keypad portion 2 face in the same direction while rotating.

Figure 2:
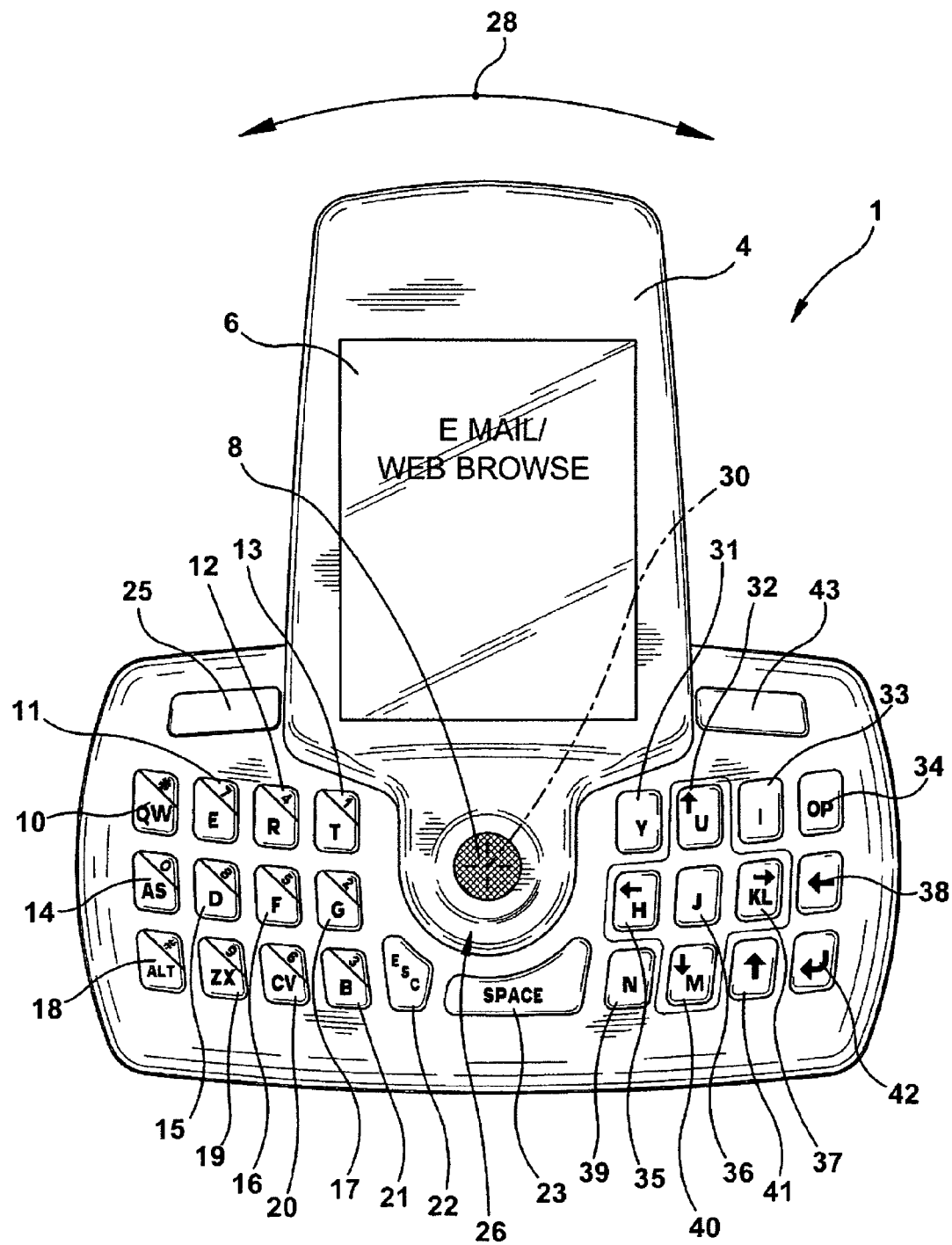
FIG. 2 shows a frontal view of the first example mobile device in a second configuration.

The display portion 4 is configured to rotate approximately 90 degrees from the first configuration shown in FIG. 1, to the second configuration, shown in FIG. 2. The display portion could also be rotated approximately 270 degrees from the first configuration in the opposite direction to reach the second configuration. The display portion 4 can also rotate approximately 180 degrees from the first configuration to the third configuration shown in FIG. 3. A detent or other type of mechanism for inhibiting but not preventing movement may be used to restrict movement once the example device is positioned in the first, second, or third configurations.

Alternatively, clockwise rotation from the first configuration according to the arrow 28 may be blocked. Counterclockwise rotation from the third configuration according to the arrow 28, may also be blocked. This would limit the rotation to approximately 180 degrees in the either direction from the first configuration to the third configuration. This alternative could be useful for having a stronger stopping point at the first and third configurations than a detent-type mechanism would provide. Limiting rotation also prevents excessive twisting and wear on the coupling 26 and internal electronic linkage.

Referring now to FIG. 2, the example mobile device 1 is shown in the second configuration. The keypad portion 2 has a group of keys 10-23, 25, 31-43 that are exposed and available for operating. This group of keys 10-23, 25, 31-43 and the trackball 8 form a second set of input devices 8-23, 25, 31-43. Notably, one input device 24 that was available in the first configuration is concealed under the display portion 4 and is not available for operating, and the keys 31-43 that were hidden under the display portion 4 in the first configuration are now uncovered. Other keys, thumbwheels, sliding switches, or other types of input devices could alternatively be included on the keypad portion 2 or display portion 4. Many of the input devices 8-23, 25 that were part of the first set 8-25 are also part of the second set 8-23, 25, 31-43.

Figure 3:
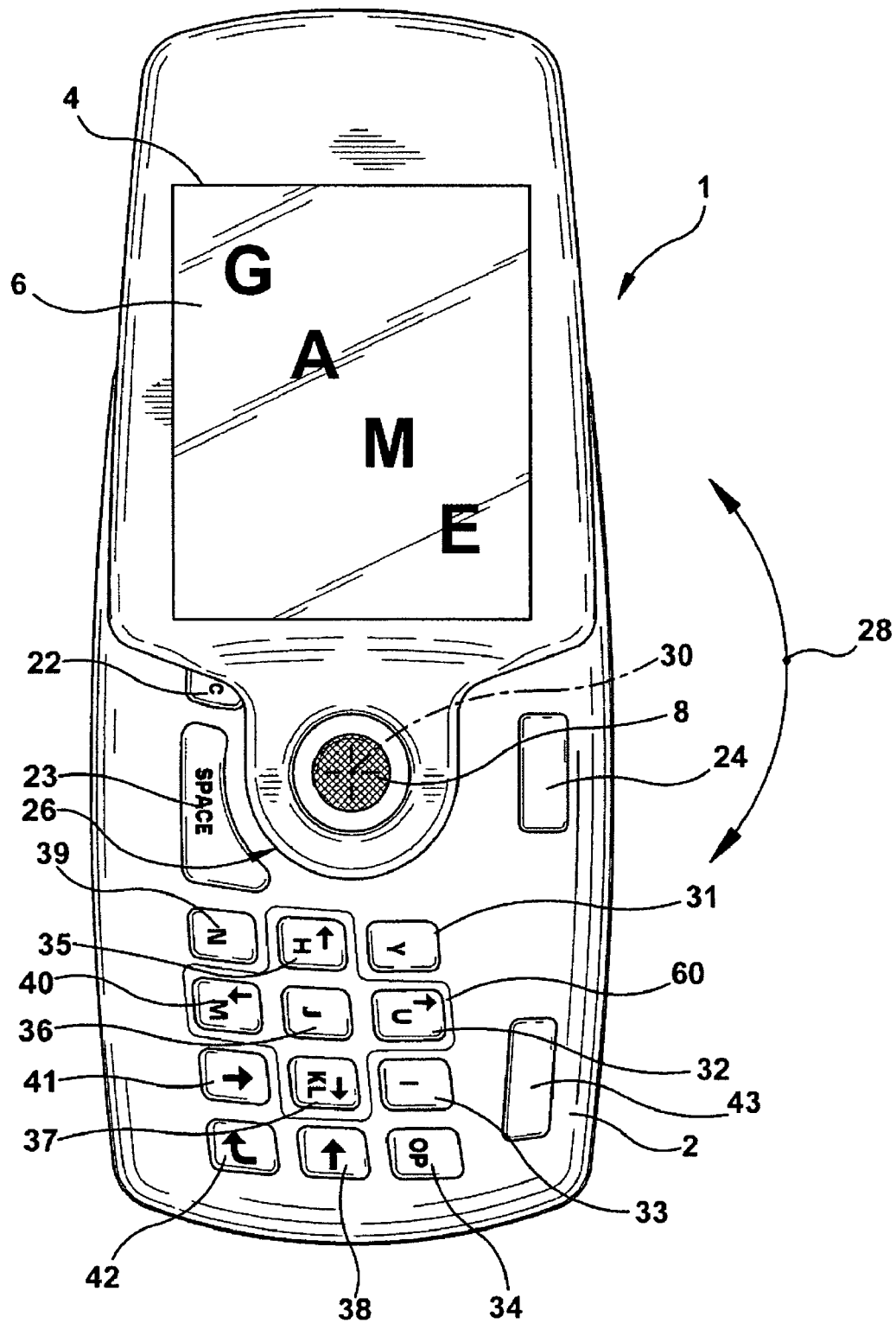
FIG. 3 shows a frontal view of the first example mobile device in a third configuration.

In FIG. 3, the example mobile device 1 is shown in the third configuration. The keypad portion 2 has another group of keys 22-24, 31-43 that are exposed and available for operating. This group of keys 22-24, 31-43 and the trackball 8 form a third set of input devices 8, 22-24, 31-43. The remaining keys are hidden by the display portion. Other keys, thumbwheels, sliding switches, or other types of input devices could alternatively be included on the keypad portion 2 or display portion 4. All the input devices in the third set 8, 22-24, 31-43 except one 24 were part of the second set 8-23, 25, 31-43. Key 24 was covered in the second configuration. Two of the input devices 22-23 that were part of the first set 8-25 and second set 8-23, 25, 31-43 are also part of the third set 8, 22-24, 31-43.

The trackball 8 on the display portion 4 is available for operation in all three configurations. Because of the central location and the fact it is available in all applications, a pointing device such as the trackball 8 is an ergonomically advantageous input device at this location.

The first configuration of the example device 1, shown in FIG. 1, is optimized for a cellular phone application. Twelve keys 10-21 of the first set of input devices 8-25 are set up in a traditional three by four configuration. This is a familiar layout that is intuitive to operators and is ergonomically favorable.

In the first example device 1 both the telephony characters, "0-9, #,*" used primarily in the first configuration, and the text-entry characters, used primarily in the second configuration, are printed at an approximately 45 degree angle relative to the long axis of the keypad portion 2. In the second configuration, the example device 1 is preferably held at a 90 degree clockwise rotation from the first configuration. In this configuration, both the text and numerical indicia are at an approximately negative 45 degree angle from being upright with respect to the orientation of the display screen 6. This key indicia scheme allows both text and numeral indicia to be easily visible and associated with the correct keys in both configurations. The telephone character indicia on the keys 10-21 that correspond to the first configuration may be color coded so that they are all the same color, and different from the color of indicia that corresponds to other configurations.

The remaining keys 22-25 of the first set of input devices 8-25, can be set up for other typical cellular phone functions. Functions such as autodial, redial, initiate call, and end call, for example, may be assigned to the remaining keys 22-25. One or more of the remaining keys may also be used for selecting and navigating through menu systems of the cellular phone application. The input device 8 on the display portion 4 may also be used for this purpose, on its own, or in conjunction with one of the remaining keys 22-25.

When in the first configuration, the example mobile device 1 is programmed to automatically run a cellular telephone application. The automatic switching capability of the application when the device 1 is placed in this configuration is further explained below.

The second configuration of the example device 1, shown in FIG. 2, is optimized for a text-entry application or group of applications. Examples of such applications include e-mail, internet browsing, instant messaging, text messaging, word processing, or any application where alphabetic characters are to be regularly input. Many of the keys 10-23, 31-42 of the second set of input devices 8-23, 25, 31-43 are set up in a text-entry keyboard configuration. The key layout in this example is a twenty-four key predictive text keyboard that is fully described in "Keyboard Arrangement," U.S. patent application Ser. No. 10/785,790, which is owned by the assignee of the present application, and which is incorporated herein by reference. Other key layouts, QWERTY, AZERTY, Dvorak, Alphabetic, and/or Function layouts are also possible.

The remaining keys 25, 43 of the second set of input devices 8-23, 25, 31-43 can be set up for other functions that are commonly used with text-entry applications. For example, one or more of the remaining keys 25, 43 could be operator customizable to run certain shortcut commands. As another example, one of the remaining keys 25, 43 may be used to alter the function of the four keys 32, 35, 37, 40 that have a cross-shaped, four-directional design imprinted around them, or of other keys or groups of keys. The altered function of the keys in the cross-shaped box would allow cursor control in four directions. The input device 8 on the display portion 4 may also be used for cursor control.

The text-entry keyboard keys 10-23, 31-42 in the second set of input devices 8-23, 25, 31-43 have text-entry character indicia that is printed on each key. The indicia is at about a negative 45 degree angle in the second configuration with respect to the orientation of the display screen 6 in the second configuration. Because the text-entry keyboard keys 10-23, 31-42 are reused in other configurations for different applications, different character indicia may also be printed on the keys in a different or the same orientation. In this example telephony character indicia are printed on keys 10-21. The orientation allows the telephony character indicia to also be visible at about a negative 45 degree angle. This has the advantage of showing in a partially upright orientation an alternate key function (entry of a telephony character) that may be reached, for example, by holding down another key, or using a shift key. To help the operator differentiate what key function is primary in the second configuration as opposed to the first configuration the indicia on the text-entry keyboard keys 10-23, 31-42 may be color coded so that the groups of keys are all the same color, and different from the color of indicia that corresponds to other configurations. The remaining keys 25, 43 do not have indicia printed on them in this example, but in other examples, they could also have indicia that is oriented or colored to correspond to the function of the keys at a particular configuration.

When the example device 1 is in the second configuration, it may automatically run a menu application that allows an operator to select a text-entry application. In other examples, the mobile device may automatically run a text-entry application directly, such as an e-mail application. The automatic switching of the application when the device 1 is moved to the second configuration is further explained below.

The third configuration of the example device 1, shown in FIG. 3, is optimized for a video game application. In this configuration a third set of input devices 8, 23, 24, 31-43 is exposed and available for operation. Keys labeled 10-21 and 25 that were exposed in the second configuration are now covered under the display portion 4. Five keys 32, 35-37, 40 are surrounded by a cross-shaped four-directional design imprinted on the face of the keyboard around the keys. Four of these keys 32, 35, 37, 40 function as a directional controller for the video game application. To input diagonal directional commands a combination of two keys could be pressed. For example, a diagonal direction would be input when both keys labeled 32 and 37 are depressed. The middle key 36 may be designated to have no function, because it is likely to be inadvertently pressed when the controller keys 32, 35, 37, 40 surrounding it are pressed.

The remaining keys 22-24, 31, 33-34, 36, 38-39, 41-43 of the third set of input devices are also available for inputting commands to the video game application. In particular, the larger keys on the outer periphery of the example device 24, 43, 23 are ergonomically desirable for the video game application. Some operators may find a configuration with the controller keys on the left, and the extra input keys on the right to be more favorable. To this end, the video game application could be operator customizable to allow the operator to select which keys they desire to use as extra input keys.

In another example, instead of using four keys 32, 35, 37, 40 for the directional control, eight keys 31-33, 35, 37, 39-41 could be used. This would add the benefit of having designated keys for diagonal directions. Any type of outlining around the keys or highlighting of the keys could be used to more clearly depict the group of keys, including the use of color, font, or other indicia.

Arrow characters are visible on the controller keys 32, 35, 37, 40 to designate the respective directional input. The indicia "start" and "pause" are also visible on keys labeled 34 and 42. In this embodiment, lighting of indicia on the keys is utilized to draw attention to the indicia. The indicia may be lit up when the device is in the third configuration, and unlit in the first and second configurations. This enables the operator to readily determine that certain keys are associated with the lit-up functions in the third configuration. The details of a method for selectively lighting up certain indicia on keys is described later in the specification. In addition, selective keys may be lit in each configuration. It is not required that all useable keys be lit. For example, in text entry mode, the space and return keys could be lit because they are frequently used. In addition, parts of one or more key may be lit while the remaining part of the key is not lit. This is useful where the keys have different functions in each configuration of the device. In one configuration, the top half of the key, for example, is lit, and in another configuration, the bottom half of the key is lit.

In other examples, color coding is used to inform the operator that the arrows and start and pause indicia correspond with the third configuration. In the example device 1, the arrow characters and start and pause indicia all have the same color, and this color is different from the other character indicia printed on the keys 32, 35, 37, 40. Furthermore, in some examples, the exposed part of the keypad portion 2 while in the third configuration can be colored to correspond with the color of the indicia on the keys used in the third configuration. This color coding can also be used for the First Configuration. For example, the keypad portion 2 could be one color on one half, and another color on the other half. The respective colors would correspond to the color of the indicia printed on the keys that are exposed in the first and third configurations.

In another example a fourth configuration is also possible. The fourth configuration would be reached by rotating the display portion 4 90 degrees counterclockwise from the third configuration. Some other application could be preset to automatically run in this configuration, or this configuration could be operator customizable to automatically run whatever application the operator selects.

In operation, an application signal is generated when the example device 1 is in the first, second, or third configuration. This signal notifies the processor to change the software application to the one that corresponds to the configuration the example device is currently positioned in.

A display signal is also generated dependent upon whether the example device 1 is positioned in the first, second, or third configuration. This signal functions to notify the processor to change the size and orientation of the display according to the configuration of the example device 1.

A key lighting signal may also be generated dependent upon the configuration of the device. This signal functions to notify the processor to light or unlight selective keys, such as the arrows and "start" and "pause" indicia on the keys 32, 34, 35, 37, 40, and 42 when the device is in the third configuration. Other keys may be lit in other configurations. The lighting and unlighting may also be accomplished more directly by a switch that opens and closes a circuit supplying power to the key lights.

Both the display signal and the application signal may be generated, for example, by a tilt switch that is activated when the example device 1 is rotated to the first, second, or third configuration. In other examples the switch may be activated while in the midst of rotating between configurations. Other types of switches may also be used to generate the signal.

By automatically switching modes when the configuration is changed, this saves the operator the time of having to press a key, a series of keys, or navigate a menu system to change to the desired application. It also ensures that the example device 1 is in the mode that the configuration has been optimized for. The example device 1 may also include an operator override feature, so that the operator can choose to operate some or all applications in configurations that are not optimized for the configuration. For example, the operator may want to use the second configuration to dial a telephone number that is represented by letters.

Another important feature of the example mobile device 1 is that it reuses some input devices in more than one configuration for different functions and covers some input devices in each configuration. This allows for many keys and for optimizing the keypad design for multiple applications while minimizing the size and weight of the mobile device.

II. TYPE B

Figure 4:
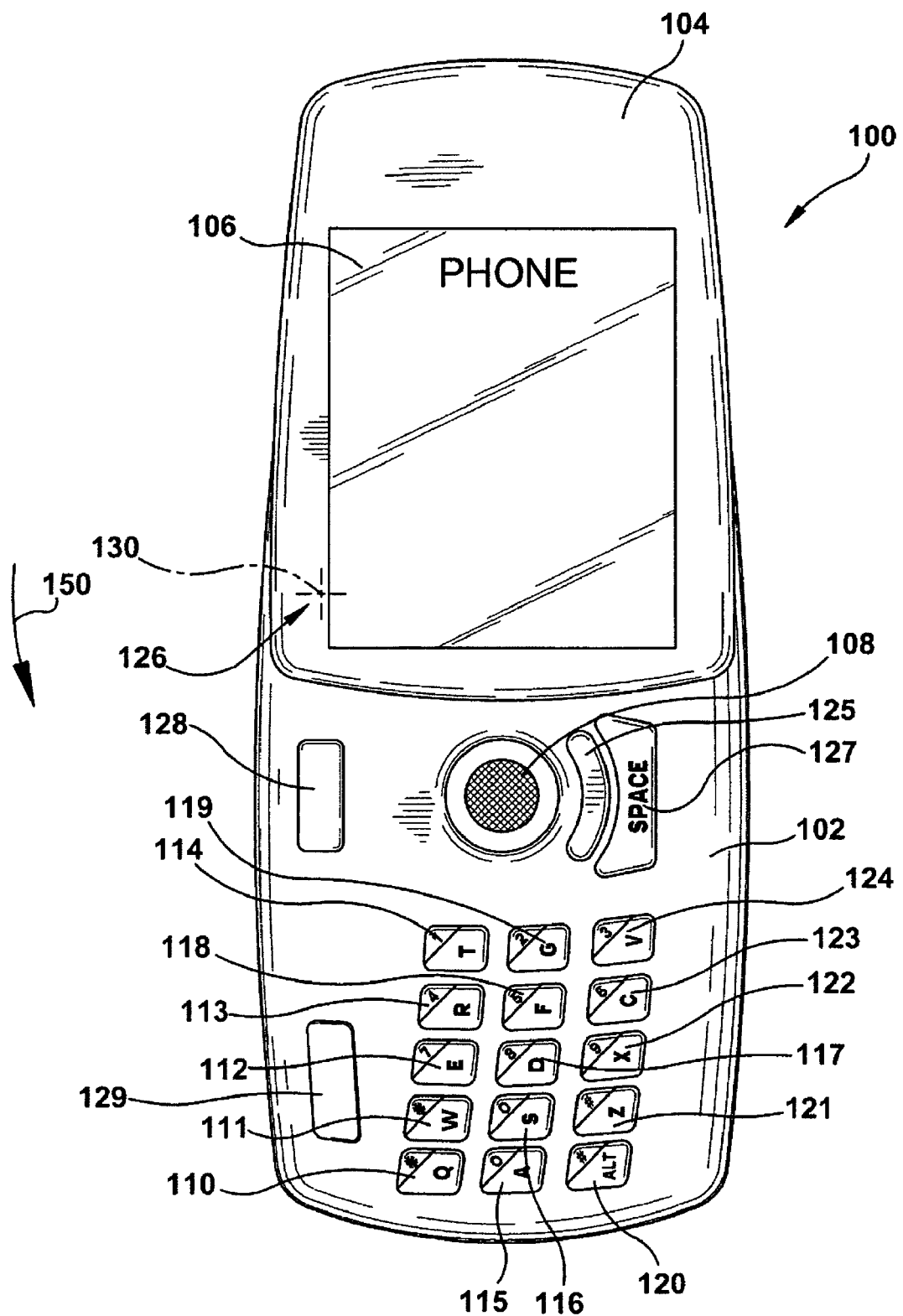
FIG. 4 shows a frontal view of a second example mobile device in a first configuration.

Referring now to FIG. 4, a second example mobile device 100 is depicted in the first of two configurations. The second example device 100 has a keypad portion or keyboard panel 102 and a display portion or an elongate display panel 104. The display panel 104 is coupled to and partially superimposed over the keyboard panel 102. The display panel 104 includes a display screen 106. The keyboard panel 102 in this first configuration has a first set of input devices 108-125, 127-129 that are exposed and available for operating. The input device in the center 108 in this example is a trackball. In other examples, it could be a pointing stick, a key, a rollerball, a joystick, a wheel, or other known input devices. The input device could be positioned at other locations, such as on the side of the keypad or display panel, among other locations. The remaining input devices in the first set 110-125, 127-129 are all keys in this example. Other keys, thumbwheels, sliding switches, or other types of input devices could alternatively be included on the keyboard panel 102 or display panel 104. Notably, several keys are concealed underneath the display panel 104 in this first configuration.

The keyboard panel 102 and the display panel 104 are joined together by a rotatable coupling or rotary connection 126 that is positioned near the center, side edge of the keyboard panel. The rotary connection 126 is not visible in FIG. 4, but is located underneath the display panel 104 and off-center. The rotary connection 126 allows the display panel 104 to be rotated with respect to the keyboard panel 102. The rotational motion is indicated by the arrow 150, and the axis of rotation 130 runs from the front of the example device, where the keys are exposed, to the back of the device that faces opposite the front of the device. The keyboard panel 102 and the display panel 104 both face the same direction while rotating.

Figure 5:
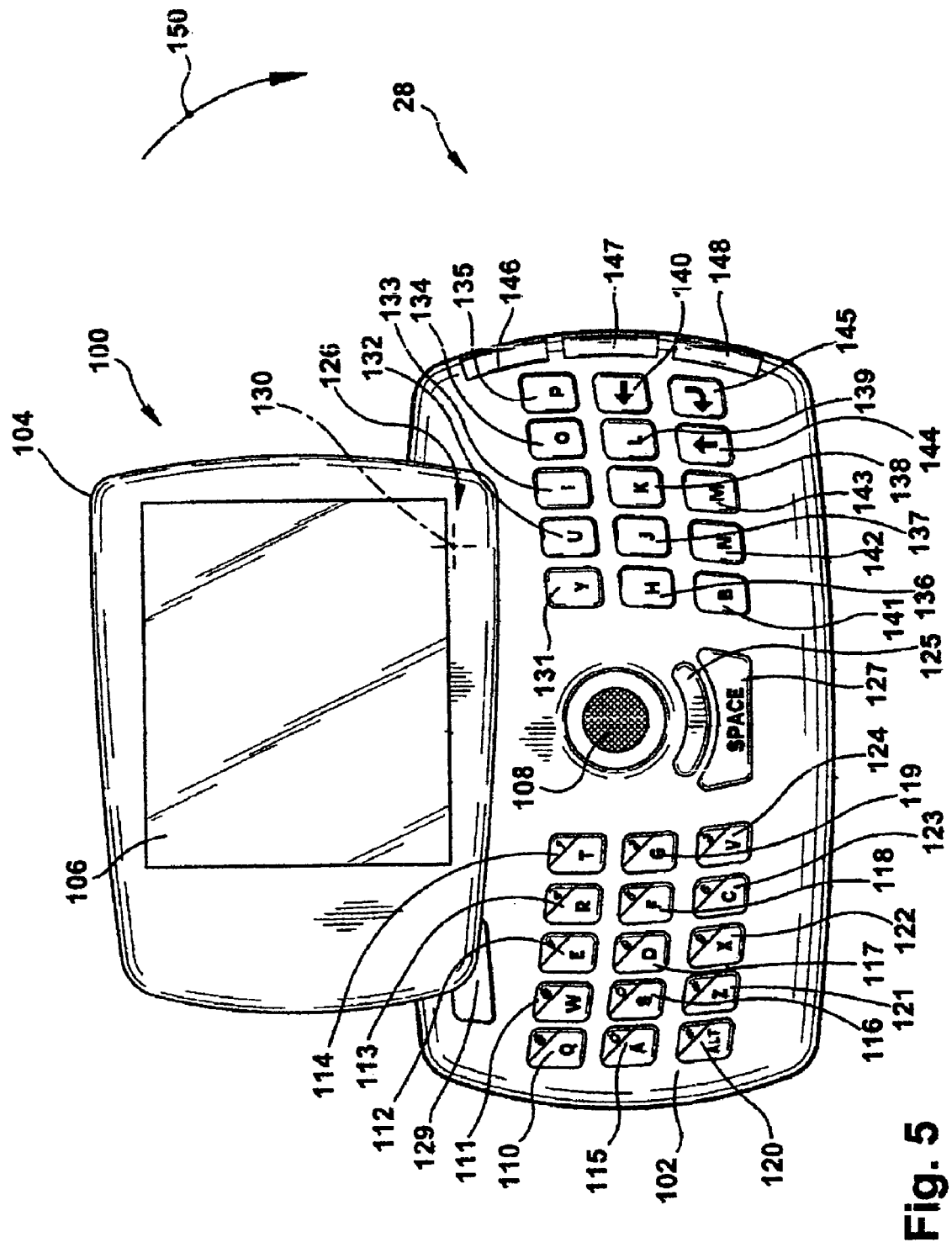
FIG. 5 shows a frontal view of the second example mobile device in a second configuration.

The rotary connection 126 is located off-center so that the display panel 104 can be rotated approximately 180 degrees in the counterclockwise direction to reach the second configuration shown in FIG. 5 and still be partially superimposed over the keyboard panel 102, but not covering any of the text-entry keyboard keys 110-125, 127, 131-145, or the keys 146-148 on the side of the example device 100.

A detent or other type of mechanism for inhibiting but not preventing movement may be used to restrict movement between the first and second configurations. Clockwise rotation from the first configuration according to the arrow 28 is blocked, and counterclockwise rotation from the second configuration according to the arrow 28, is also blocked. This limits the rotation to approximately 180 degrees between the first configuration and the second configuration. Limiting rotation prevents excessive twisting and wear on the rotary connection 126 and internal electronic linkage.

Referring now to FIG. 5, the second example mobile device 100 is shown in the second configuration. The keyboard panel 102 has a second set of input devices 108-125, 127-129, 131-148 that are exposed and available for operating. One input device 128 is almost totally concealed under the display panel 104 and is not practically available for operating. In this example, all the input devices in the second set 108-125, 127-129, 131-148 are keys except for the trackball 108. Other keys, thumbwheels, sliding switches, or other types of input devices could alternatively be included on the keyboard panel 102 or display panel 104. All of the keys that were part of the first set 108-125, 127-129 are also part of the second set 108-125, 127-129, 131-148, though one key 128 is practically unusable in this example and key 129 is also partially covered by the display and practically unusable.

The display screen 106 in the second configuration is oriented approximately 90 degrees in the counterclockwise direction when compared with the display screen 106 in the first configuration. This provides a wider but shorter display screen 106 in the second configuration. This is one primary difference the second example device 100 has from the first example device 1.

The first configuration of the second example device 100, shown in FIG. 4, is optimized for a telephony application. Twelve keys 111-114, 116-119, 121-124 of the first set of input devices 108-125, 127-129 are set up in a traditional three by four telephone keypad configuration. This is a familiar layout that is intuitive to operators and is ergonomically favorable.

Indicia corresponding to the numerals 0-9 and the characters * and # are printed on the twelve keys 111-114, 116-119, 121-124. The indicia is oriented at an approximately 45 degree angle with respect to the orientation of the display screen 106. Because these keys 111-114, 116-119, 121-124 are reused in other configurations for different applications, different character indicia, as shown in FIG. 4, may also be printed on the keys.

In the second configuration, the example device 100 is preferably held by an operator in a 90 degree clockwise rotation from the first configuration. Accordingly, in the second configuration, the telephony character indicia are at an approximately negative 45 degree angle with respect to vertical axis of the display screen 106 in this configuration. This key indicia scheme allows the telephony character indicia to be easily visible in both configurations. The telephony function is the primary function of the keys in the first configuration, and it is a secondary function in the second configuration. The secondary function may, for example, be reached by holding down a "shift" key. The telephone character indicia on the keys 111-114, 116-119, 121-124 that corresponds to the first configuration may be color coded so that they are all the same color, and different from the color of indicia that corresponds to the second configuration.

The remaining keys 110, 115, 120, 125, 127-129 of the first set of input devices 108-125, 127-129 can be set up for other typical telephony functions. Functions such as autodial, redial, initiate call, and end call, for example, may be assigned to the remaining keys 110, 115, 120, 125, 127-129. One or more of the remaining keys 110, 115, 120, 125, 127-129 may also be used for selecting and navigating through menu systems of the cellular phone application. The input device 108 on the display portion 104 may also be used for this purpose on its own or in conjunction with one of the remaining keys 110, 115, 120, 125, 127-129.

When in the first configuration the example mobile device 100 automatically runs a cellular telephone application. The orientation of the visual output displayed on the display screen 106 is also automatically switched to the tall narrow orientation shown in the first configuration so that the visual output display appears as upright with respect to the keyboard panel 102. The automatic switching of the application and display when the device 100 is in this configuration is further explained below.

The second configuration of the second example device 100, shown in FIG. 5, is optimized for a text-entry application or group of applications. Examples of such applications include e-mail, internet browsing, instant messaging, text messaging, and word processing. A video game application may also be included in this group of applications.

Many of the keys 110-124, 127, 131-145 of the second set of input devices 108-125, 127-129, 131-148 are set up in a text-entry keyboard configuration. The key layout in this example is a traditional QWERTY keyboard. Other key layouts are also possible, for example, AZERTY, QWERTZ, Dvorak, Alphabetic, and/or Function layouts, as well as the twenty-four key predictive text keyboard that is fully described in "Keyboard Arrangement," U.S. patent application Ser. No. 10/785,790, which is owned by the assignee of the present application.

The remaining usable keys 125, 129, 146-148 of the second set of input devices 108-125, 127-129, 131-148 can be set up for other functions that are commonly used with text-entry applications. For example, one or more of the remaining usable keys 125, 129, 146-148 could be operator customizable to run certain shortcut commands. As another example, one of the remaining keys 125, 129, 146-148 may be used to alter the function of the text-entry keyboard keys 110-124, 127, 131-145. For example, the altered function of these keys could allow the telephony characters to be entered by the keys 111-114, 116-119, 121-124, it could also allow four direction cursor control by another set of keys. The input device 108 can also be used for cursor control.

Many of the second set of input devices 108-125, 127-129, 131-148 have character indicia that is printed on the keys so that it is substantially upright in the second configuration with respect to the orientation of the display screen 106 in the second configuration. In particular, the text-entry keyboard keys 110-124, 127, 131-145 have a text-entry indicia printed on them that is in an upright orientation. Because some of these keys 110-124, 127 are reused in the first configuration for the cellular telephone application, characters corresponding to the cellular telephone application are also printed on some of these keys 111-114, 116-119, 121-124. The orientation provides the operator with information that the keys labeled 110-124, 127, 131-145 have the text-entry function in the second configuration. The indicia on the text-entry keyboard keys 110-124, 127, 131-145 may also be color coded so that they are all the same color, and different from the color of indicia that corresponds to the telephony application. Alternatively, selective backlighting of keys or parts of keys may be utilized, as explained in greater detail below. The remaining usable keys 125, 129, 146-148 do not have indicia printed on them in this example, but in other examples, they could also have indicia that is oriented or colored to correspond to the function of the key at a particular configuration.

The wider orientation of the display screen 106 in the second configuration is more suitable for text-entry applications than the more narrow, taller orientation of the first configuration. More text can be viewed on a single line, and fewer words will be have to be split between the first and second lines. This improves the readability of the visual display.

When the second example device 100 is in the second configuration, it automatically runs a menu application that allows an operator to select a text-entry application. In other examples, the mobile device 100 may automatically run a text-entry application directly, such as an e-mail application, without requiring the operator to select that option. The orientation of the visual output displayed on the display screen 106 is also automatically switched from the taller, narrower orientation of the first configuration to the shorter, wider orientation of the second configuration so that the visual output display appears as upright in the second configuration with respect to the keyboard panel 102.

An application signal is generated when the second example device 100 is in the first or second configurations. This signal functions to notify the processor to change the software application to the one that corresponds to the configuration the second example device 100 is currently in.

A display signal is also generated when the second example device 100 is in the first or second configuration. This signal functions to notify the processor to change the size and orientation of the display according to what configuration the second example device 100 is in.

Both the display signal and the application signal may be generated, for example, by a tilt switch that is activated when the second example device 100 is rotated to the first or second configuration. In other examples the switch may be activated while in the midst of rotating between configurations. Other types of switches or techniques may also be used to generate the application signal.

Just as in the first example, by automatically switching applications when the configuration is changed, the second example device 100 saves the operator the time of having to press a key, a series of keys, or navigate a menu system to change to the desired application and display orientation. It also ensures that the second example device 100 is in the mode that the configuration has been optimized for. The second example device 100 may also include an operator override feature, so that the operator can choose to operate some or all applications in configurations that are not optimized for the configuration. For example, the operator may want to use the second configuration to dial a telephone number that is represented by letters.

Another important feature of the second example mobile device 100 that is shared with many of the other example devices, is that it reuses some input devices 108-125, 127-128 in more than one configuration for different functions. This allows optimizing the keypad design for multiple applications while minimizing the size and weight of the second example mobile device 100.

III. TYPE C

Figure 6:
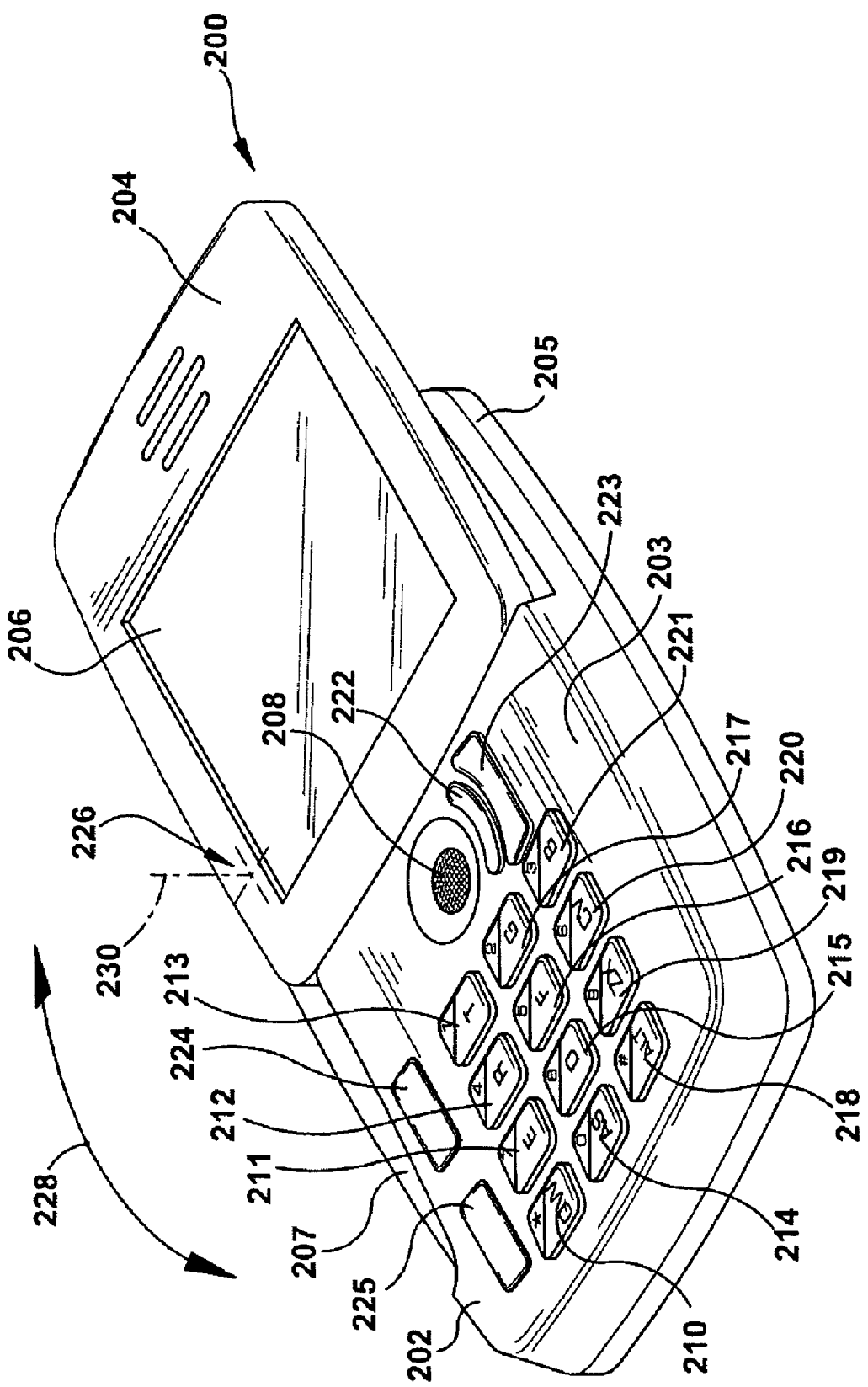
FIG. 6 shows a perspective view of the third example mobile device in a first configuration.

Referring now to FIG. 6, a third example mobile device 200 is depicted that is similar to the second mobile device 100. The device has substantially the same configuration except that the keypad is in a reduced QWERTY arrangement and the keypad portion 202 has an upper keypad level 203 and a lower keypad level 205 (including a ledge portion 207) that is recessed from the upper keypad level 203, the display portion 204 is superimposed over the lower level 205. The display screen 206 is substantially in the same plane as the first level 203. There are some other differences noted below as well.

Similar to the second example device 100, the third example device 200 has two configurations. In the first configuration, shown in FIG. 6, the display portion 204 covers approximately one-third of the keypad portion 202, and a first set of input devices 208-225 remain exposed and available for pressing. The display screen 206 in the first configuration has a tall, narrow orientation so that the device may be used in a vertical orientation, where the longitudinal axis of the device is vertical.

Figure 7:
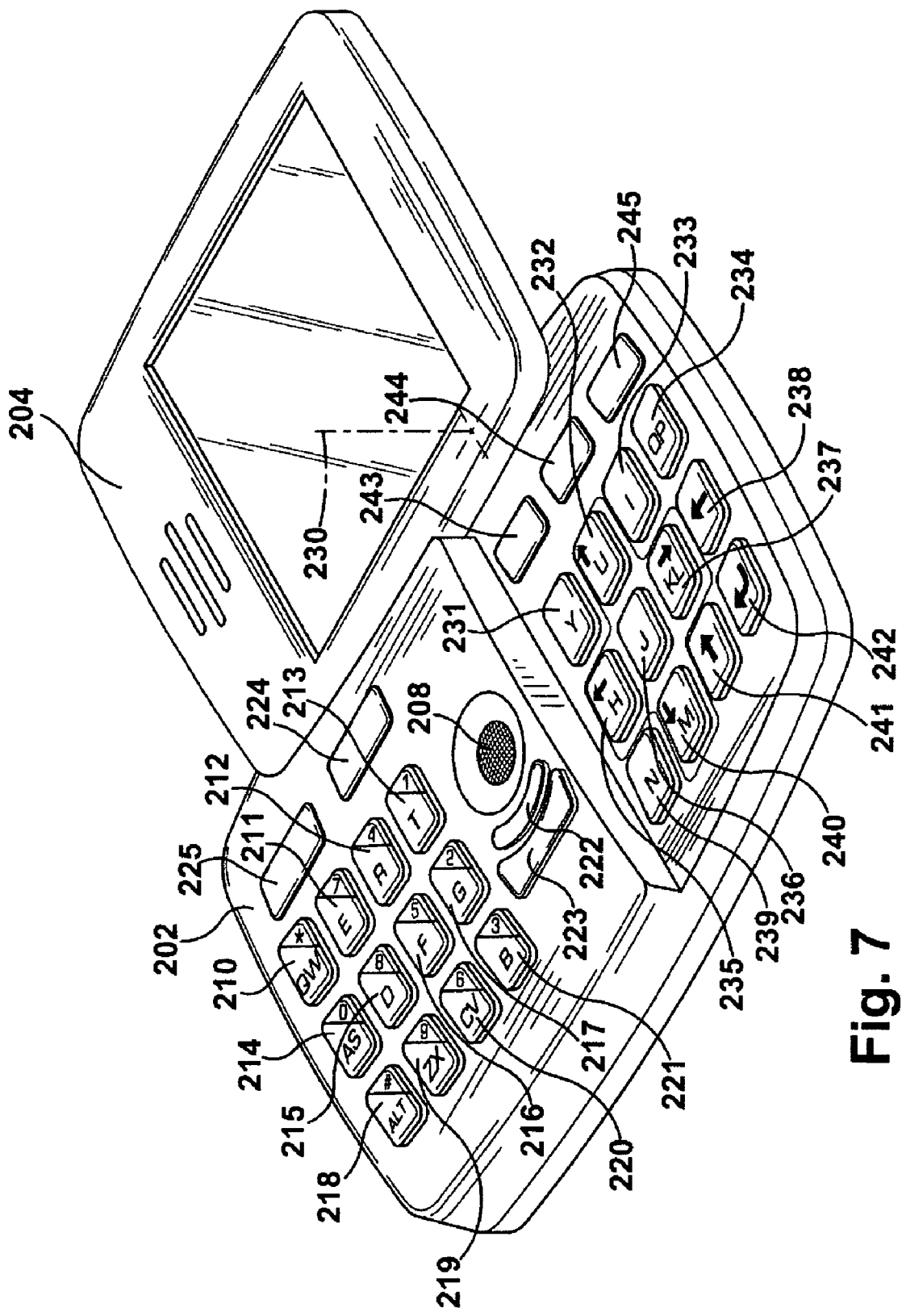
FIG. 7 shows a perspective view of the third example mobile device in a second configuration.

In the second configuration, shown in FIG. 7, the display portion 204 is rotated approximately 180 degrees relative to the keypad portion 202 on an offset axis 230, so that a second set of input devices 208-225, 231-245 are exposed and available for pressing. The display screen 206 has a wider, shorter orientation than in the first configuration. Also different from the second example device 100, the display portion 204 of the third example device 200 is superimposed over the ledge 207 on a side of the device 200. While extra input devices are not located on the ledge portion 207 in this example, in other examples input devices could be located on the ledge, and they would be covered in the second configuration but exposed in the first configuration.

Just as in the second example device 100, the third example device 200 automatically runs a telephony application in the first configuration, shown in FIG. 6, and a menu to select a text-entry application in the second configuration shown in FIG. 7. It could also run a text-entry application directly without requiring a name call up. The third example device 200 also automatically switches the orientation of the visual display output to a tall, narrow orientation in the first configuration, and to a short, wide orientation in the second configuration.

One benefit of the third example device 200 is that the lower keypad level 205 serves as a support backing for the display portion 204. This design gives added rigidity and support to the display portion 204 and prevents damage and wear to the rotational coupling 226. The entire ledge portion 207 may be in close proximity to the back of the display portion 204 and the remaining part of the lower keypad level 205 may have protrusions that are in close proximity with the back of the display portion 204 to enhance this feature.

The rotational coupling can be any known type of pivoting or rotating joint, as known by those of skill in the art. The joint has a transverse axis that extends from the front of the device to the rear of the device. One type of joint that may be utilized is a ball joint.

The third example device 200 can be made thinner than the second example device 100, since the display portion 204 is level with the top of the upper keypad level 203. Some operators may even prefer the two level keypad arrangement over the single level arrangement.

In addition, the edges formed where the lower keypad levels 205 and upper keypad levels 203 meet, serve to block rotation in the clockwise direction from the first configuration and in the counterclockwise direction from the second configuration. A detent or other type of mechanism for inhibiting but not preventing movement may be used to restrict movement into and out of the first and second configurations in the direction that is not blocked by the edge between the upper 203 and lower keypad levels 205. Limiting rotation prevents excessive twisting and wear on the coupling 226 and internal electronic linkage.

IV. TYPE D

Figure 8:
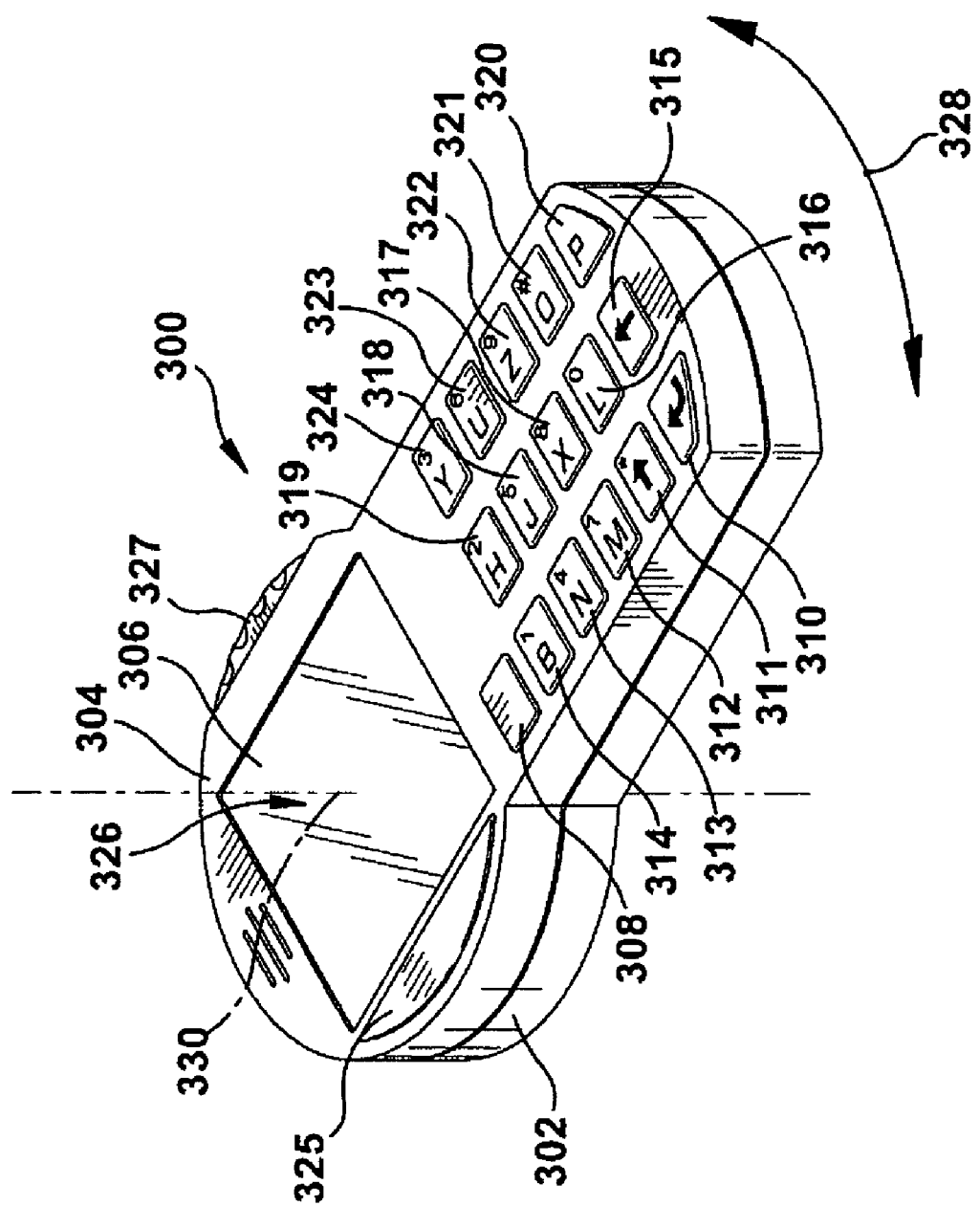
FIG. 8 shows a perspective view of the fourth example mobile device in a first configuration.

Referring now to FIG. 8, a fourth mobile device 300 is depicted in a first of two configurations. The fourth example device 300 has a keypad portion 302 and a display portion 304. The display portion 304 includes a display screen 306 and a first set of input devices 308-325, 327 that are exposed and available for pressing. The display portion 304 is superimposed over the keypad portion 302 in this first configuration, and the input devices on the keypad portion 302 are concealed underneath the display portion 304. The input device on the upper side in this example, is a thumbwheel 327. In other examples, it could be a pointing stick, a key, a trackball, a joystick, or other known input devices positioned at the same or a different location. The remaining input devices in the first set 308-325 are all keys in this example. Other keys, thumbwheels, sliding switches, or other types of input devices could alternatively be included on the keypad portion 302 or display portion 304.

One difference between the fourth example device 300 and the other example devices 1, 100, 200, 400, 500 is that the entire display portion 304 is superimposed over the keypad portion 302 in the first configuration, thereby minimizing the size of the device 300.

The keypad portion 302 and the display portion 304 are joined together by a rotatable coupling 326. The coupling is not visible in FIG. 8, but is located underneath the display screen 306. The coupling 326 allows the display portion 304 to be rotated with respect to the keypad portion 302. The rotational motion is indicated by the arrow 328, and the axis of rotation 330 runs transversely from the front of the example device 300, where the keys are exposed, to the back of the device 300 that faces opposite the front of the device. The keypad portion 302 and the display portion 304 both face the same direction while rotating.

Figure 9:
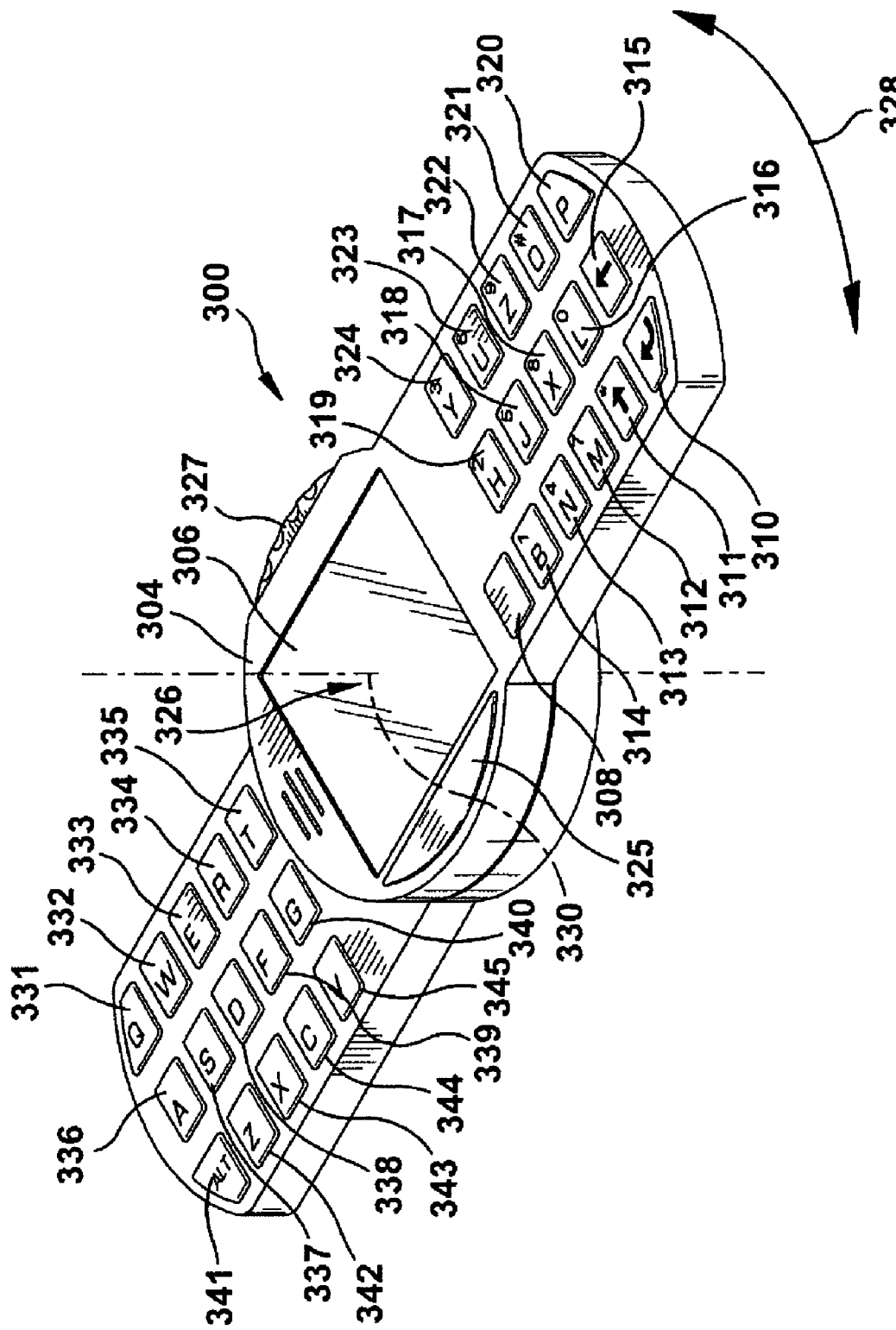
FIG. 9 shows a perspective view of the fourth example mobile device in a second configuration.

The coupling 326 is located behind the display screen 306 so that the display portion 304 can be rotated approximately 180 degrees to reach the second configuration shown in FIG. 9. In this example the rotation can be either clockwise or counterclockwise 328. A detent or other type of mechanism for inhibiting but not preventing movement may be used to restrict movement into and out of the first and second configurations in either direction.

In other examples, clockwise rotation from the first configuration according to the arrow 328 may be blocked, and counterclockwise rotation from the second configuration according to the arrow 328, is also blocked. A detent or other such mechanism would then only be used to inhibit movement in the opposite directions where movement is possible. This limits the rotation to approximately 180 degrees between the first configuration and the second configuration. Limiting rotation prevents excessive twisting and wear on the coupling 326 and internal electronic linkage.

Referring now to FIG. 9, the fourth mobile device 300 is shown in the second configuration. The keypad portion 302 has a second set of input devices 308-325, 327, 331-345 that are exposed and available for operating. In this example, all the input devices in the second set 308-325, 327, 331-345 are keys except for the thumbwheel 327. Other keys, trackballs, sliding switches, or other types of input devices could alternatively be included on the keypad portion 302 or display portion 304. All of the input devices that were part of the first set 308-325, 327 are also part of the second set 308-325, 327, 331-345.

The display screen 306 in the second configuration is located approximately in the middle of the fourth example device 300. The display screen 306 in this example is approximately square. While the display screen size does not change in the first and second configurations, the orientation of the visual output does change. The visual output of the display screen 306 is oriented approximately 90 degrees in the counterclockwise direction when compared with the display screen 306 in the first configuration so that the visual output display has a horizontal orientation in relation to the keyboard in the second configuration.

The first configuration of the fourth example device 300, shown in FIG. 8, is optimized for a cellular phone application. Twelve keys 311-314, 316-319, 321-324 of the first set of input devices 308-325, 327 are set up in a familiar three by four configuration. This is layout is intuitive to operators and is ergonomically favorable.

The numerals 0-9 and the characters * and # are printed on these twelve keys 311-314, 316-319, 321-324 so that they are upright with respect to the orientation of the display screen 306 in the first configuration. Because these twelve keys 311-314, 316-319, 321-324 are reused in other configurations for different applications, different character indicia may also be printed on the keys. The orientation provides the operator with information that when the fourth example device 300 is in the first configuration, these twelve keys 311-314, 316-319, 321-324 have the telephony character entry function. The indicia on the twelve keys 311-314, 316-319, 321-324 may also be color coded so that they are all the same color, and different from the color of indicia that corresponds to the second configuration.

The remaining keys 308, 310, 315, 320, 325 of the first set of input devices 308-325, 327 can be set up for other typical cellular phone functions. Functions such as autodial, redial, initiate call, and end call, for example, may be assigned to the remaining keys 308, 310, 315, 320, 325. One or more of the remaining keys 308, 310, 315, 320, 325 may also be used for selecting and navigating through menu systems of the cellular phone application. The thumbwheel 327 may also be used for this purpose on its own or in conjunction with one of the remaining keys 308, 310, 315, 320, 325.

When in the first configuration the fourth example device 300 may automatically run a cellular telephone application. The orientation of the visual output displayed on the display screen 306 is also automatically switched so that the visual output display appears as upright with respect to the telephony character entry keys 311-314, 316-319, 321-324. The automatic switching of the application and display when the device 300 in this configuration is further explained below.

The second configuration of the fourth example device 300, shown in FIG. 9, is optimized for a text-entry application or group of applications. Examples of such applications include e-mail, internet browsing, instant messaging, text messaging, and word processing. A video game application may also be included in this group of applications.

Many of the keys 310-325, 331-345 of the second set of input devices 308-325, 327, 331-345 are set up in a text-entry keyboard configuration. The key layout in this example is a traditional QWERTY layout. Other key layouts are also possible, for example, traditional full-sized QWERTY, AZERTY, Dvorak, Alphabetic, and/or Function layouts, as well as the twenty-four key predictive text keyboard that is fully described in "Keyboard Arrangement," U.S. patent application Ser. No. 10/785,790, which is owned by the assignee of the present application.

The remaining key 308 of the second set 308-325, 327, 331-345 can be set up for other functions that are commonly used with text-entry applications. For example, this could be operator customizable to run a certain shortcut command, or to alter the function of the text-entry keyboard keys 310-325, 331-345. For example, the altered function of these keys could allow the telephony characters to be entered by the keys labeled 311-314, 316-319, 321-324.

In the second configuration of the fourth example device 300, the thumbwheel 327 can be used for cursor control. However, instead of using the thumb, it may be more easily operated by the index finger of the operator in this configuration.

Similar to the devices described earlier, some of the text-entry keyboard keys 310-325, 331-345 have a text-entry indicia printed on them that is in an upright orientation with respect to the orientation of the display screen 306 in the second configuration. Because some keys 311-314, 316-319, 321-324 of the text-entry keyboard keys 310-325, 331-345 are reused in the first configuration for the cellular telephone application, indicia corresponding to the cellular telephone application are also printed on these keys 311-314, 316-319, 321-324. The upright orientation provides the operator with information that keys 310-324, 331-345 have the text-entry function in the second configuration. The indicia on the text-entry keyboard keys 310-324, 331-345 may also be color coded so that they are all the same color, and different from the color of indicia that corresponds to the first configuration. Selective lighting of groups of keys or sets of keys may also be used. The remaining usable keys 308, 325 do not have indicia printed on them in this example, but in other examples, they could also have indicia that is oriented or colored to correspond to the function of the key at a particular configuration. This gives further information to the operator to help them discern what key function the key performs in the given configuration.

When the fourth example device 300 is in the second configuration it automatically runs a menu application that allows an operator to select a text-entry application. In other examples, the mobile device may automatically run a text-entry application directly, such as an e-mail application. The orientation of the visual output on the display screen is also automatically rotated 90 degrees from the orientation of the first configuration so that the visual output display appears as upright in the second configuration with respect to the text entry keys 310-325, 331-345.

Similar to the other example devices, an application signal is generated when the fourth example device 300 is in the first or second configuration. This signal functions to notify the processor to change the software application to the one that corresponds to the configuration the example device 300 is currently in.

A display signal is also generated when the fourth example device 300 is in the first or second configuration. This signal functions to notify the processor to change the orientation of the visual output of the display according to what configuration the example device 300 is in.

Both the display signal and the application signal may be generated, for example, by a tilt switch that is activated when the fourth example device 300 is rotated to the first or second configuration. In other examples, the switch may be activated while in the midst of rotating between configurations. Other types of switches or techniques may also be used to generate the signal.

Just as in the other examples, by automatically switching applications when the configuration is changed, the fourth example device 300 saves the operator the time of having to press a key, a series of keys, or navigate a menu system to change to the desired application and display orientation. It also ensures that the example device 300 is in the mode that the configuration has been optimized for. The example device 300 may also include an operator override feature, so that the operator can choose to operate some or all applications in configurations that are not optimized for the configuration.

Another important feature of the fourth example mobile device 300 that is shared with the other example devices, is that it reuses some input devices 308-325, 327 in more than one configuration for different functions. This allows optimizing the keypad design for multiple applications while minimizing the size and weight of the fourth mobile device 300.

V. TYPE E

Figure 10:
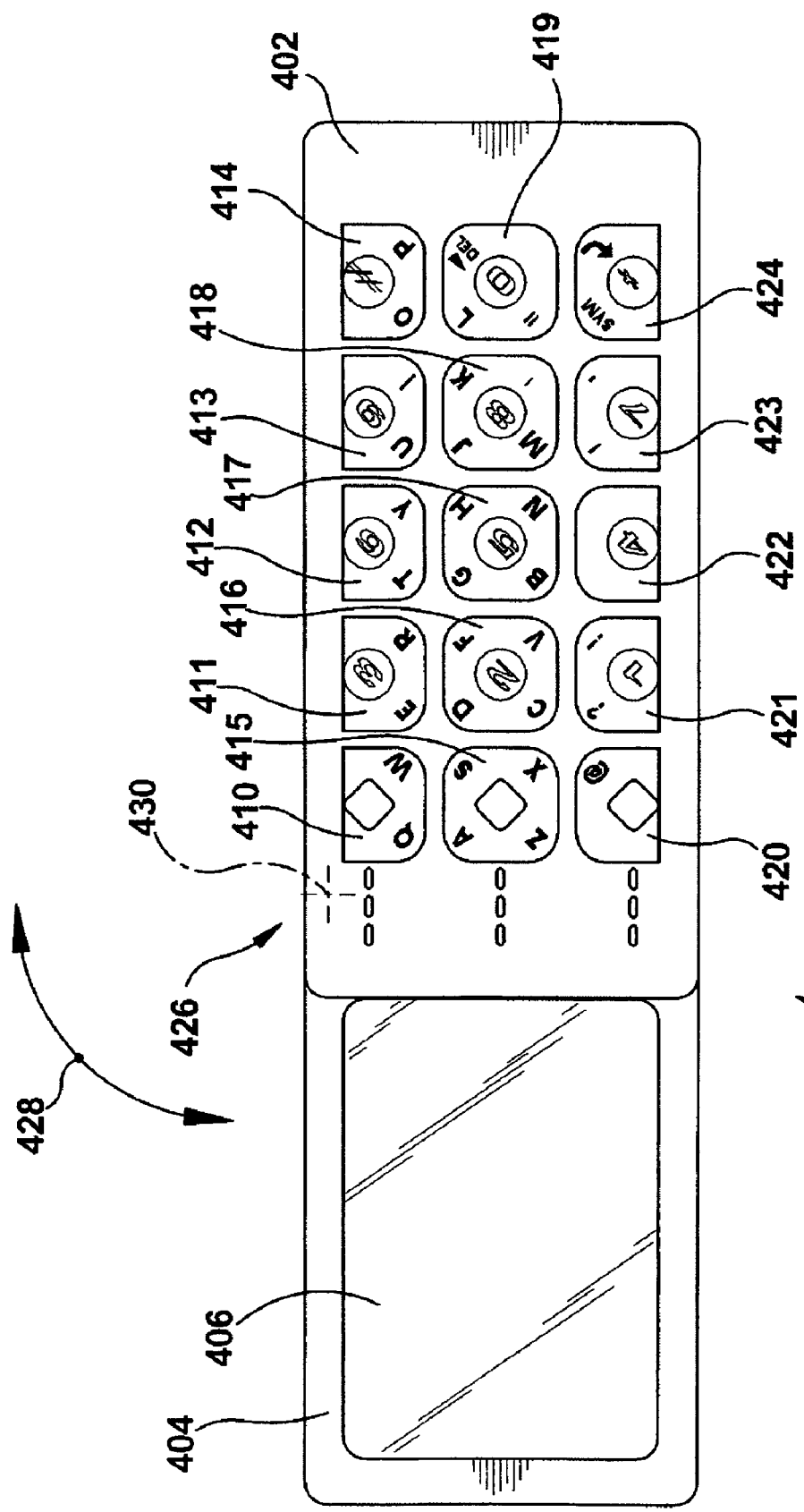
FIG. 10 shows a frontal view of the fifth example mobile device in a first configuration.
Figures 11, 11A, 11B:
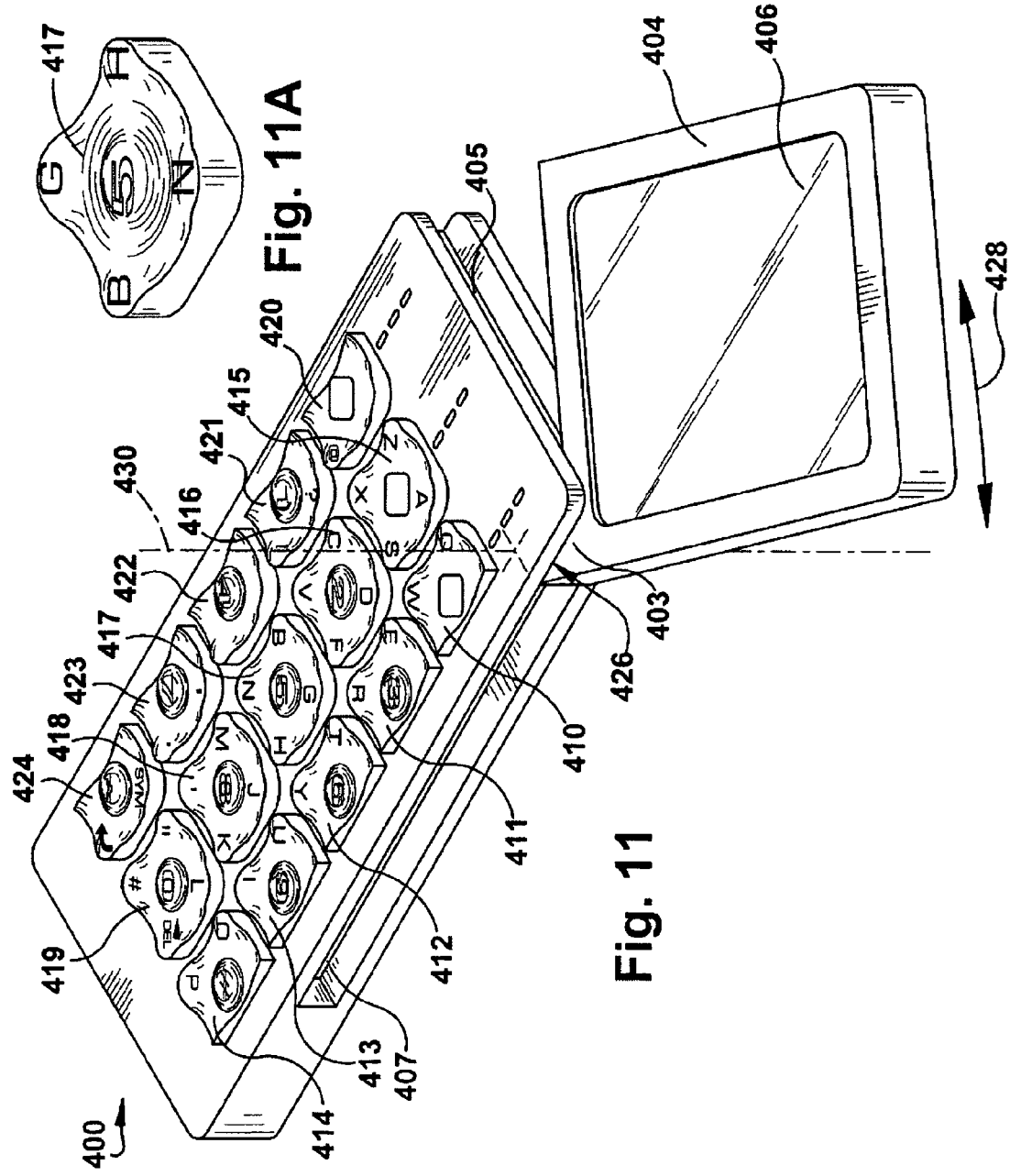
FIG. 11 shows a perspective view of the fifth example mobile device as it rotates between the first and a second configuration.
FIG. 11A depicts an example key for use on the device depicted in FIG. 11.
FIG. 11B depicts an alternative example key for use on the device depicted in FIG. 11.

Referring now to FIG. 10, a fifth mobile device 400 is depicted that has two configurations. The fifth device 400 is shown in a first configuration in FIG. 10. The fifth example device 400 differs in part from the other example devices in that there is only one set of input devices 410-424. In this example, the keys are toggle keys and are multi-functional based upon how the operator presses the key. The toggle keys 410-424 are operable to input three, five, or (if used in conjunction with other keys, e.g. shift or alt) multiple signals to the processor according to which of the different surfaces of the key that the operator presses. There are also only fifteen alphanumeric toggle keys 410-424, which is greatly reduced from the twenty-six keys that are conventionally used to enter text. This allows the keyboard to be reduced in size from conventional keyboards. The toggle keys 410-424 also may have multiple surfaces for providing tactile feedback to the operator. An example of this is best seen in FIG. 11.

The keyboard provides an operator interface that includes alphabetic characters comprising a standard alphabetic format, such as QWERTY, QWERTZ, AZERTY, or DVORAK, among other known formats, for text entry. Current standard alphabetic keyboard formats utilize twenty-six keys for alphabetic characters, with each key representing a single alphabetic character. A preferred embodiment of the example device 400 presents alphabetic characters in a reduced key format, with fewer columns and keys than the standard format. Each of the twenty-six alphabetic characters are provided, but in a reduced format such that each key on the keyboard represents multiple alphabetic characters.

The preferred reduced physical keyboard is accomplished by utilizing fewer columns than a standard format keyboard. Because of this, the keyboard is well suited for application on a housing form factor similar to that of a housing associated with a numeric-keypad-based mobile communication device. In particular, the reduced column keyboard provides for reduced size devices without sacrificing speed and convenience to an operator. The reduced key keyboard also allows for smaller devices that are more stylish and fashionable.

This keyboard is designed to be used in two orientations, a first orientation where the longest dimension of the keyboard is upright and vertical with respect to the operator, and a second orientation, a 90 degree counter-clockwise rotation of the device 400 from the first orientation. For purposes of describing this example keyboard the term "column" refers to one of the longer line of alphanumeric keys and the term "row" refers to one of the shorter line alphanumeric of keys.

Each toggle key 410-424 may have multiple raised surfaces as depicted in FIGS. 11A and 11B. In the depicted example, there are four raised surfaces on each key in the middle column of keys 415-419, and there are two raised surfaces on each key in the outer columns of keys 410-414, 420-424. Each alphabetic character corresponds to one raised surface on one of the toggle keys 410-424. The alphabetic characters are represented on the keyboard by indicia, which may be positioned directly on the toggle keys 410-424, or positioned on the keypad portion 402 of the example device 400 next to the respective key.

In an alternative embodiment that is not shown, multiple alphabetic characters could be associated with each toggle position. A predictive text program could be utilized to determine which character is being selected. This would provide for an even smaller keypad form factor.

In the depicted example, the alphabetic letters are arranged on the keys in a QWERTY layout. Keys on the first outer column of keys 410-414 have two raised surfaces each. The ten letters in the top row of a QWERTY keyboard, "Q, W, E, R, T, Y, U, I, O, P" each correspond to one of the ten raised surfaces of the five keys in the first outer column 410-414 as shown in FIG. 10. Keys in the middle column 415-419 have four raised surfaces each. The sixteen letters in the middle and bottom rows of a traditional QWERTY keyboard, "A, S, D, F, G, H, J, K, L, Z, X, C, V, B, N, M" each correspond to one of the twenty raised surfaces of the five keys in the middle column 415-419 as shown in FIG. 10. The letter "L" is the only letter on the key labeled 419, and letters "J, K, and M" are the only letters on the key labeled 418. Other alphabetic key layouts are also possible, for example, AZERTY, Dvorak, Alphabetic, and/or Function layouts, as well as the twenty-four key predictive text keyboard that is fully described in "Keyboard Arrangement," U.S. patent application Ser. No. 10/785,790, which is owned by the assignee of the present application. As an alternative to the 3×5 layout, a 2×5 layout could be utilized where the "Q, W, E, R, T, Y, U, I, O, P" are on the top part of the keys in the top row, the "A, S, D, F, G, H, J, K, L" are on the bottom part of the keys in the top row, and the "X, C, V, B, N, M" are on the top part of the keys in the bottom row. Alternatively, the "Q, W, E, R, T, Y, U, I, O, P" could be positioned on the lower part of the keys in the upper row, with the "A, S, D, F, G, H, J, K, L" and "X, C, V, B, N, M" positioned on the upper and lower parts, respectively, of the keys in the bottom row.

There are also symbols and functions that correspond to several of the raised surfaces on the keys labeled 418-424 in the depicted example. On the key labeled 422 the "space" function corresponds to two raised surfaces. These symbols and functions are also represented on the keyboard by indicia, which may be positioned directly on the toggle keys 418-424, or positioned on the keypad portion 402 of the example device 400. These symbols and functions include those that are typically utilized with keyboards. Example symbols include ".", ",", ";", """, "'", ":", "?", "/", ">", "<", "!", "@", "~", "$", "%", "^", "&", "(", ")", "_", "-", "+", "=", "[", "]", "{", "}", "|", and "\", among other known symbols. Example functions include "tab", "caps lock", "shift", "control", "alt", "return/enter", "backspace", "insert", "delete", "home", "end", "page up", "page down", "end", "escape", "pause", "break", "send", "end", "txt", "sym", and "scroll lock", among other known functions associated with text entry or telephony entry.

The toggle keys 410-424 of the example keyboard also include a center depressed surface that is lower than the raised surfaces. In this example device 400, telephony characters, which include the numbers 0-9 and the symbols # and *, each correspond to a center depressed surface on one of the keys 411-414, 416-419, 421-424. The keys depicted are either 3-switch or 5-switch keys. The telephony characters are arranged in a traditional three-by-four phone arrangement where the numbers "1, 2, 3" correspond to keys labeled 421, 416, 411, numbers "4, 5, 6" correspond to keys labeled 422, 417, 412, numbers "7, 8, 9" correspond to keys labeled 423, 418, 413, and the number "0" and symbols "*" and "#" correspond to keys labeled 414, 419, 424. Each number is positioned on its own key, as with a standard phone key pad. The standard numeric phone key arrangement corresponds to the International Telecommunication Union ("ITU") Standard E.161, entitled "Arrangement of Digits, Letters, and Symbols on Telephones and Other Devices That Can Be Used for Gaining Access to a Telephone Network" (also known as ANSI TI.703-1995/1999 and ISO/IEC 9995-8:1994). The center depressed surface gives the operator tactile information to help the operator locate and differentiate the telephony key surfaces from the alphabetic and functional raised key surfaces.

The center depressed surfaces on keys labeled 410, 415, and 420 are reserved for auxiliary functions. The function which these key surfaces performs when pressed may depend on whether the device is in a first or second configuration as discussed below. The center depressed surface of these keys 410, 415, 420 is of a different shape (diamond-shaped with rounded edges) than the center depression of the other keys 411-414, 416-419, 421-424 (circular). This gives the operator tactile feedback to locate and differentiate between these keys 410, 415, 420 and the other toggle keys 411-414, 416-419, 421-424. Particularly, this feature helps inform the operator what keys are part of the phone pad just by feeling the keys.

In one example, the numeric phone key arrangement may also utilize a surface treatment on the surface of the center "5" key 417 in the form of a raised bump. This bump is typically standard on telephones and is used to identify the "5" key through touch alone. Once the operator has identified the "5" key, it is possible to identify the remainder of the phone keys through touch alone because of their standard placement. The bump preferably has a shape and size that is readily evident to an operator through touch. An example bump may be round, rectangular, or have another shape, if desired. Alternatively, raised bumps may be positioned on the housing around the "5" key and do not necessarily have to be positioned directly on the key, as known by those of skill in the art.

Preferably, the keypad chassis uses single click domes with corner actuators under each toggle key 410-424. The corner actuators are positioned underneath each raised surface. This allows the operator to press a specific raised surface of the key to select or type a corresponding function or character. If the center depressed surface of the key is pressed, the secondary key function is activated. For keys labeled 421-424, 416-419, and 411-414 this enters a telephony character. For keys labeled 410, 415, and 420, pressing the center depressed surface activates some other character or operation that may be different depending on whether the device is in a first or a second configuration. The single dome design eliminates double clicking that is common in keypads with two or more domes per key.

The fifth example mobile device 400 has a keypad portion 402 and a display portion 404. The display portion 404 includes a display screen 406, and the keypad portion includes a set of toggle keys 410-424.

In other examples, other input devices could also be part of the example device 400. For example, a thumbwheel, a pointing stick, a key, a trackball, a joystick, or other known input devices could also be included.

Other than the unique key layout, three other differences exist between the fifth example device 400 and the other example devices and are best depicted in FIG. 11: (1) the display portion 404 has an arm portion 403, (2) the display portion 405 is partially seated within the keypad portion 402, and (3) the display portion rotates in a jackknife manner.

The keypad portion 402 and the display portion 404 are joined together by a rotatable coupling 426. The coupling is not visible in the figures but is located underneath the keypad portion 402 and at the end of the arm portion 403 of the display portion 404. The coupling 426 allows the display portion 404 to be rotated with respect to the keypad portion 402. The rotational motion is indicated by the arrow 428, and the axis of rotation 430 runs from the front of the example device 400, where the keys are exposed, to the back of the device that faces opposite the front of the device 400. The keypad portion 402 and the display portion 404 both face in the same direction while rotating.

In the first configuration, the display portion 404 is partially received into a first groove 405 that runs through a first and second side of the keypad portion 402. The first groove 405 has two sides and a floor. As the first groove 405 approaches the outer edge of the first side it turns at approximately a 90 degree angle and runs through the second side of the keypad portion 402 as it follows the outer edge of the keypad portion 402. The first groove ends where the arm portion 403 is rotatably coupled to the keypad portion 402 on the second side. When the example device 400 is in the first configuration, a first side of the display portion 404 is received into the first side of the first groove 405, and the entire arm portion 403 of the display portion 404 is received into the second side of the first groove 405. The display screen 406 is entirely visible to the operator and is not received into the first groove 405. However in other examples, it could be partially received into the first groove 405 so as to partially protect the display screen 406 while still showing enough of the screen 406 to display at least a single line for a phone number.

The rotatable coupling 426 is located at the end of the arm portion 403 of the display portion 404 and joins it to the keypad portion 402 at an off-center location near an edge of the keypad portion 404. The display portion 404 can be rotated clockwise from the first configuration approximately 180 degrees to reach the second configuration shown in FIG. 12. It can also be rotated counterclockwise approximately 180 degrees from the second configuration to reach the first configuration. The floor of the grooves 405, 407 in the keypad portion prevents further movement past the approximately 180 degrees between the first and second configurations. When the fifth example device 400 is in the first or second configuration, a detent or other mechanism that restricts but does not prevent movement inhibits rotation in the direction where movement is possible.

Figure 12:
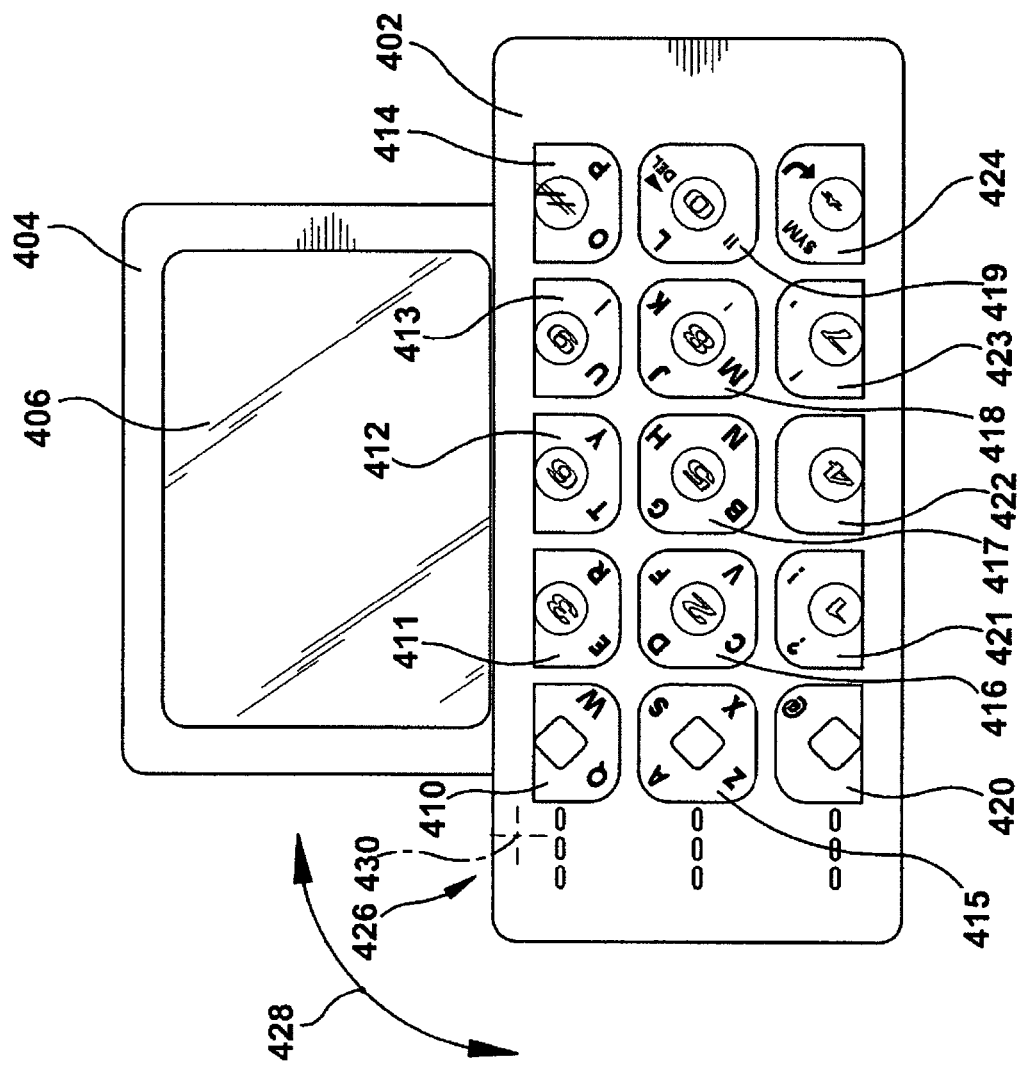
FIG. 12 shows a frontal view of the fifth example mobile device in the second configuration.

In the second configuration, as shown in FIG. 12, the display portion 404 is partially received into a second groove 407 that runs through the second side of the keypad portion 402 of the fifth example device 400. The arm portion 403 is totally received in the second groove 407. The second groove 407 has three sides and a floor, and it is bounded on the other side by the arm portion 403 where it is rotatably coupled to the keypad portion 402. When the example device 400 is in the second configuration, a second side of the display portion 404 that is on the other side of the arm portion 403 from the first side is received into the second groove 407. The entire arm portion 403 is also received into the second groove. The display screen 406 is not received into the second groove 407 and is fully exposed for viewing.

Unlike the other example devices, 1, 100, 200, 300, 500, the same set of input devices 410-424 that are exposed and available for operating in the first configuration are also exposed and available for operating in the second configuration.

The display screen 406 in the second configuration is located approximately in the middle of the second side of the keypad portion 402. The display screen 406 is oriented approximately 90 degrees in the clockwise direction in relation to the input devices 410-424 when compared with the orientation of the display screen 406 in the first configuration. Similar to the second example device 100, this provides a wider but shorter display screen 406 in the second configuration. The wider orientation is preferable for text-reading and typing over the taller, narrower orientation of the first configuration.

The first configuration of the fifth example device 400, shown in FIG. 10, is optimized for a cellular phone application. The device 400 is preferably held with the long edges of the device 400 upright in relation to the operator. In this orientation, the telephony characters on keys labeled 411-414, 416-419, and 421-424 will be in a familiar three by four configuration. This is a familiar layout that is intuitive to operators and is ergonomically favorable.

Telephony characters are input by pressing the depressed surface of the toggle keys 411-414, 416-419, 421-424. The remaining toggle keys 410, 415, 420 can be automatically switched when in the first configuration to correspond to typical cellular phone functions, examples of which are given above. One or more of the depressed surfaces of the remaining toggle keys 410, 415, 420 may also be used for selecting and navigating through menu systems of the cellular phone application.

When in the first configuration the fifth example device 400 automatically runs a cellular telephone application. The orientation of the visual output displayed on the display screen 406 is automatically determined so that the visual output display appears as upright with respect to the preferred upright orientation of the long edges of the device 400. The automatic switching of the application and display when the device 400 in this configuration is further explained below.

The second configuration of the fifth example device 400, shown in FIG. 12, is optimized for a text-entry application or group of applications. The device 400 is preferably rotated by the operator and held approximately 90 degrees from the preferred orientation of the first configuration so that the short edges of the front of the device 400 are vertically oriented with respect to the operator. The key layout in this example, when held in this orientation, is a QWERTY keyboard as explained in detail above. In other examples the key layout could be various other key layouts, examples of which are stated above, or derived from the disclosure above.

One advantage of this device is that telephony characters may be entered in the second configuration by pressing the depressed surface of the toggle keys 411-414, 416-419, 421-424. It is not necessary to use another key to switch the function of the key from alphabetic to telephony in order to enter the telephony character. When the device is moved to the second configuration, the depressed surfaces of the remaining toggle keys 410, 415, 420 may be automatically switched to correspond to functions that are commonly used with text-entry applications. For example, a depressed surface could be operator customizable to run a certain shortcut command, or to alter the function of the text-entry portions of the toggle keys 410-424. The altered function of these keys could input capital letters instead of lower-case letters. Other examples of functions and symbols that might be used are also given above.

Similar to the other example devices 1, 100, 200, 300, 500, when the fifth example device 400 is in the second configuration it automatically runs either a text-entry application directly or a menu application that allows an operator to select an text-entry application. The display orientation on the display screen 406 is also automatically rotated 90 degrees from the orientation of the first configuration so that the display appears as upright in the second configuration.

Just as in the other example devices, an application signal is generated when the fifth example device 400 is in the first or second configuration. This signal functions to notify the processor to change the software application to the one that corresponds to the configuration the example device 400 is currently in. A manual override switch as discussed above may also be included.

A display signal is also generated when the fifth example device 400 is in the first or second configuration. This signal functions to notify the processor to change the orientation of the visual output of the display according to what configuration the example device 400 is in.

In the fifth example device 400 both the telephony character indicia, used primarily in the first configuration, and the text-entry character indicia, used primarily in the second configuration, are printed at an approximately 45 degree angle from upright with respect to the orientation of the display screen 406. In the second configuration, the example device 400 is preferably held in a 90 degree counter-clockwise rotation from the first configuration, accordingly both the text and numeric character indicia are at an approximately negative 45 degree angle from upright with respect to the orientation of the display screen 406. This key indicia scheme allows both text and numeric indicia to be easily visible and associated with the correct keys in both configurations. This is different from some of the other example devices, but is particularly appropriate in this example device 400 because the keys 411-414, 416-419, 421-424 have separate surfaces for both telephony and text entry characters. This corresponds to the advantage of this design that allows both numerals and text to be entered with one key press in both configurations. The remaining toggle keys 410, 415, 420 are not depicted as having indicia for the center portion of the toggle key, and these keys may be reused for different functions in each configuration.

If some differentiation between characters that are primarily associated with each mode is desired, the alphabetic indicia may be color coded so that they are all the same color and different from the color of the telephony indicia that is printed in the center of the toggle keys 411-414, 416-419, 421-424. Alternatively, selective key lighting may be utilized, as discussed herein.

In other examples, the indicia for telephony function could be oriented to be upright as they would appear with respect to display screen 406 in the first configuration, and the text entry indicia could be oriented at approximately a 90 degree angle in relation to the telephony characters so that they would appear upright in the second configuration.

VI. TYPE F

Figure 13:
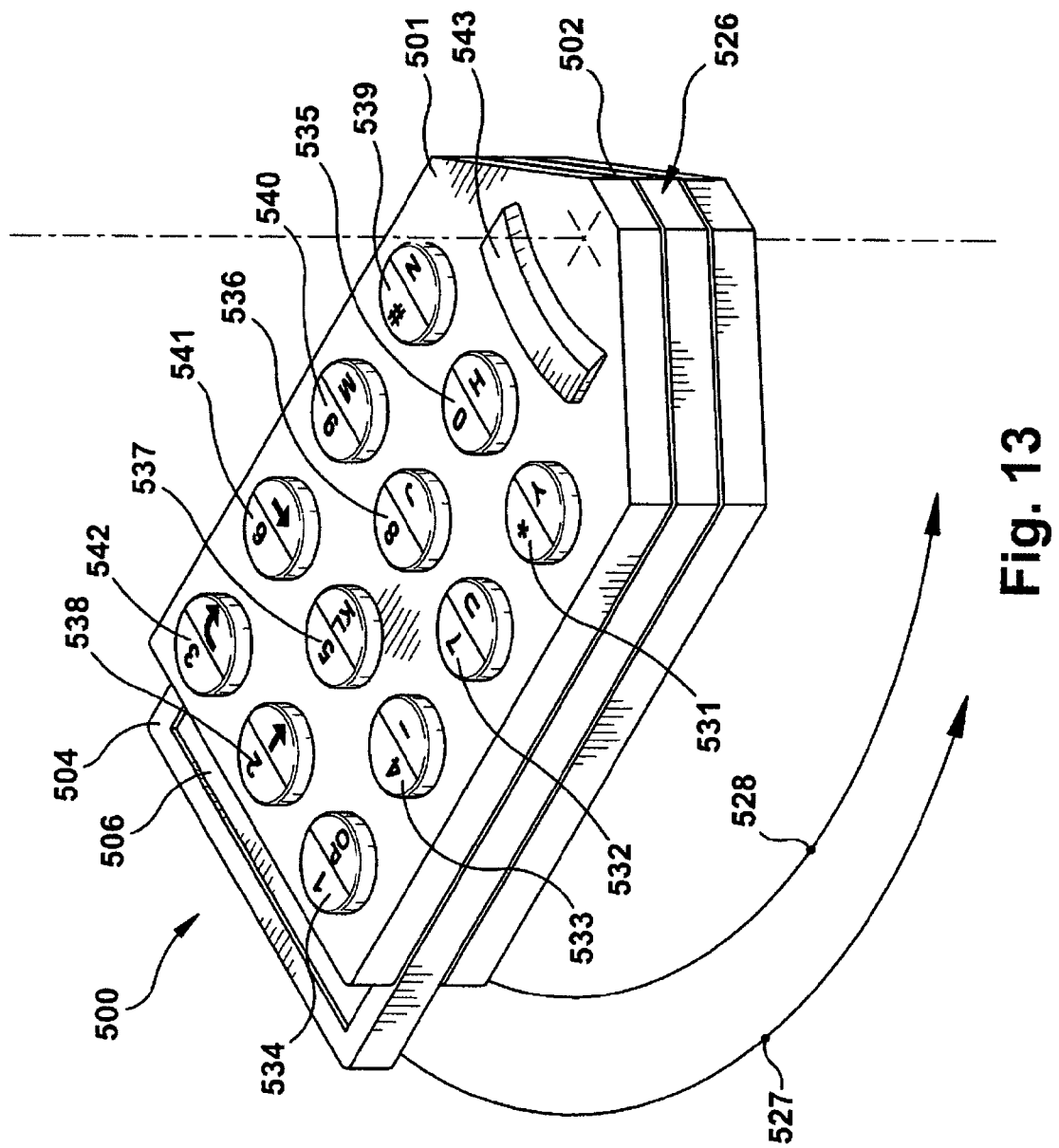
FIG. 13 shows a perspective view of the sixth example mobile device in a first configuration.

Referring now to FIG. 13, a sixth example mobile device 500 is depicted that has three parts. The example device 500 is shown in a first configuration in FIG. 13. The sixth example device 500 has a first keypad portion 501, a second keypad portion 502, and a display portion 504. The display portion 504 includes a display screen 506. The first keypad portion 501 is superimposed over all but a top area of the display portion 504. The display portion 504 is superimposed over the second keypad portion 502. Thus, the display portion 504 is situated between the two keypad portions 501, 502. The first keypad portion 501 in this first configuration has a first set of input devices 508, 531-543 that are exposed and available for operation. Notably, the second keypad portion 502 is located behind the display portion 504 and the keys on it are covered and unusable in this configuration.

The two keypad portions 501, 502 and the display portion 504 are joined together by a rotatable coupling 526. This may be a single coupling mechanism 526 that runs through all three portions 501, 502, 504, such as a pin that runs through openings in each portion 501, 502, 504. This may also be two separate couplings: one that attaches the first keypad portion 501 to the display portion 504, and one that attaches the second keypad portion 502 to the display portion 504. The coupling 526 is not visible in FIG. 4, but is located in the center near the bottom edge of the example device 500.

Figure 14:
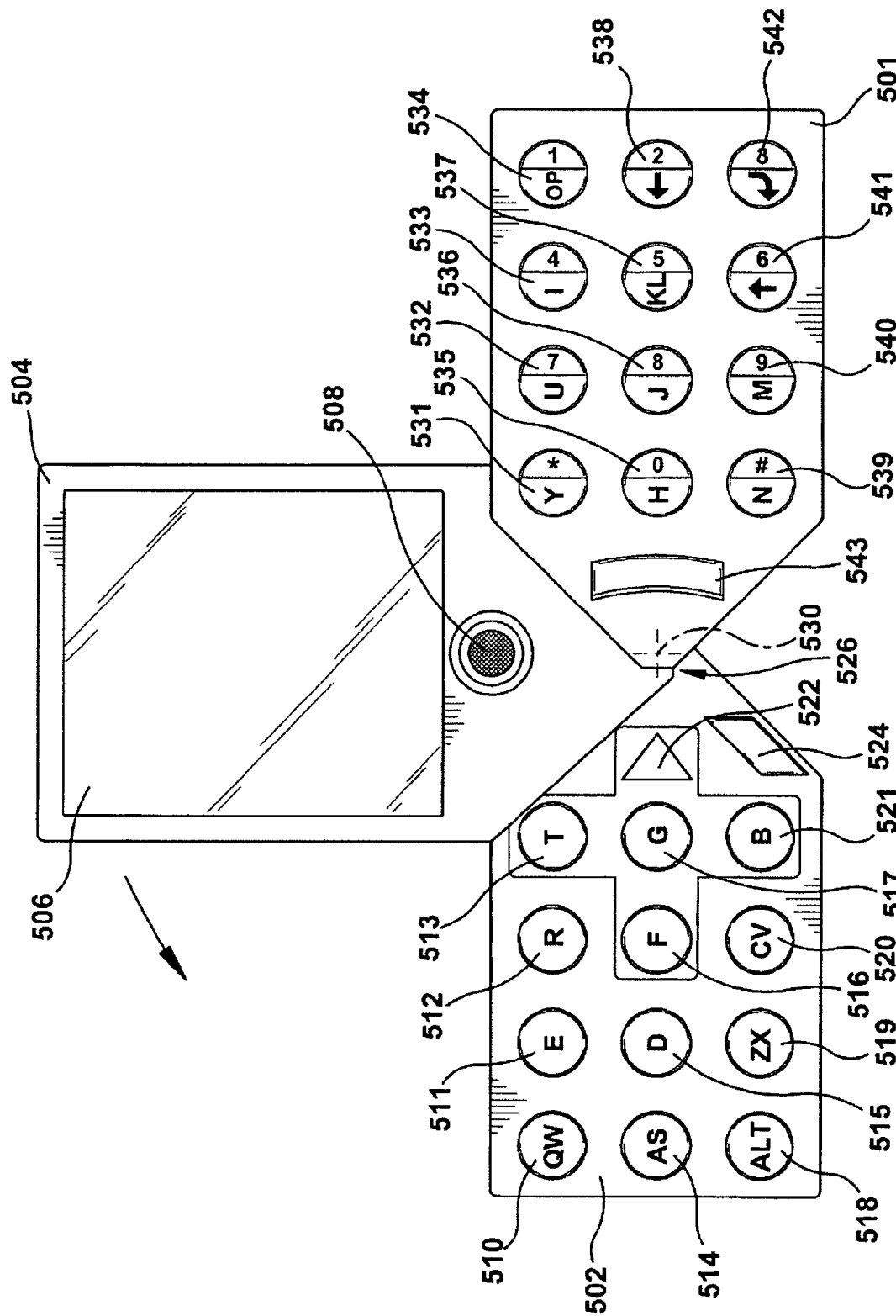
FIG. 14 shows a frontal view of the sixth example mobile device in a second configuration.

The rotatable coupling 526 allows the sixth example device 500 to be rotated into the second configuration as shown in FIG. 14. To reach the second configuration, the display portion 504 is rotated approximately 90 degrees in the counter-clockwise direction with respect to the first keypad portion 501, as shown by the first arrow 527. The second keypad portion 502 is rotated approximately 180 degrees in the counter-clockwise direction with respect to the first keypad portion 501, as shown by the second arrow 528. The axis of rotation 530 runs through the center of the coupling 526, through the front of the example device 500 where the keys 531-543 on the first keypad 501 are exposed, to the back of the device 500 that faces opposite the front of the device 500. The display portion 504 and the two keypad portions 501, 502 each face in the same direction while rotating.

In the second configuration the sixth example device 500 has three levels. The first keypad 501 is on the first level, the display portion 504 is on the second level, and the second keypad portion 502 is on the third level. In other examples, the display portion 504 could be on the first or third levels with the two keypad portions 501, 502 occupying the other levels.

Referring now to FIG. 14, the sixth example mobile device 500 is shown in the second configuration. The keys 510-523 on the second keypad portion 502 are now uncovered and exposed and available for operation by the operator. On the display portion 504 the input device 508, which in this example is a trackball, is also now available to the operator. The keys 531-543 on the first keypad portion 501 also remain available to the operator. A second set of input devices 508, 510-524, 531-543 is formed by all the input devices available to the operator in the second configuration. Other keys, thumbwheels, sliding switches, or other types of input devices could alternatively be included on the keypad portions 501, 502 or display portion 504. All of the keys that were part of the first set 508, 531-543 are also part of the second set 508, 510-524, 531-543.

The display screen 506 in the second configuration is oriented approximately 90 degrees in the counterclockwise direction when compared with the display screen 506 in the first configuration. However, because the example device 500 in the second configuration is designed to be held relative to the operator approximately 90 degrees in the clockwise direction compared to the first configuration, then the display need not change the orientation of the visual output. The display screen 506 is no longer hidden behind the first keypad portion 501 in the second configuration, and is now available for full viewing.

Figure 15:
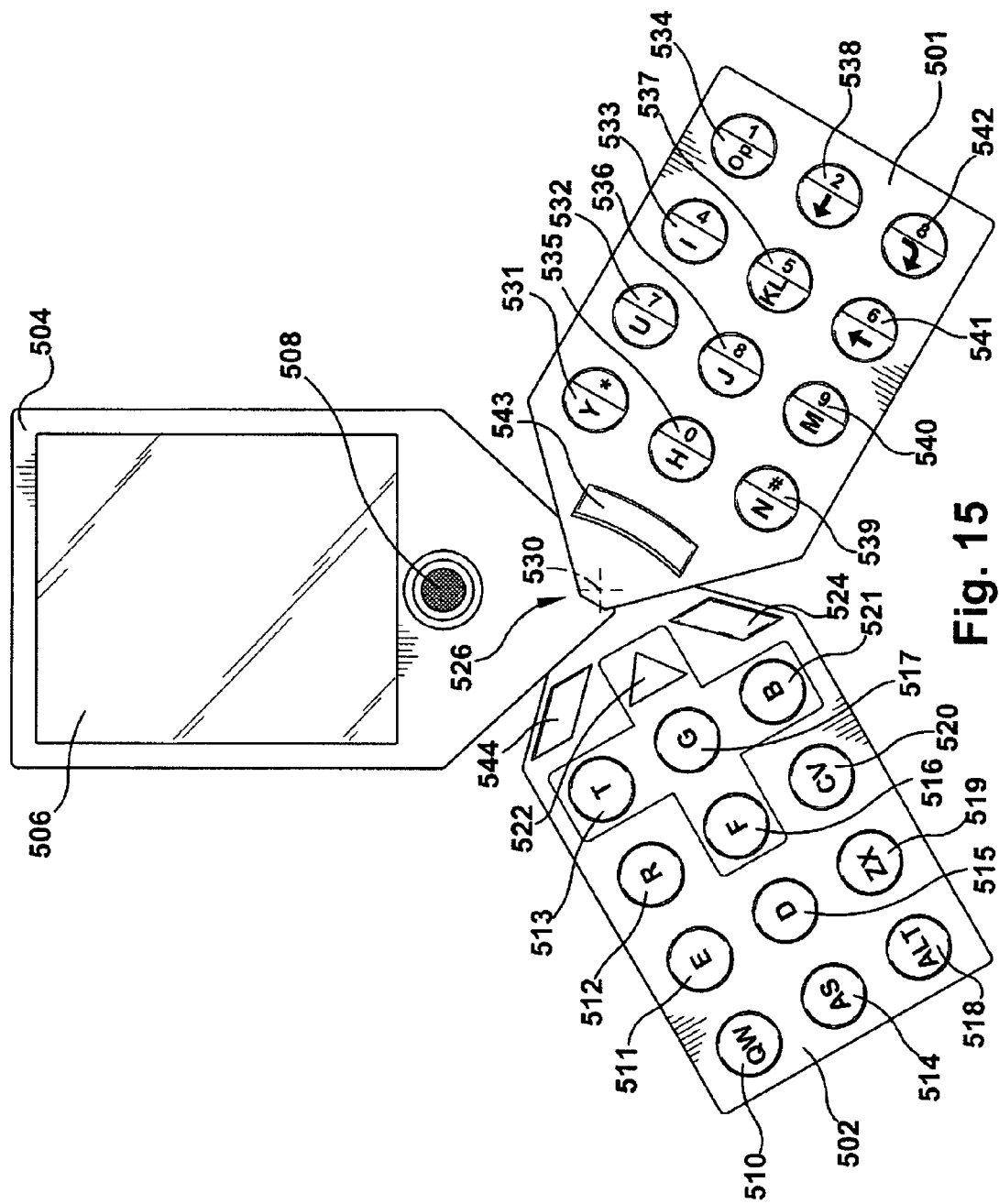
FIG. 15 shows a frontal view of the sixth example mobile device in a third configuration.

To reach the third configuration as shown in FIG. 15, the second keypad portion 502 is rotated approximately 90 degrees counterclockwise from its position in the second configuration, or approximately 270 degrees in the counter-clockwise direction from it position in the first configuration. The display portion 504 is also rotated approximately 45 degrees in the counterclockwise direction from its position in the second configuration, or approximately 135 degrees in the clockwise direction from its position in the first configuration. In this configuration each portion 501, 502, 504 is rotated approximately 120 degrees apart from the other. In the third configuration the example device 500 is designed to be held by the operator approximately 45 degrees in the clockwise direction from the second configuration.

A detent or other type of mechanism for inhibiting but not preventing movement may be used to restrict movement into and out of the first, second, and third configurations. Rotation of either of the two keypad portions 501, 502 past 360 degrees in relation to the display portion 504 is blocked to prevent excessive twisting and wear on the coupling 526 and internal electronic linkage.

In other examples a smaller angle between the two keypad portions 501, 502 may be appropriate for a larger device and a larger angle may be appropriate for smaller devices. This is because in a smaller device greater separation between the two keypads 501, 502 may be needed to accommodate ergonomic placement of the fingers without the fingers overlapping.

One extra key 545 is exposed in the third configuration. This key 545 along with the input devices of the second set 508, 510-524, 531-543 form the third set of input devices 508, 510-524, 531-544.

The folded down keypad portions 501, 502 in this example device 500 provide a different hand grip than the other example devices 1, 100, 200, 300, 400. The sixth example device 500 in the third configuration is preferably held with both hands, and the keypad portions 501, 502 are preferably gripped with the fingers curled behind and to the inside of the keypad portions and the thumbs are held above the front of the keypad portions 501, 502. This is similar to how one would hold a bicycle handle, except the thumbs are extended toward the display screen 506. This configuration is somewhat similar to the controllers that are plugged into non-mobile video game consoles. Thus, this configuration is intuitive to operators that are familiar with console video game controllers, and it is an ergonomic improvement for game playing applications on mobile devices.

A detent or other type of mechanism for inhibiting but not preventing movement may be used to restrict movement into and out of the first and second configurations. Counterclockwise rotation of the second keypad portion 502 and display portion 504 is also blocked to prevent rotating them 360 degrees back to the first configuration in the counterclockwise direction. Limiting rotation prevents excessive twisting and wear on the coupling 526 and internal electronic linkage.

The first configuration of the sixth example device 500, shown in FIG. 13, is optimized for a cellular phone application. The twelve telephony keys 531-542 are arranged in a traditional three by four configuration. This is a familiar layout that is intuitive to operators and is ergonomically favorable.

The numerals 0-9 and the characters * and # are printed on these twelve keys 531-542 so that they are substantially upright with respect to the orientation of the display screen 506 in this configuration. Because these keys 531-542 are reused in other configurations for different applications, different character indicia are also printed on the keys. The orientation provides the operator with information that when the sixth example device 500 is in the first configuration, these twelve keys 531-542 have the telephony character input function. The indicia on the twelve telephony function keys 531-542 that correspond to the cellular phone application may also be color coded so that they are all the same color, and different from the color of indicia that correspond to the other configurations. Selective lighting may also be utilized.

The remaining key 543 of the first set 531-543, can be set up for other typical cellular phone functions, such as initiate call and end call.

The top area of the display screen 506 is not covered by the first keypad portion 501 and information such as incoming phone numbers and the phone number that the operator has previously dialed or is currently dialing may be displayed in this area of the display screen 506. Since phone applications do not typically require a lot of display space, this example optimizes the space utilized according to the configuration.

When in the first configuration the sixth example device 500 automatically runs a cellular telephone application. The automatic switching of the application when the device 500 in this configuration is further explained below.

The second configuration of the second example device 500, shown in FIG. 14, is optimized for a text-entry application or group of applications. Examples of such applications include e-mail, internet browsing, instant messaging, text messaging, and word processing.

Many of the keys 510-521, 531-542 of the second set of keys 508, 510-524, 531-543 are set up in a text-entry keyboard configuration. The key layout in this example is a twenty-four key predictive text keyboard that is fully described in "Keyboard Arrangement," U.S. patent application Ser. No. 10/785,790, which is owned by the assignee of the present application, and which is incorporated herein by reference. Other key layouts are also possible, for example, traditional QWERTY, AZERTY, Dvorak, Alphabetic, and/or Function layouts.

The remaining usable keys 522, 524, 543, 544 of the second set 508, 510-524, 531-544 can be set up for other functions that are commonly used with text-entry applications. For example, one or more of the remaining usable keys 522, 524, 543, 544 could be operator customizable to run certain shortcut commands. As another example, one of the remaining keys 522, 524, 543, 544 may be used to alter the function of the text-entry keyboard keys 510-521, 531-542. For example, the altered function of these keys could allow the cellular phone mode characters to be entered by the keys labeled 531-542. It could also allow four direction cursor control by the keys 513, 516, 521, 522. The input device 508 can also be used for cursor control and other functions.

Many of the second set of input devices 508, 510-524, 531-544 have indicia that is printed so that it is substantially upright in the second configuration with respect to the orientation of the display screen 506 in the second configuration. In particular, the text-entry keyboard keys 510-521, 531-542 have a text-entry indicia printed on them that is in an upright orientation. Because some of these keys 531-543 are reused in the first configuration for the cellular telephone application, indicia corresponding to the cellular telephone application are also printed on these keys 531-542. The orientation provides the operator with information that keys 510-521, 531-542 have the text-entry function in the second configuration. The indicia on the text-entry keyboard keys 510-521, 531-542 may also be color coded so that they are all the same color, and different from the color of indicia that corresponds to first configuration. Selective lighting may also or alternatively be used. The remaining usable keys 522, 524, 543, 544 do not have indicia printed on them in this example, but in other examples, they could also have indicia that is oriented or colored to correspond to the function of the key at a particular configuration.

When the sixth example device 500 is rotated to the second configuration it may automatically run a menu application that allows an operator to select a text-entry application. In other examples, when the device 500 is rotated to the second configuration, the device 500 may automatically run a text-entry application directly, such as an e-mail application. The display size on the display screen 506 is also automatically switched from only displaying on the top area of the display screen 506 to displaying on the entire screen 506.

The third configuration of the sixth example device 1, shown in FIG. 15, is optimized for a video game application. This is similar to the video game configuration in the first example device 1. Five keys 513, 516, 517, 521, 522 are surrounded by a cross-shaped four-directional design imprinted around them. Four of these keys 513, 516, 517, 522 function as a directional controller for the video game application. To input diagonal directional commands a combination of two keys could be pressed. For example, keys labeled 513 and 522 when pressed simultaneously would input a diagonal direction. The middle key 517 may be designated to have no function, because it is likely to be inadvertently pressed when the directional controller keys 513, 516, 521, 522 surrounding it are pressed.

The remaining input devices of the third set 508, 510-512, 514-515, 518-520, 524, 531-544 are also available for inputting commands to the video game application. Because the way the sixth example device 500 in the third configuration is designed to be held, the operator's thumbs will have the most comfortable access to the keys that are nearest the rotational coupling 526, such as the keys labeled 524, 531, 535, 539, 543, and 544. The controller keys 513, 516, 521, 522 being on the left and the extra input keys 531, 535, 539, 543 on the right is a familiar layout that is intuitive and ergonomically favorable to right handed operators. Left-handed operators may find a configuration with the controller keys on the right, such as keys labeled 531, 536, 539, and 543; and extra input keys on the left, such as the keys labeled 522, 524, and 544, to be more favorable. To this end, the video game application could be operator customizable to allow the operator to select which keys they desire to use as extra input keys.

In another example, instead of using four keys 513, 516, 521, 522 for the directional control, eight keys 512-513, 516-517, 520-524, 544 could be used. This would add the benefit of having designated keys for diagonal directions.

An application signal is generated when the sixth example device 500 is in the first, second, or third configuration. This signal functions to notify the processor to change the software application to the one that corresponds to the configuration the example device 500 is currently in.

A display signal is also generated when the sixth example device 500 is in the first, second, or third configuration. This signal functions to notify the processor to change or keep the size of the display according to what configuration the example device is in.

Both the display signal and the application signal may be generated, for example, by a tilt switch that is activated when the sixth example device is rotated to the first, second, or third configuration. In other examples, the switch may be activated while in the midst of rotating between configurations. Other types of switches may also be used to generate the signal.

Just as in the other examples, by automatically switching applications when the configuration is changed, the sixth example device 500 saves the operator the time of having to press a key, a series of keys, or navigate a menu system to change to the desired application and display orientation. It also ensures that the sixth example device 500 is in the mode that the configuration has been optimized for. The sixth example device 500 may also include an operator override feature, so that the operator can choose to operate other applications in configurations that are not optimized for the application. For example, the operator may want to use the second configuration to dial a telephone number that is represented by letters, or play a game that requires text-entry in the second configuration.

Another important feature of the sixth example mobile device 500 that is shared with the other example devices, is that it reuses some input devices 508, 513, 516, 521, 522, 531-543 in more than one configuration for different functions. This allows optimizing the keypad design for multiple applications while minimizing the size and weight of the sixth mobile device 500.

Several alternative examples of the sixth device are contemplated. In one example, the second keypad portion 502 could be rotated from the first configuration 180 degrees. The microphone for the cellular phone would be located in the end of the second display portion 502 and would be closer to the operator's mouth when the device is held to the ear in this configuration. This would enhance call quality.

In another example, the first keypad portion 501 can be rotated 180 degrees. This would fully expose the display portion 504, including the input device 508 and the display screen 506. This configuration may cause an advanced cell phone application, such as a call log or personal phone book, to automatically run. These applications could be accessed more easily with the input device 508 and larger display area in this configuration.

In another example, the keypad portions 501, 502 may be joined to the display portion 504 by a coupling mechanism 526 that allows the keypad portions to rotate on three axes. For example, a joint member that allows rotation on an x axis is attached to the display portion by a coupling rotating on a y axis, then both the first and second keypad portions are attached to the joint member by a coupling that rotates on a z axis. This would allow the device 500 to be rotated to a second and third configuration where the keypad portions 501, 502, and the display portion 504 are on the same level. This may be preferable to some operators.

Yet another example combines the three-part design of device 500, and the jackknife feature of device 400, as depicted in FIGS. 16 and 17. The display portion 604 in this example has a hollow recess 605 that runs underneath the display portion 604 from one lateral side to the other and is open on the two lateral sides of the device and closed at the top. Alternatively, it may have two recesses that each are open at the two lateral sides but are closed in the middle of the device and at the top. Two keypad portions 606, 608 are rotatably connected to the display portion 604 at two pivot points 610, 612, respectively, near the middle of the bottom edge of the front side of the device.

In a first configuration, shown in FIG. 16, the two keypad portions 606, 608 are partially received into the recess 605 in the display portion 609. A single row of five or six keys 614, 616 on each keypad portion 606, 608 remains exposed on each lateral side 618, 620, respectively, of the display portion 604 in this configuration. These keys are telephony keys and the device preferably operates a cellular phone application in this configuration.

In a second configuration, shown in FIG. 17, the two keypad portions 606, 608 are rotated downward approximately 90 degrees, out of the recess 605. In this second configuration, the two keypad portions 606, 608 are aligned longitudinally with each other with the display portion 604 centered above them. There are twenty to thirty-six keys exposed in this configuration, depending on whether there are two or three columns of five or six keys on each keypad. Other numbers of keys are also possible. This number of keys allows a full QWERTY, AZERTY, DVORAK, or Alphabetic keyboard layouts or reduced keyboard layouts such as that described in "Keyboard Arrangement," U.S. patent application Ser. No. 10/785,790, which is owned by the assignee of the present application. The bottom rows 614, 616 of keys on each keypad portion 606, 608 are reused in both the first and second configurations and have a dual function of telephony and alphabetic character entry. The device preferably operates a text-entry application in this second configuration.

In each of the above-described examples, a pivot joint was utilized to connect the various parts of each device together. The pivot joint pivots or rotates in the x-y plane. The joint may alternatively be referred to as a hinge similar to the hinge mechanism in a prior art jack knife. The joint may include detents that align the rotational movement of the pivots at various steps, such as 90°, 180°, 270°, etc. The power connection between the parts can be a ribbon cable, a cable connection, or otherwise, and may or may not be part of the pivot joint. A swivel joint or ball joint could alternatively be used. A swivel or ball joint would allow movement in a third dimension or along a "Z" axis, allowing for three-dimensional movement.

VII. ADDITIONAL APPLICATIONS

In other examples, one or more of the configurations of any of the example devices 1, 100, 200, 300, 400, 500 could be optimized for other applications. For example, a police application could be set up for one configuration. This configuration would be set up to allow police to quickly communicate with their base and would allow them to easily input vehicle and driver information for doing background checks, etc. This could help improve traffic stop times and free the police up for doing other important tasks.

Another example application is a shopping mode where in one of the configurations the device 1 would connect to an in store WIFI or Bluetooth network and be optimized for shopping related functions. The device could be used to display product information when the operator came near a product or the operator could select products from a menu. The input devices would be configured to enter credit card information, preferably on a three by four numerical keypad, and to navigate menus, preferably with a thumbwheel, trackball, or some other pointing device.

A further example application is one that could be configured for a particular company. The company employees could rotate to one of the configurations and this would automatically provide access to the company's network and intranet. The company configuration would preferably be set up as a text-entry keyboard.

In some examples the device may be operator customizable so that the operator can remap input devices to desired functions in one or more configurations. For example, in one configuration the operator could choose among several applications to be automatically initiated when this configuration is reached. The operator could then choose whether the keys are to be numeric, alphabetic, or shortcut keys for certain functions. For example, an operator could customize one configuration to automatically access a stock trading website, and the operator could configure some keys to run a macro that would automatically retrieve a stock quote for a certain ticker symbol. Other keys could be designated by the operator to buy and sell.

An additional feature that may enhance any of the example devices discussed above 1, 100, 200, 300, 400, 500 is a spring loaded mechanism that would enable the operator to press a button, and the device would automatically rotate to a different configuration.

VIII. TECHNICAL DETAILS

Figure 18:
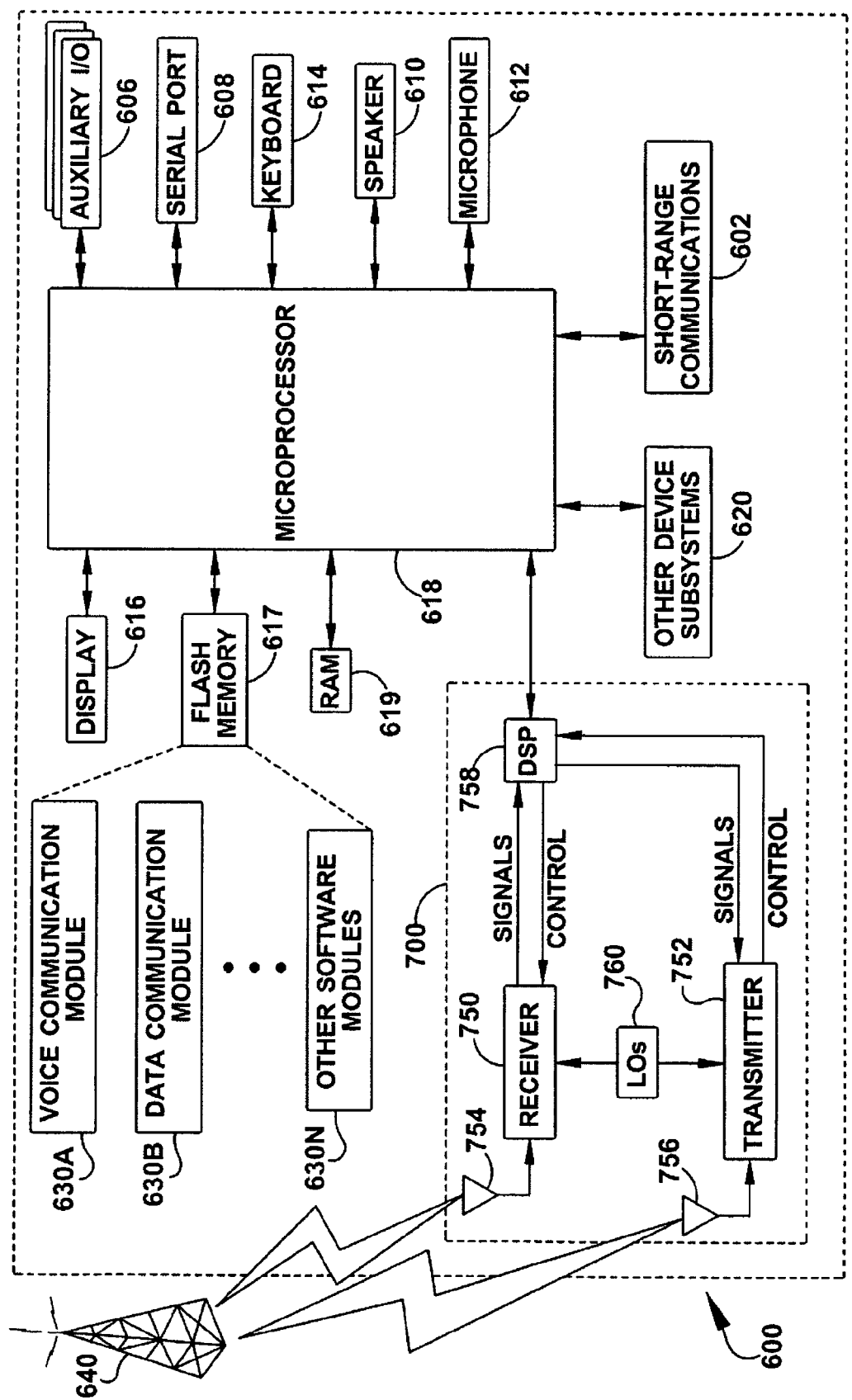
FIG. 18 is a circuit schematic that is typical of the example devices described herein.

The example mobile devices 1, 100, 200, 300, 400, 500 presented in FIGS. 1-17 include similar features, such as a housing, which includes the keyboard portion or portions and the display portion. The devices also have similar circuitry and communications systems. FIG. 18 shows the circuitry and communications systems that are common to the above examples.

The display screen 616 shown in the above examples is preferably a full graphic LCD. However, other types of output devices may alternatively be utilized. A processing device 618, which is shown schematically in FIG. 18, is contained within the device 600 and may be housed in either the display portion or the keyboard portion. The processing device 618 controls the operation of the display 616, as well as the overall operation of the mobile communication device 600, in response to actuation of keys on the keyboard 614 by the operator.

The housing may take on any of the configurations detailed above as well as other sizes and shapes. The keyboard 614 may include a mode selection key, or other hardware or software for switching between text-entry applications and telephony applications.

In addition to the processing device 618, other parts of the mobile communication device 600 are shown schematically in FIG. 18. These include a communications subsystem 700; a short-range communications subsystem; the keyboard 614 and the display 616, along with other input/output devices 606, 608, 610 and 612; as well as memory devices 617, 619 and various other device subsystems 620. The mobile communication device 600 is preferably a two-way RF communication device having voice and data communication capabilities. In addition, the mobile communication device 600 preferably has the capability to communicate with other computer systems via the Internet.

Operating system software executed by the processing device 618 is preferably stored in a persistent store, such as a flash memory 617, but may be stored in other types of memory devices, such as a read only memory (ROM) or similar storage element. In addition, system software, specific device applications, or parts thereof, may be temporarily loaded into a volatile store, such as a random access memory (RAM) 619. Communication signals received by the mobile communication device may also be stored to the RAM 619.

The processing device 618, in addition to its operating system functions, enables execution of software applications 630A-630N on the device 610. A predetermined set of applications that control basic device operations, such as data and voice communications 630A and 630B, may be installed on the device 600 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 640. Preferably, the PIM data items are seamlessly integrated, synchronized and updated via the wireless network 640 with the device operator's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 700, and possibly through the short-range communications subsystem. The communication subsystem 700 includes a receiver 750, a transmitter 752, and one or more antennas 754, 756. In addition, the communication subsystem 700 also includes a processing module, such as a digital signal processor (DSP) 758, and local oscillators (LOs) 760. The specific design and implementation of the communication subsystem 700 is dependent upon the communication network in which the mobile communication device 600 is intended to operate. For example, a mobile communication device 600 may include a communication subsystem 700 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 600.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or operator of a device. A GPRS device therefore requires a subscriber identity module, commonly referred to as a SIM card, in order to operate on a GPRS network.

When required network registration or activation procedures have been completed, the mobile communication device 600 may send and receive communication signals over the communication network 640. Signals received from the communication network 640 by the antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 640 are processed (e.g. modulated and encoded) by the DSP 758 and are then provided to the transmitter 752 for digital to analog conversion, frequency up conversion, filtering, amplification and transmission to the communication network 640 (or networks) via the antenna 756.

In addition to processing communication signals, the DSP 758 provides for control of the receiver 750 and the transmitter 752. For example, gains applied to communication signals in the receiver 750 and transmitter 752 may be adaptively controlled through automatic gain control algorithms implemented in the DSP 758.

In a data communication mode, a received signal, such as a text message or web page download, is processed by the communication subsystem 700 and is input to the processing device 618. The received signal is then further processed by the processing device 618 for an output to the display 616, or alternatively to some other auxiliary I/O device 606. A device operator may also compose data items, such as e-mail messages, using the keyboard 614 and/or some other auxiliary I/O device 606, such as a touchpad, a rocker switch, a thumbwheel, or some other type of input device. The composed data items may then be transmitted over the communication network 640 via the communication subsystem 700.

In a voice communication mode, overall operation of the device is substantially similar to the data communication mode, except that received signals are output to a speaker 610, and signals for transmission are generated by a microphone 612. Alternative voice or audio I/O subsystems, such as a voice message recording subsystem, may also be implemented on the device 600. In addition, the display 616 may also be utilized in voice communication mode, for example to display the identity of a calling party, the duration of a voice call, or other voice call related information.

The short-range communications subsystem enables communication between the mobile communication device 600 and other proximate systems or devices, which need not necessarily be similar devices. For example, the short-range communications subsystem may include an infrared device and associated circuits and components, or a Bluetooth™ communication module to provide for communication with similarly-enabled systems and devices.

A method and system for illuminating a keyboard using selective backlighting, or illumination, to indicate the input mode of the keyboard was discussed above. Selective backlighting allows different input modes to be presented to the operator by illuminating portions of the keyboard or portion of keys corresponding to selected indicia. Active portions can be highlighted, through selective illumination, in a number of ways, including illumination at different intensity levels, or with different colors. In some embodiments, selective illumination according to the present invention involves illuminating a portion of the keyboard that is active, while leaving inactive keys unilluminated. For example, in a telephone dialing application only the keys corresponding to the keys of a numeric keypad are both active and illuminated. The active keys need not form a contiguous region. For example, in certain embodiments, such as a game play or directional input mode, non-contiguous keys used to move a cursor or icon are illuminated. In other embodiments of the present invention, selective illumination takes the form of differential illumination levels for different portions of the keyboard. This allows the operator of the mobile device to view the full keyboard in low light situations, but still differentiate active and inactive portions. A further embodiment provides selective illumination for each input mode using a different illumination color. This permits an operator to readily recognize the current input mode. In another embodiment, selective illumination is used to illuminate particular indicia on each key or on selected keys. This further refinement permits the current mode of a key having multiple key assignments to be clearly indicated to the operator. Examples of these embodiments are described with reference to the figures below.

Figure 19:
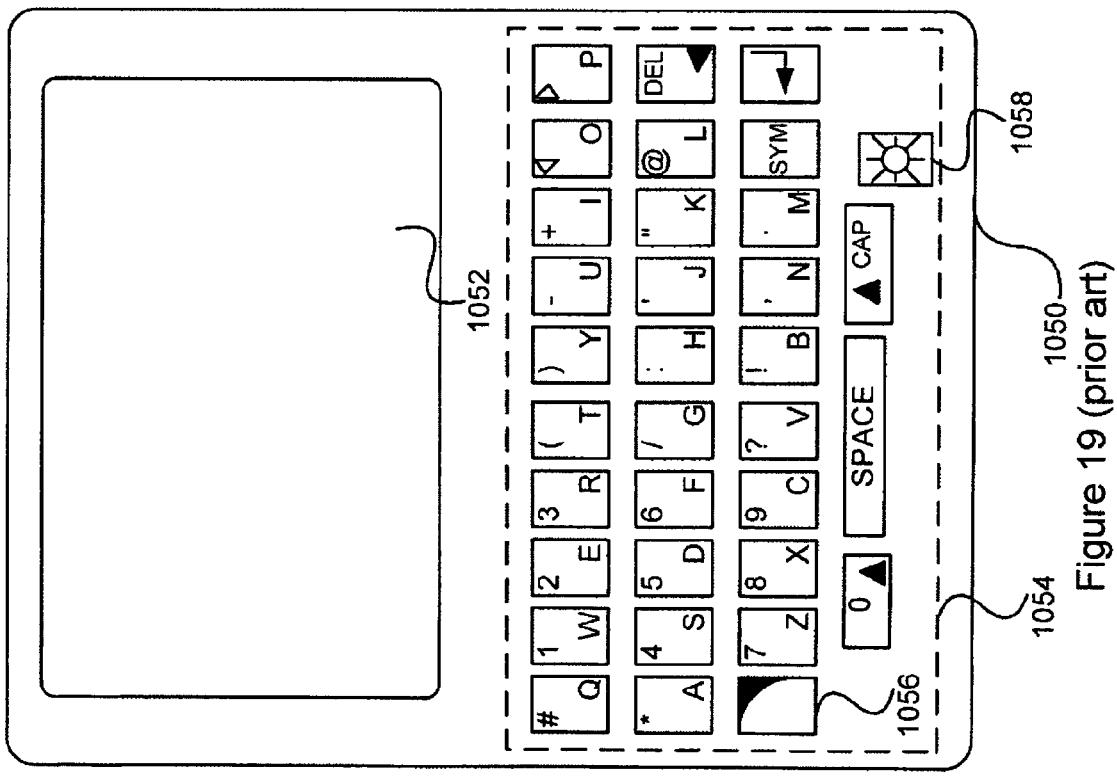
FIG. 19 is an illustration of a known mobile device.

While known implementations of keyboards for mobile devices utilize both multi-mode input keyboards and backlit keyboards, they rely upon an on-screen indicator, or context, to indicate which of the multiple input modes is active. FIG. 19 illustrates such a mobile device. Mobile device 1050 has a display 1052 and a keyboard 1054. Keyboard 1054 has a backlight key 1058 for activating the keyboard backlighting, and a toggle key 1056 used to switch between an alphanumeric, or standard QWERTY keyboard, and a non-alphabetic input mode, such as a numeric keypad. The selection of input modes can be controlled either by selection of the mode through use of the toggle key 1056, another function key, or through software. Backlight key 1058 activates a backlight mode in which both display 1052 and keyboard 1054 are illuminated. Backlighting of keyboard 1054 is typically implemented by activating a series of light sources, such as LEDs or EL sources, situated behind keyboard 1054. Alternate embodiments known in the art employ light pipes to distribute light from one or more light sources to illuminate the keyboard.

Figure 20:
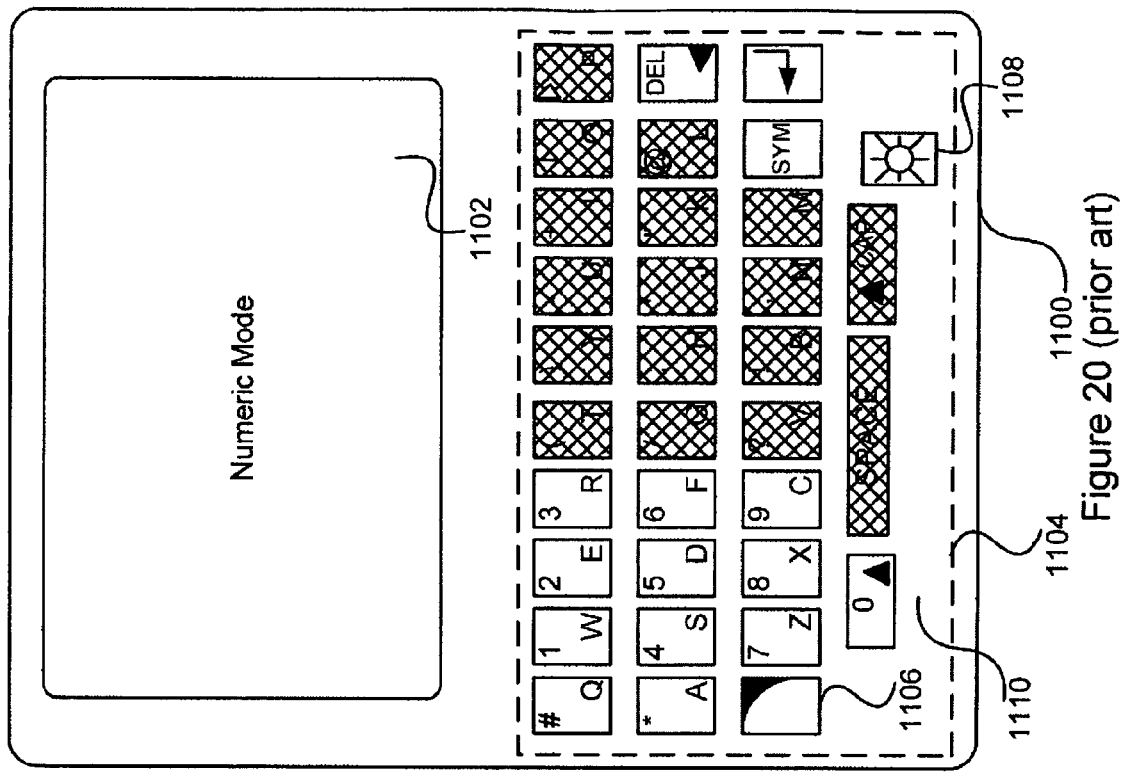
FIG. 20 is an illustration of an example mobile device embodying selective keyboard illumination.

FIG. 20 illustrates mobile device 1100 embodying selective keyboard illumination according to an aspect of the present invention. Mobile device 1100 has a display 1102 and a keyboard 1104 including a toggle key 1106 and a backlight key 1108. When mobile device 1100 executes an application such as a telephone dialer, in which only the numeric keys are active, numeric portion 1110 is illuminated, while the remainder of the keyboard remains unlit. In low light conditions this causes numeric portion 1110 to be visible, while in regular light conditions it preferably provides a visible distinction between the illuminated and unilluminated portions. When using another application, such as an email application, the entire keyboard 1104 is illuminated. In one embodiment, the operator can still use toggle key 1106 to switch or cycle between the various input modes, thereby causing the mobile device to cycle through the backlighting configurations associated with each of the defined input modes. One skilled in the art will appreciate that selective illumination can be used to either replace or augment on screen indication of the active mode.

Figure 22:
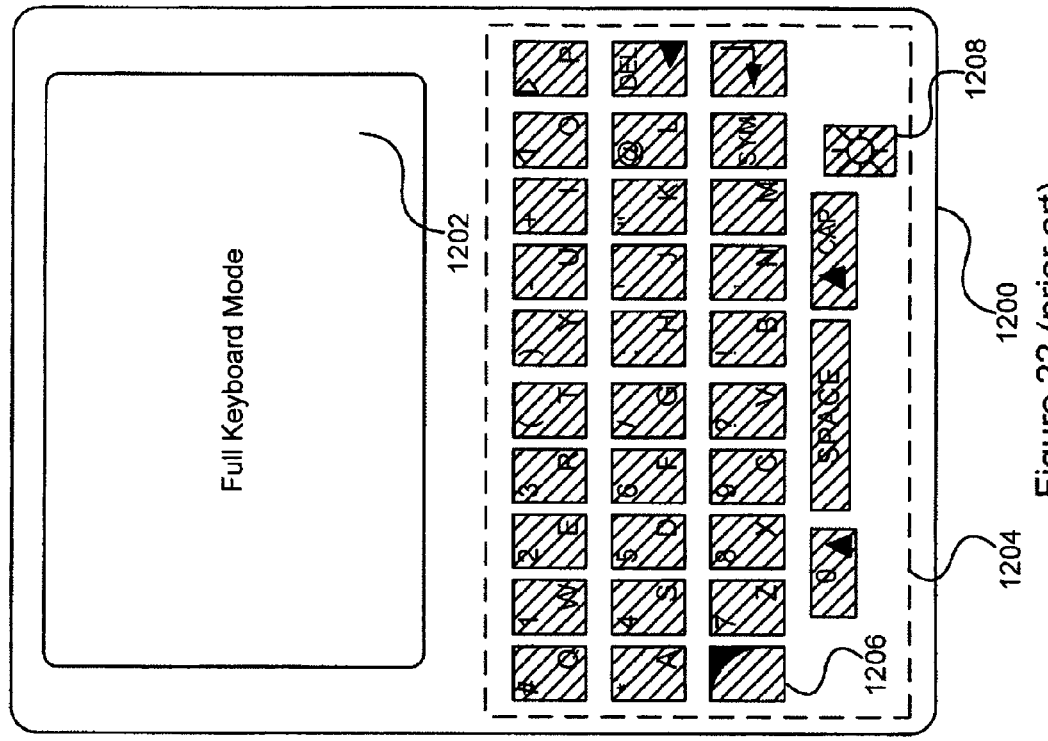
FIG. 22 is an illustration of the example mobile device of FIG. 21 in a full keyboard mode at an intermediate illumination level.
Figure 21:
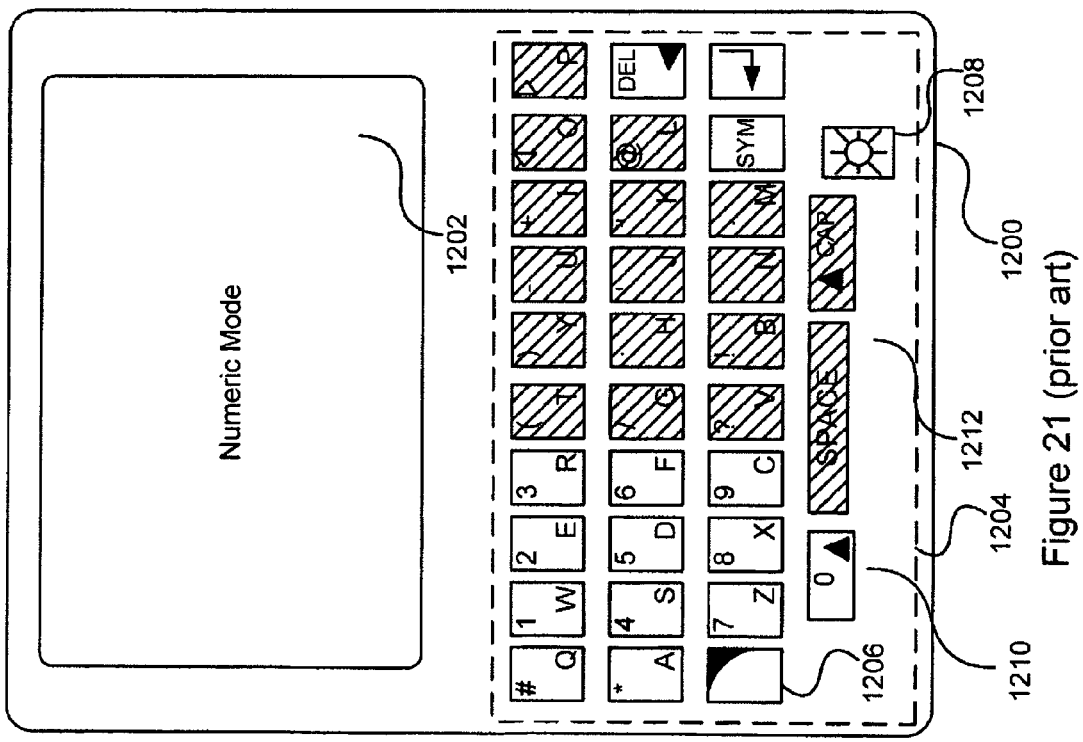
FIG. 21 is an illustration of an example mobile device in a numeric mode with differentiated illumination levels.

FIG. 21 illustrates a keyboard using different illumination levels to indicate the active portion of the keyboard. As above, the mobile device comprises a display 1202 and a keyboard 1204 having a toggle key 1206 and a backlight key 1208. In contrast to the embodiment of FIG. 20, mobile device 1200 provides multiple levels of illumination to portions of keyboard 1204. Thus in a numeric mode, the non-numeric portion 1212 can be backlit to an intermediate illumination level, and numeric portion 1210 can be backlit at a higher illumination level to provide the operator of mobile device 1200 with the ability to view all the keys in low light conditions, but still know that the numeric keypad is active. FIG. 22 illustrates the keyboard of FIG. 21 in a full keyboard mode, where the entire keyboard 1204 is backlit at the intermediate level. Such differential illumination can also be provided as an optional mode for the embodiment described with reference to FIG. 20, to provide three different illumination modes.

Another embodiment of the present invention is illustrated in FIGS. 23 and 24. FIG. 23 illustrates mobile device 1300 with a display 1302 and a keyboard 1304 having a toggle key 1306 and a backlight key 1308. Keyboard 1304 is in an alphabetic input mode. In this mode, selective backlighting is employed to illuminate only the alphabetic portion of keys having multiple key assignments. Thus portion 1314 corresponding to the alphabetic portion of a key is illuminated while the remainder of the key is unilluminated. FIG. 24 illustrates the keyboard of FIG. 23 in a non-alphabetic mode where selective backlighting is employed to illuminate the non-alphabetic portion of each key, so that illuminated key section 1314 corresponds to the non-alphabetic portion of a key, while the remainder of the key remains unlit.

One skilled in the art will appreciate that the selective illumination of key portions can equally be employed for illuminating key portions only in an active keyboard portion such as numeric portion 1110 of FIG. 20 when only a subset of keys in keyboard 1304 are needed. For example, in one implementation, a telephone dialer application would preferably cause only the numeric values of keys in keyboard 1304 to be illuminated. Additionally, the illuminated portion of the keys in keyboard 1304 would preferably change as the operator used toggle key 1306 to switch between input modes. The operator can preferably deactivate the backlight through use of backlight key 1308. In a refinement of this embodiment, the alphabetic and non-alphabetic values of the keys are illuminated by backlights of different colors. This allows the alphabetic and non-alphabetic input modes to be easily distinguished from each other by assigning a different color to each of the input modes, for example the alphabetic values may be illuminated by a blue light, while the non-alphabetic values are illuminated by a red light. One skilled in the art will readily appreciate that any arrangement of colors can be used, employing known color illumination methods. One such embodiment provides partial illumination of each key, with all related key sections illuminated by the same light source, and coloration provided through the use of filters in the keys. In an alternate embodiment, alphabetic key portions are illuminated by a colored light source, while the non-alphabetic key portions are illuminated by a differently colored light source. The light source in the above examples can be either local, or remote as described earlier.

It should be noted that the coloration difference does not have to be strictly related to alphabetic and non-alphabetic values, as it can be applied to different keyboard portions. For example, a numeric keypad can be illuminated using one color when a keypad mode is involved, and the full keyboard can be lit in a different color when a full keyboard mode is employed. Similarly, the multi-colored backlighting of different portions of keyboard 1104 can also allow enhanced game control in a gaming mode, by providing different colored keys depending on the game function they control.

Figure 26:
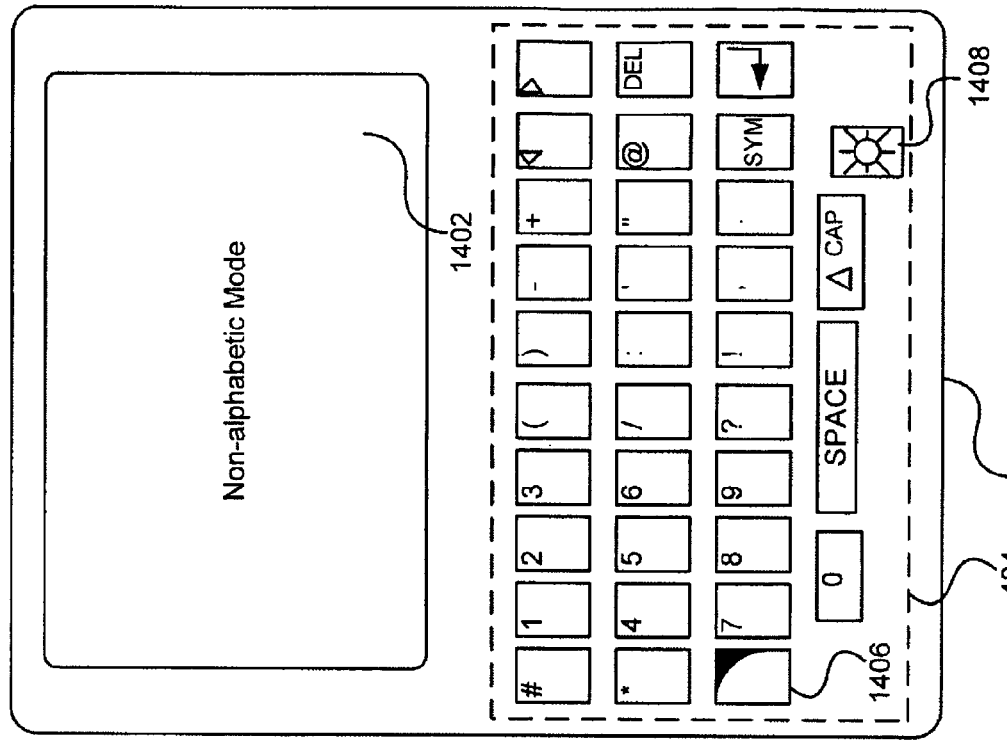
FIG. 26 is an illustration of the example mobile device of FIG. 25 in a non-alphabetic mode.
Figure 25:
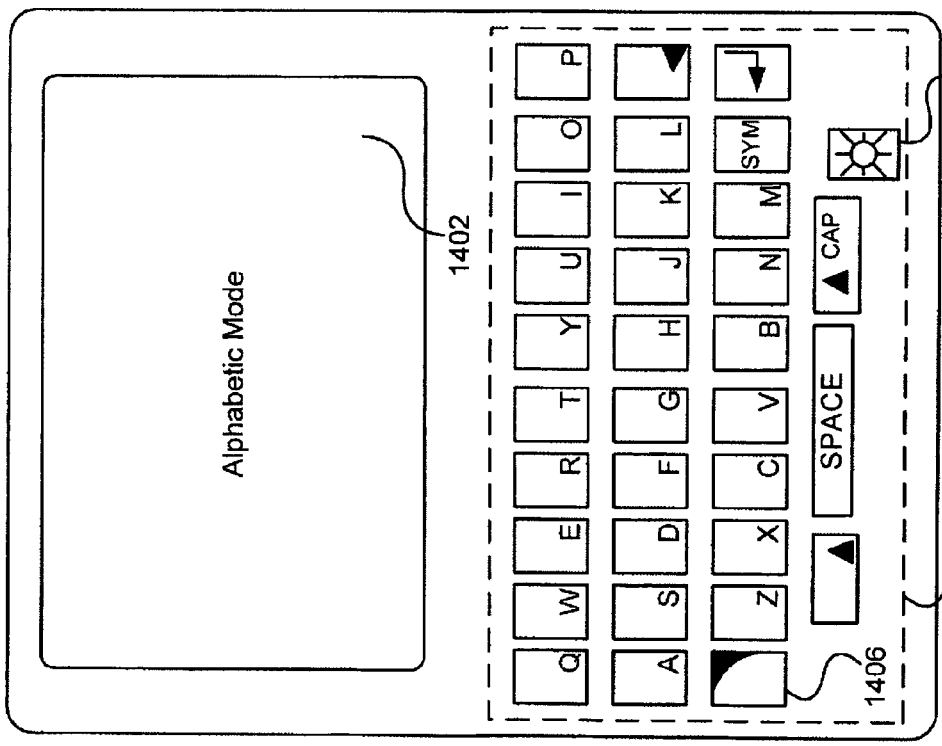
FIG. 25 is an illustration of an example mobile device enabled for selective keyboard illumination.

FIGS. 25 and 26 illustrate a further embodiment of the present invention on mobile device 1400. The mobile device 1400, like those described above, includes a display 1402 and a keyboard 1404 having a toggle key 1406 and a backlight key 1408. Through any of a number of techniques, including light cancellation and the use of different phosphors or composites, differential illumination can be utilized to not only illuminate one of the selected input modes, but also to cause the other input values assigned to a key to fade or become substantially invisible. Thus, keyboard 1404 in the embodiment of FIG. 25 only shows the alphabetic values for its illuminated keys. In contrast the same keyboard 1404 in FIG. 26 obscures the alphabetic values of the illuminated keys and displays only the non-alphabetic values. The obscuring of key values allows a plurality of values to be assigned to a single key while minimizing the chance of operator confusion as to what the active input mode is. Thus, mobile device 1400 can have a plurality of key assignments invoked by different modes. For example in an unillustrated gaming mode, the keys would display only directional arrows and game controls, while these key assignments would be obscured in other modes. As noted, this embodiment can be implemented through the use of optical cancellation, or through the use of different phosphors that illuminate, and distinguish themselves from the natural color of a key, under different lighting conditions. One skilled in the art will readily appreciate that a number of other such approaches can be implemented to achieve this result. One such approach is the use of characters colored a neutral shade to match the color of the key. Under backlighting, the characters become visible. To improve optical cancellation, a light sensor can be provided in device 1400 to detect the ambient light conditions. Variable strength light sources, responsive to the detected light conditions, can then be used to adjust the light levels and improve optical cancellation effects. One skilled in the art will appreciate that backlight key 1406 and toggle key 1408 operates as they did in previously described embodiments.

Figure 27:
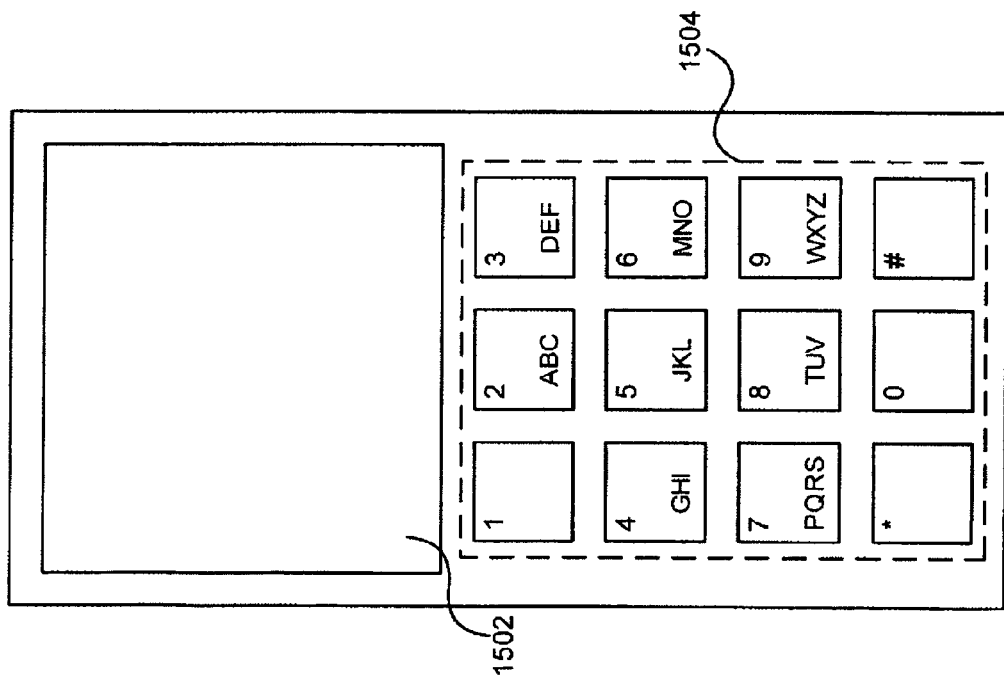
FIG. 27 is an illustration of a known mobile device with a keypad.

FIG. 27 illustrates a known mobile device 1500 having the form factor of a standard cellular phone handset. Mobile device 1500 has keypad 1504 in the form of a standard telephone keypad with alphabetically-ordered alphabetic key assignments and display 1502.

Figure 28:
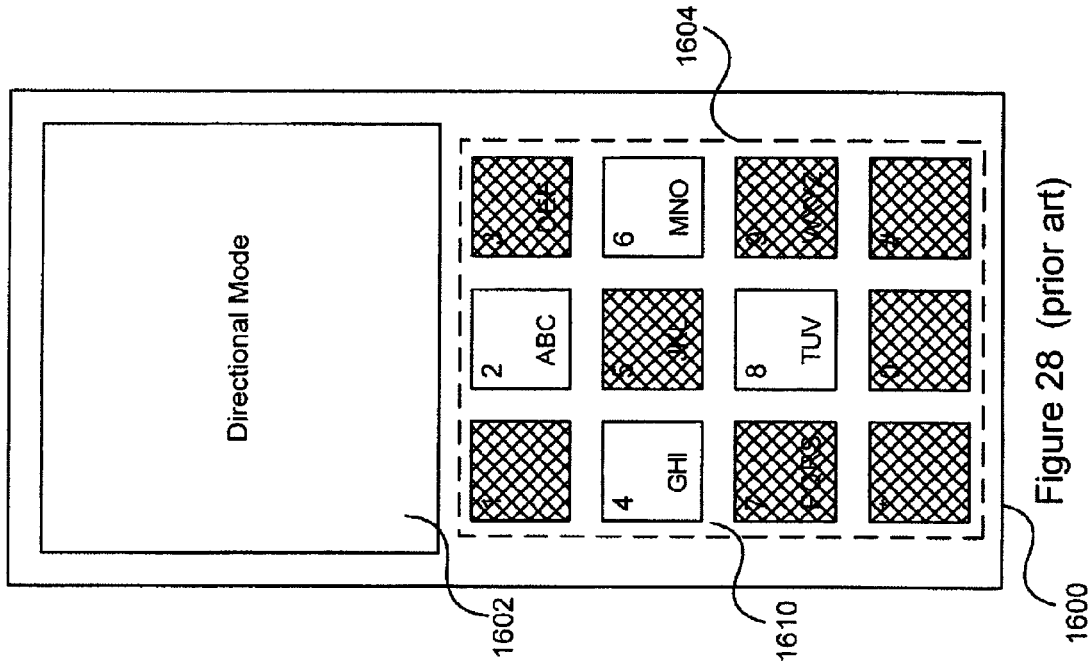
FIG. 28 is an illustration of an example mobile device having selective keyboard illumination in a directional mode.

In accordance with an aspect of the present invention, FIG. 28 illustrates a handset, as in FIG. 27, in a directional mode, for use in such applications as game play modes and for navigating web pages. Mobile device 1600 has keypad 1604 and display 1602. In its presently illustrated state, mobile device 1600 is in a directional mode and provides a directional control pad through illuminated keys 1610 on keypad 1604. Such a directional mode is achieved using selective illumination techniques as described above. The embodiment of FIG. 28 clearly illustrates the application of selective illumination of keys in a designated keyboard portion for illuminating active keys as designated, for example, by a software application executed on a device.

Figures 29, 30:
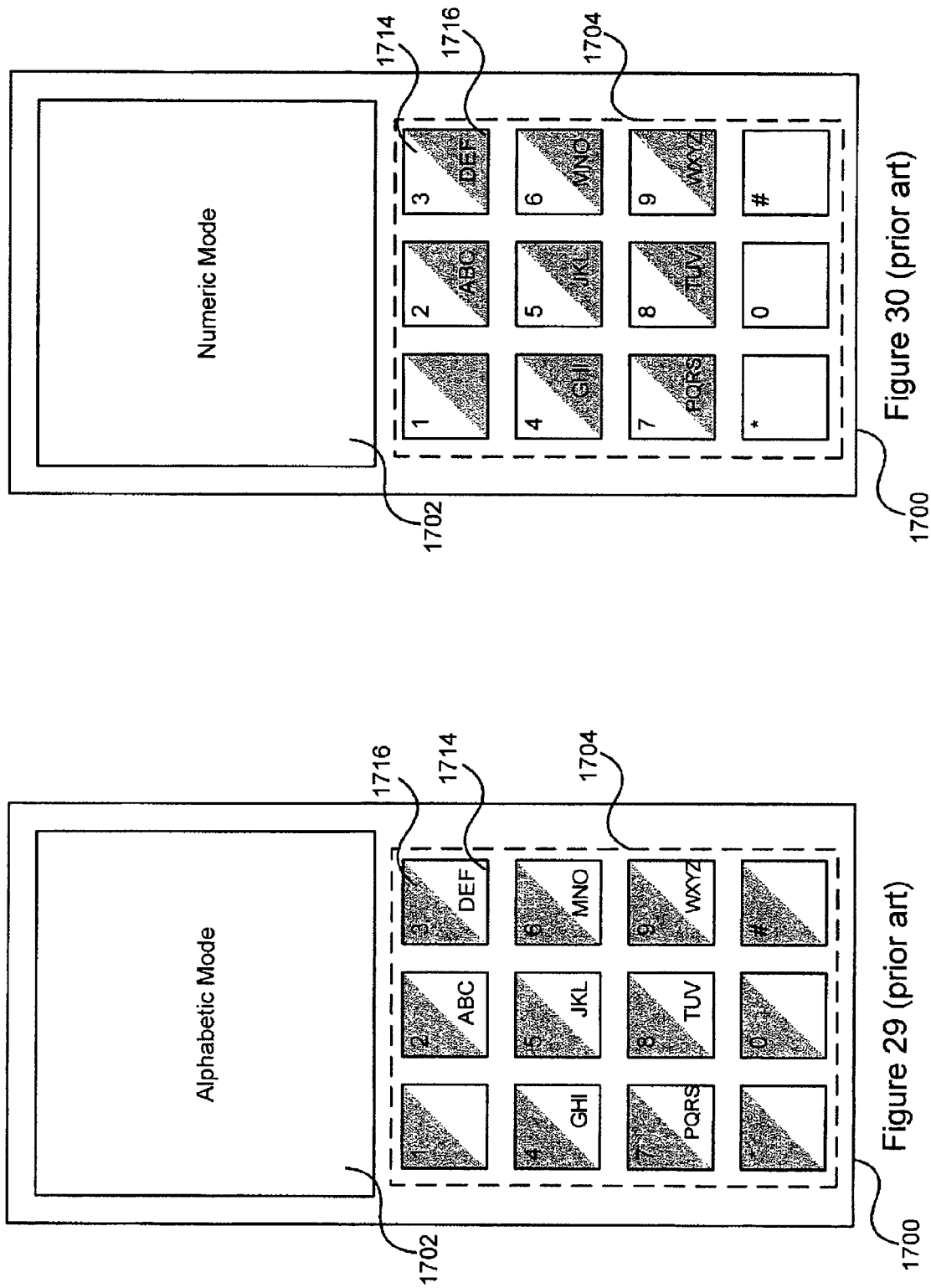
FIG. 29 is an illustration of an example mobile device in an alphabetic mode with partial key illumination.
FIG. 30 is an illustration of the example mobile device of FIG. 29 in a numeric mode.

FIGS. 29 and 30 illustrate the illumination of key portions 1714 on keypad 1704 of mobile device 1700 to distinguish between the active modes of keypad 1704 in a manner described in relation to FIGS. 23 and 24. In the alphabetic mode shown in FIG. 29, the illuminated key portion 7114 of each key on the keypad 1704 corresponds to an alphabetic portion of the key, whereas the non-illuminated portion 1716 corresponds to a numeric portion of the key. In the numeric mode shown in FIG. 30, the portions 1714 and 1716 are reversed, such that numeric portions of keys are illuminated. One skilled in the art will readily appreciate that either a single color illumination, or multi-colored illumination of each key in keyboard 1704 can be implemented using known methods, including those discussed with relation to mobile device 1300 as illustrated in FIGS. 23 and 24. One skilled in the art will additionally appreciate that the selective illumination technique described with respect to FIGS. 25 and 26 can be applied to a mobile device 1700 having the form factor of a cellular phone handset without difficulty, and without departing from the scope of the present invention.

Figure 31:
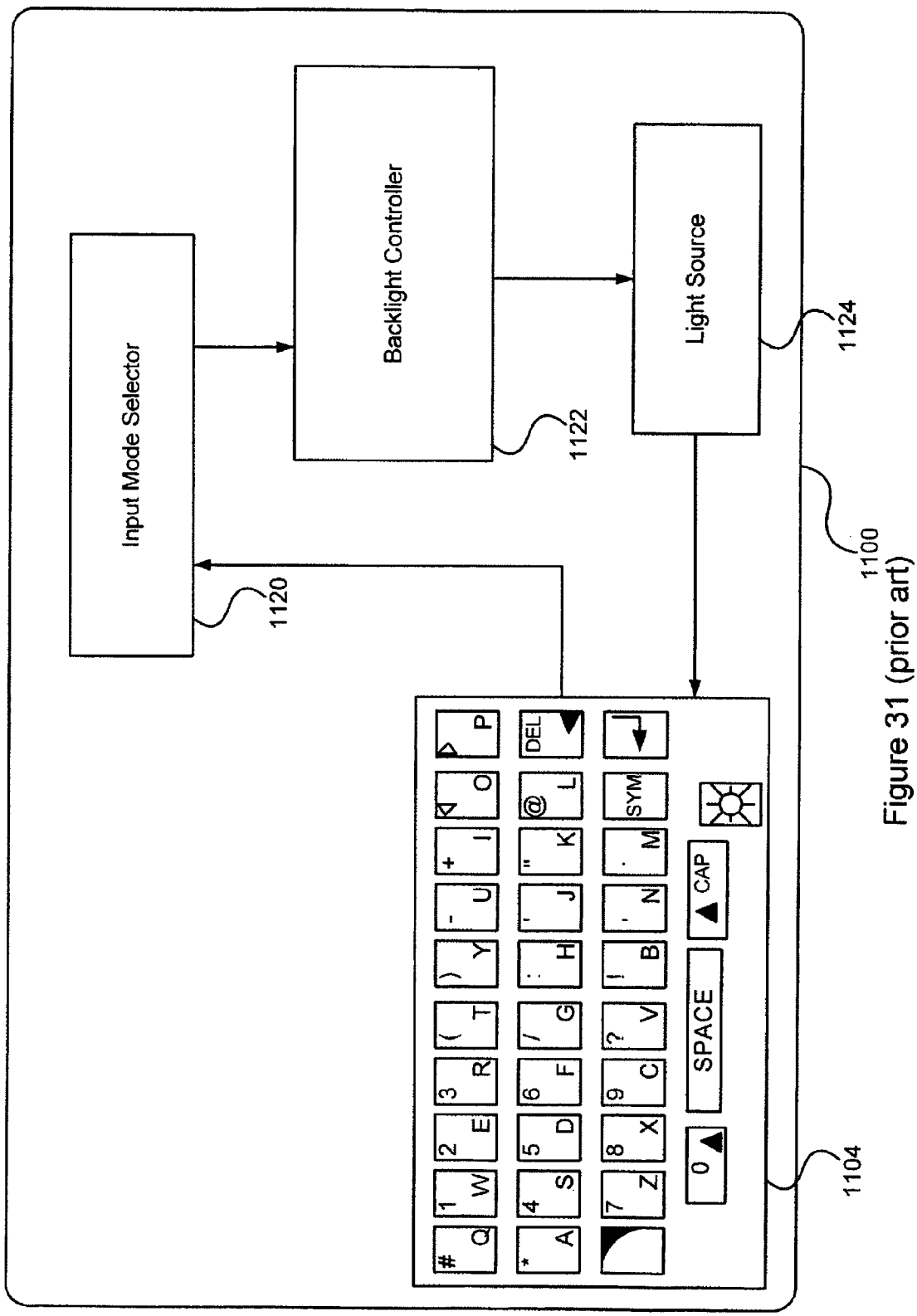
FIG. 31 is a block diagram of an example mobile device incorporating a selective keyboard illumination system.

FIG. 31 is a block diagram of mobile device 1100 illustrating an implementation of a selective keyboard illumination system. Backlight controller 1122 is used to control light sources 1124 so that the active portion of keyboard 104 is illuminated. The determination of which portion of the keyboard 1104 is the active portion is made by input mode selector 1120, which then provides backlight controller 1122 with an indication of the active portion. The determination of the active portion is made based on any of a number of factors, including, for example, the software application executed by mobile device 1100, the operator's selection of an input mode through use of toggle key 1106, and backlight key 1108. As described above, the application executed by mobile device 1100 can set a preferred active mode, for example an email application may default to alphabetic mode, that the operator can override through use of toggle key 1106. In addition, in some embodiments, the operator can change the backlighting of the non-active portion of the keyboard 1104, as illustrated with respect to the embodiment of FIG. 21, through use of the backlight key 1108. The active portion may refer to either an active portion of the keyboard or an active key portion as previously described.

Thus, in response to a number of factors, which may include the application executed by mobile device 1100, and operator-defined input received through keyboard 1104, input mode selector 1120 determines an active mode and provides backlight controller 1122 with indication of the active mode. The communication between input mode selector 1120 and backlight controller 1122 can be facilitated by a number of known techniques, including the use of a direct communication line for transmitting an encoded signal indicating the selected active mode, and the use of predetermined registers to indicate one of a number of predetermined active modes.

Upon receipt of the active mode from input mode selector 1120, backlight controller 1122 controls light source 1124 to selectively illuminate keyboard 1104. In a first embodiment, corresponding to FIG. 20, upon receiving indication that the active input mode is a numeric mode, backlight controller 1122 activates a set of backlights under the portion of keyboard 1104 corresponding to the numeric portion, illustrated as 1110 in FIG. 20. Upon receipt of an indication that the active input mode is the full keyboard mode, backlight controller 1122 activates all the backlights behind keyboard 1104. In another embodiment, the backlight controller 1122 controls remote light sources that provide illumination to the keys through the use of light pipes. In embodiments such as the embodiments of FIGS. 23 and 24, backlight controller 1122 controls light source 1124 to illuminate portions of keys in keyboard 1104 that correspond to the active portion. One skilled in the art will appreciate that the use of different colored light sources or the illumination of different portions of keys can be achieved through the use of known techniques.

Input mode selector 1120 and backlight controller 1122 can be implemented either as standalone components, or as software modules executed by the processor of mobile device 1200. As standalone components, input mode selector 1120 and backlight controller 1122 can be implemented as software specifically designed as firmware for execution on a specified hardware platform. Alternatively, input mode selector 1120 and backlight controller 1122 can be designed as algorithms in an operating system executed by the processor of mobile device 1100, or they can be stored as firmware routines that can be called by the operating system executing on the processor of mobile device 100. Those skilled in the art will appreciate that the implementation details provided above are merely exemplary, and any number of implementations can be employed where the functionality of the assigned logical blocks is spread between a number of different elements without departing from the scope of the present invention.

Figure 32:
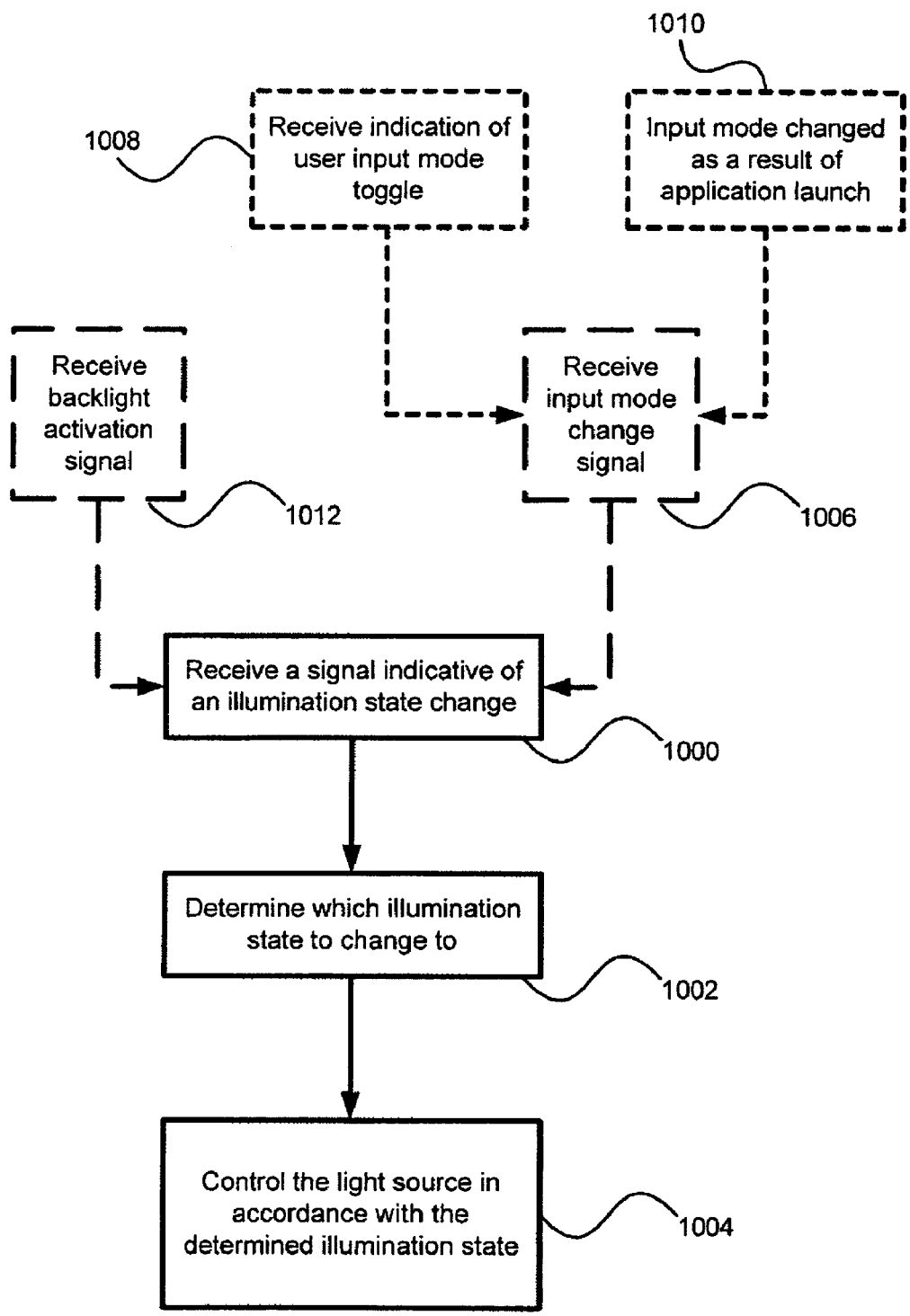
FIG. 32 is a flow diagram of an example mobile device illustrating a process for selective keyboard illumination.

FIG. 32 illustrates a method according to an embodiment of the present invention. In step 1000, a control system, such as the system illustrated in FIG. 31, receives a signal that indicates that the illumination state is to be changed. In step 1002, a determination of which of the plurality of illumination states is to be selected is made. One skilled in the art will appreciate that different signals received can be received in step 1000. Each of these signals is interpreted in a different manner, so that, for example, a first signal is interpreted as indicating the next state in a cycle of states is to be selected, while another signal is interpreted as indicating that a specific illumination state is to be selected. In step 1004, the light source used to illuminate the keyboard, such as light source 1124 illuminating keyboard 1104, is controlled to provide the illumination state determined in step 1002. Thus, step 1004 allows a mobile device, such as one of the mobile devices embodying aspects of the present invention previously described, to se110lectively illuminate the keyboard. As described above the selective illumination can take the form of illuminating portions of the keyboard using different colors, different illumination levels or combinations of the two.

As illustrated in FIG. 32, step 1000, where a signal indicative of an illumination state change is received, can optionally include receiving a signal indicative of an input mode change 1006. The receipt of this signal in 1006 is typically in response to the receipt of an indication that the operator has toggled the input mode, as shown in step 1008, or in response to the execution of an application that has a default data entry mode, as shown in step 1010. The indication that the operator has toggled the input mode is typically received in response to actuation of the toggle key 1106. Alternately, step 1000 can optionally include the receipt of a backlight activation signal 1012, which is typically received in response to operator actuation of the backlight key 1108. One skilled in the art will appreciate that a number of other events can result in the receipt of a signal indication of an illumination state change including timed events and detection of ambient light conditions.

IX. ADDITIONAL EMBODIMENTS

In addition to the embodiments presented above, further embodiments are presented below. A feature-focus of these embodiments is how the display and keyboard portions or panels of the device are interconnected to facilitate transition of the device between the requisite compact and expanded configurations.

As shown in at least FIGS. 4, 5, 33 and 34, the handheld device is configured to be capable of being oriented in at least two configurations. (Reference numbers as applied herein will refer to FIGS. 33 and 34, but corresponding numbers in the 100 series, where applicable, can be located above in the description relating to FIGS. 4 and 5.) In a first compact orientation, the front face of the handheld device 800 when oriented for use includes a display screen 806. While other components might be arranged on the front face of the device 800, the display 806 takes up a substantial portion of the front face of the device 800. As shown, additional components, including speakers 822, a navigation tool such as a trackball 808, selection buttons 852, input keys (FIG. 4) and other user input devices, can be positioned on the front face of a compact-configured device 800 (FIG. 33.

Figure 33:
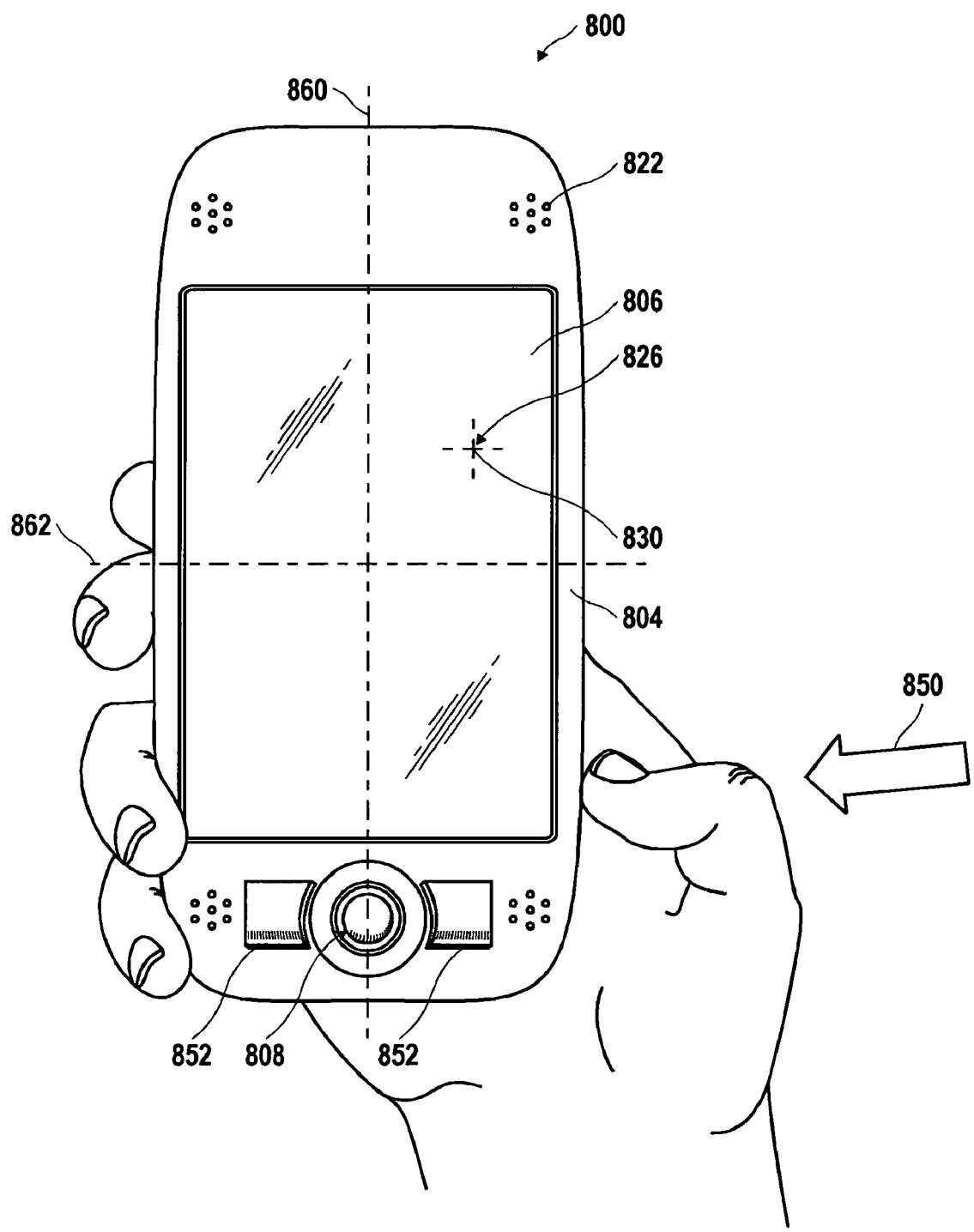
FIG. 33 is an example handheld electronic device oriented in a compact configuration.
Figure 34:
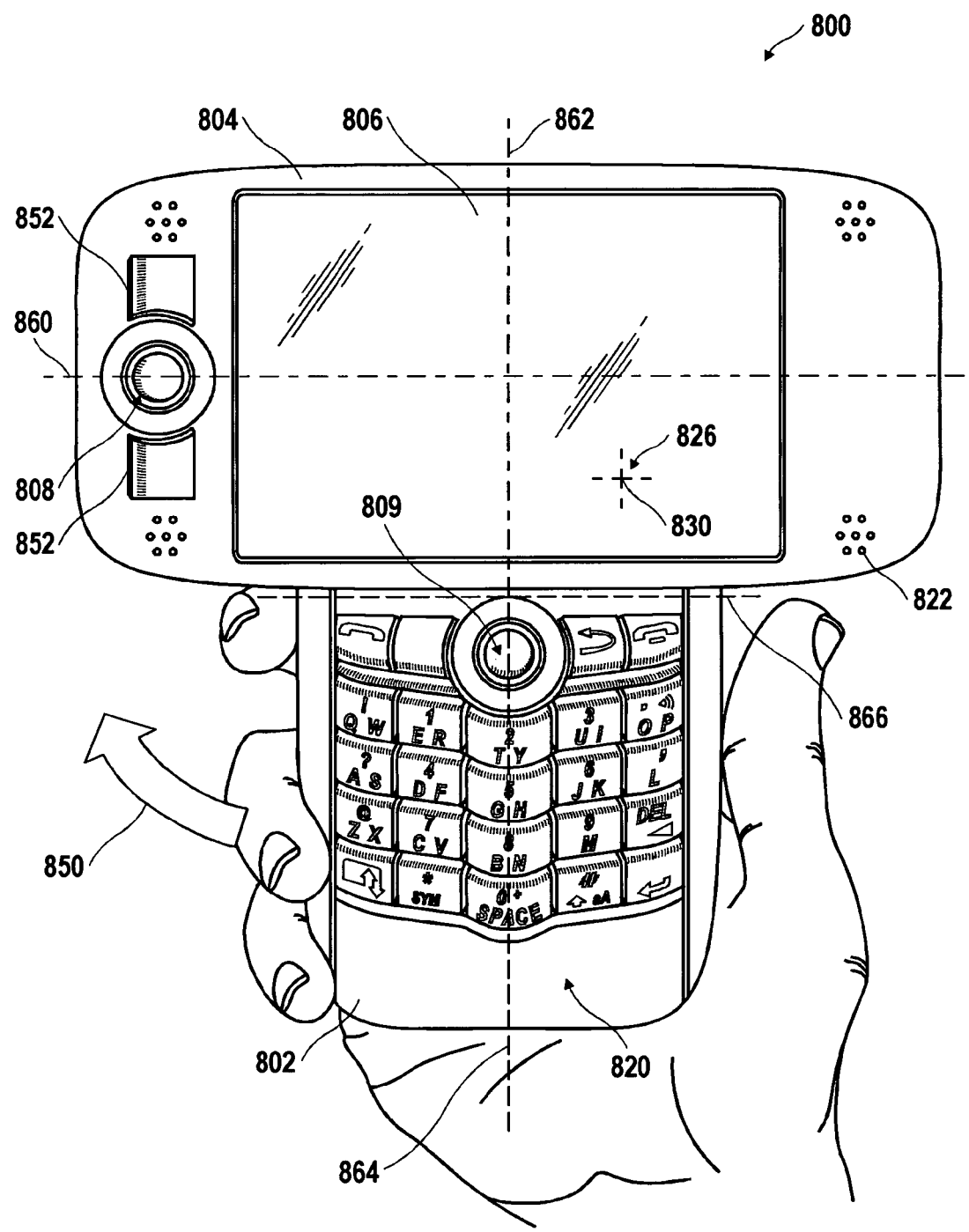
FIG. 34 is an example handheld electronic device oriented in an expanded configuration.

The handheld device 800 includes a display panel 804 capable of rotating relative to a keyboard panel 802 between a compact configuration shown in FIG. 33 and an expanded configuration shown in FIG. 34. The device 800 is arranged such that different modes of operation of the device 800 can be facilitated by proper configuration of the device 800. For example, the device 800 can be configured such that it is more easily operated as a telephone when in the compact configuration. Additionally, the device 800 can be configured and equipped such that in the expanded configuration, text entry is facilitated. While the examples given above are in relation to text entry and telephone operation of the device 800, other modes of operation of the device 800 are contemplated. Examples of these other operational modes include, game playing, video watching, and internet surfing, just to name a few. A common characteristic of each of these additional modes of contemplated device use is that with respect to related video display, wide-screen viewing is preferable. It should be appreciated that the device is not necessarily limited to executing certain applications in particular device configurations, but there are aspects of many applications and operational modes that make them respectively suited to one or the other of the compact and expanded operational configurations of the device 800.

Where text entry and telephone operational modes are concerned, special design aspects are considered that bear on optimized design criteria that accommodate properly sizing the device 800 when operated in either the telephone or text entry modes. One important aspect in designing a handheld device 800 capable of both modes of operation is the sizing of the display screen 806. Regarding text entry applications (email, contacts, note-taking etc. . . . ) versus telephone applications, the desired aspect ratio (width-to-height) of the display screen 806 is typically different. Additionally, when placing a telephone call, holding the handheld device 800 in a position such that an operator can comfortably hold the device 800 against his/her ear is desirable. Thus, when considering the telephone mode, it is desirable to configure the device 800 such that its length is greater than its width. As shown in FIG. 33, this permits the display screen 806 to easily have a height greater than its width. However, when designing a display screen 806 for text entry or viewing other data, it is typically desirable to have the aspect ratio arranged such that width of the display screen 806 is greater than the height of the display screen 806.

In some embodiments, the display screen 806 and the size of the device 800 can be based upon a desired aspect ratio of the display screen 806 for the contemplated applications to be executed on the device 800. For example, the display screen 806 can be sized to provide a widescreen display having an aspect ratio of 16:9 (width-to-height). When held in a landscape orientation, the longer side of the display screen 806 is its width. In this particular orientation and configuration, the screen 806 is optimized for viewing movies, videos or other visual content formatted for that particular aspect ratio. Likewise, the aspect ratio can be 4:3 in the landscape orientation. This orientation is the same as a standard display. In yet another embodiment, the display 806 can have an aspect ratio of 1.6:1, which is similar to standard computer display screens. While these aspect ratios are provided above as examples, other configurations suited for widescreen viewing in at least one orientation are considered acceptable for the currently disclosed implementations.

The overall size of the device 800, which varies between the compact and expanded configurations, is also designed to the correspondingly desired aspect ratios of the display screen 806 in dependence upon the intended applications to be run thereon in the respective configurations. For example, it is often desired to keep the width of the device 800 less than eight centimeters to accommodate an operator cradling the device 800 in one hand, and more particularly, to enable single-handed thumb typing on an incorporated keyboard.

Figure 35:
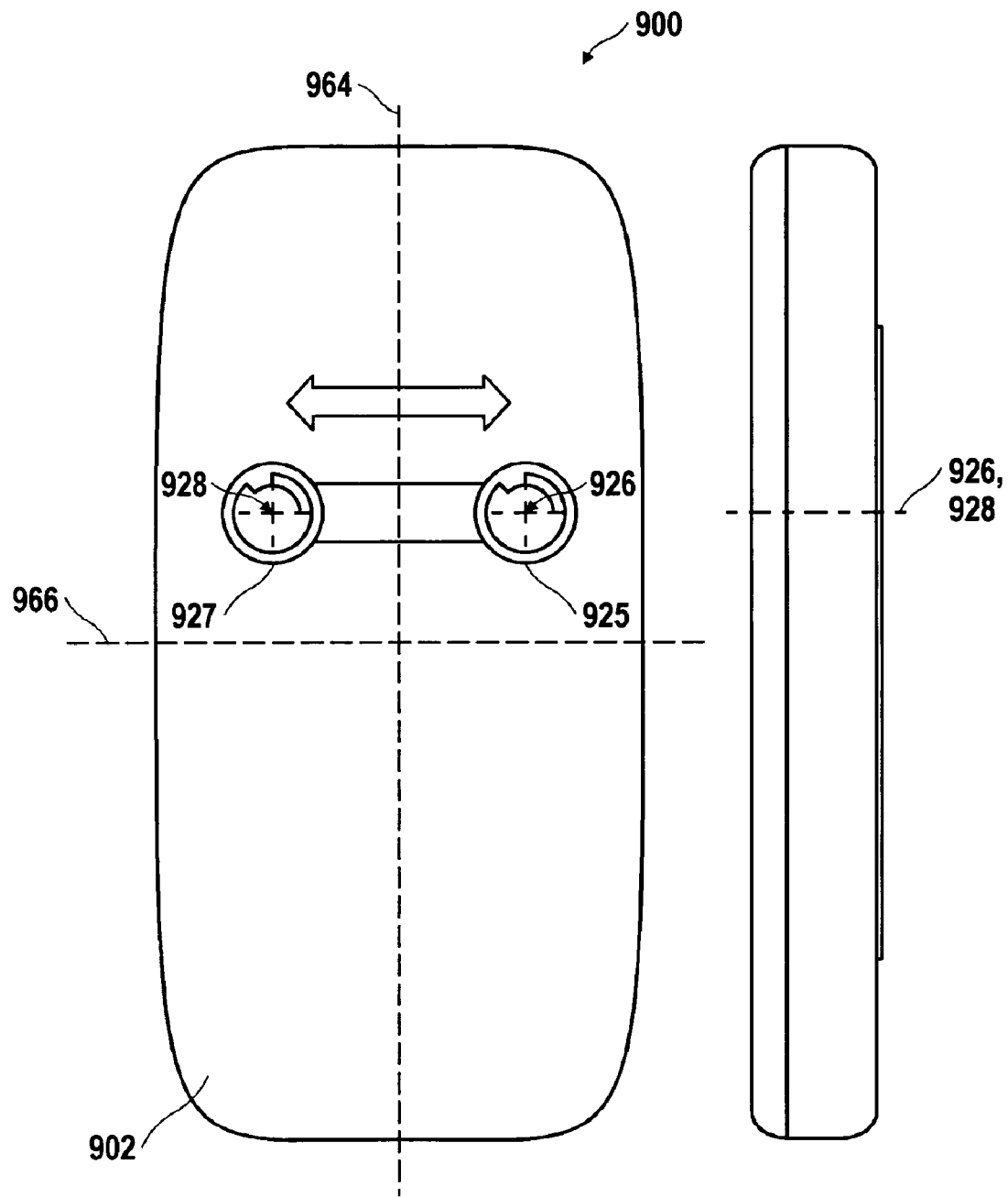
FIG. 35 is a rear view and side profile view of a keyboard panel showing two rotary connections.
Figure 36:
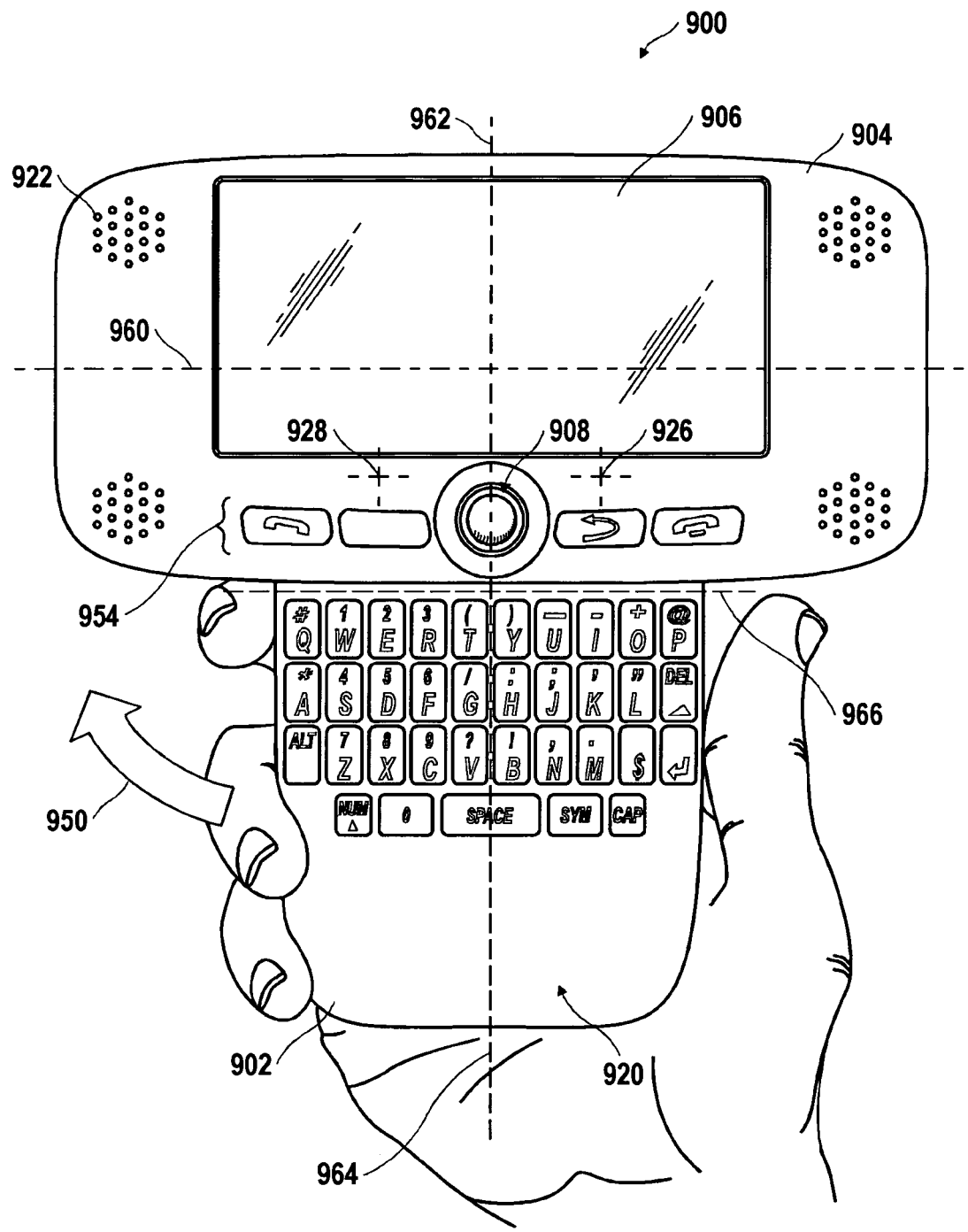
FIG. 36 is another example handheld electronic device oriented in an expanded configuration.

The handheld device 800, as disclosed herein, is transitionable between at least two configurations including a compact configuration (see at least FIGS. 33 and 35) and an expanded configuration (see at least FIGS. 34 and 36). The handheld device 800 comprises a pair of relatively thin, substantially flat, interconnected panels. One panel is configured as a display panel 804 and the other as a keyboard panel 802. In the compact configuration, the elongate display panel 804 is positioned adjacent to and in substantial parallel orientation with an elongate keyboard panel 802. In this context, the referred parallel orientation is relative to central planes generally defined by each of the respective panels. The panels 802 and 804 have a typical thicknesses on the order of five to eighteen millimeters.

As shown, the elongate panels 802 and 804 have a perimeter shape that is generally oblong or rectangular, with rounded-off corners. While the panels 802 and 804 are generally shown as having substantially rectilinearly shaped peripheral sides, the panels 802 and 804 may take other shapes such as dog-bone, hour-glass, FIG. 8, and bowtie. A common feature of these example shapes is that they are elongate. That is, a length-wise measured dimension of the device is greater than a perpendicular width-wise measured dimension. Additionally, the panels can be of other shapes as desired by the operator or designer of the handheld device 800. These additional shapes, as long as elongate as defined above, include triangles, diamonds, parallelograms, octagons, ovals and other suitable shapes according to the device application requirements.

In one embodiment, the two panels are coupled together by a rotary connection 826 which is diagrammatically represented in FIGS. 33-36. In one example, the rotary connection 826 allows the display panel 804 to rotate from a first closed position to a second open position. In the open position, text entry is further facilitated through the exposure of a keyboard 820 on the keyboard panel 802. Other examples are provided hereinbelow of additional possible connection mechanisms. The rotary connection 826 interconnects with the keyboard panel 802 in an upper quadrant area of a front face of the keyboard panel 802. In this context, the terminology of upper quadrant area is employed to denote that the location, relative the front face of the keyboard panel 802, is in a top quarter thereof.

When the device 800 is configured in the compact configuration as illustrated in FIG. 33, the interconnection point (coincident with the axis of rotation 830 of the rotary connection 826) between the rotary connection 826 and keyboard panel 802 is at a lateral distance to the side of the vertical centerline 864 (see FIG. 34) of the front face of the keyboard panel 802. Further, the interconnection point is located above the horizontal centerline of the keyboard panel 866 when the device 800 is held such that the lengthwise axis is the vertical axis of the device 800. The interconnection point can be located in either of the left or right upper quadrants. Depending on the location of the interconnection point, clockwise or counter-clockwise rotation of the display panel 804 relative to the keyboard panel 802 is enabled. For example, if the rotary connection 826 is located in the right-hand upper quadrant of the keyboard panel 802 as depicted in FIGS. 33-34, clockwise rotation of the display panel 804 is enabled for transitioning the device from the compact or closed configuration shown in FIG. 33 to the expanded or open configuration shown in FIG. 34. It is contemplated that a stop can be utilized to prevent counterclockwise rotation of the display panel 804 from the closed orientation in the embodiment of FIG. 33.

Furthermore, the rotary connection 826 maintains the display panel 804 and keyboard panel 802 in parallel orientation (with respect to the panels' central planes) to one another during rotation of the panels (802, 804) from the compact configuration to the expanded configuration. That is to say, the panels 802 and 804 move in substantially parallel planes when rotated from the compact configuration to the expanded configuration.

The device 800 can be enabled to assume and to operate in a telephone mode when the device is oriented in the compact configuration. Similarly, the device 800 can be enabled to assume and to operate in a text messaging mode (SMS, MMS and emailing for examples) when the device 800 is oriented in the expanded configuration. While this mode pairing is especially suited to the respective configurations, it is not exclusive and it is contemplated that the device 800 can be used to make telephone calls while the expanded configuration is instituted and text messaging can also be conducted when the device 800 is in the expanded configuration. In at least one embodiment, the operation of the device 800 is switched from the telephone mode to the text messaging mode upon transition from the compact configuration to the expanded configuration.

The display panel 804 comprises a display screen 806 having a length that is greater than its width. The elongate display panel 804 has a lengthwise oriented centerline that is coincident with a lengthwise oriented centerline 860 of the display screen 806 in the embodiment of FIGS. 33 and 34. When the elongate display panel 804 is configured in an expanded configuration, the lengthwise oriented centerline 860 of the display screen 806 is horizontally oriented. Thus, in the expanded orientation, the display panel 804 is configured such that it is arranged so that the longest side of the display screen 806 is oriented horizontally. As can be readily appreciated from the expanded configuration of FIG. 34, this produces a widescreen viewing configuration of the device 800 highly suited for text-messaging, including emailing, video watching and the like.

In the compact configuration shown in FIG. 33, the elongate display panel 804 is overlaid in substantial registration with the elongate keyboard panel 802. Thus, the display panel 804 is oriented so that its longer side is oriented in the vertical orientation for the compact configuration and in the horizontal orientation for the expanded configuration as shown in FIG. 34. When the keyboard panel 802 and display panel 804 are oriented in the compact configuration, the display panel 804 is positioned such that it is substantially aligned with the dimensions of the keyboard panel 802. If an expanded configuration is desired by the operator, the display panel 804 is rotated with respect to the keyboard panel 802. In this expanded configuration, the display panel 804 has been rotated predominantly out of registration with the elongate keyboard panel 802.

As earlier described, the rotary connection is located in the upper right hand quadrant area of the front-face of the keyboard panel in FIGS. 33 and 34. While this location is illustrated in FIGS. 33 and 34, other locations as presented below are possible as well. The display screen 806 and display panel 804 each have lengths greater than their widths and share a lengthwise center line 860 and a widthwise centerline 862 as depicted in FIG. 33. When an operator holds a handheld device 800 that is configured to the compact configuration, with the lengthwise centerline 860 vertically oriented, out ahead of himself, the display screen 806 of the device 800 is conducive to placing telephone calls. Furthermore, navigation is enabled using the trackball 808 or other similar navigation device. At least two keys 852 are provided on the front face of the display panel 804 as well.

If the operator wishes to switch from the compact configuration to the expanded configuration, the thumb is used to press upon the display panel 804 in a location similar to that indicated in FIG. 33. When sufficient pressure is applied, the display panel 804 rotates in the direction shown by arrow 850 relative to the underlying keyboard panel 802 about the axis of rotation 830. While the display panel of FIG. 33 completely conceals the keyboard panel 802 from front view, other embodiments can permit a portion of the keyboard panel to be visible in the compact configuration such as is illustrated in FIG. 4. Additionally, the compact configuration is described herein as having the lengthwise centerline 860 of the display screen 806 vertically oriented, but in other embodiments the lengthwise centerline 860 can be otherwise oriented, even horizontally.

Once the display panel 804 is rotated such that it is in an expanded configuration as shown in FIG. 34, additional keys of a keyboard 820 are exposed on the keyboard panel 802. In the depicted expanded configuration, the lengthwise centerline 860 of the display panel 804 is now oriented in a horizontal direction. The lengthwise centerline 864 of the keyboard panel 802 and the widthwise centerline 862 of the display panel 804 can be aligned in one embodiment such as the one shown in FIG. 34. Furthermore, the lengthwise centerline 860 of the display panel 804 is oriented such that it is substantially parallel to the widthwise centerline 866 of the keyboard panel 804.

The alternatively configurable nature of the paired panels 802 and 804 advantageously enables the handheld device 800 to assume substantially different shapes between the compact and expanded configurations. In the compact configuration, the handheld device 800 has a substantially oblong front-facing profile. As shown in FIG. 33, the oblong profile is such that it resembles a rectangle with rounded or beveled corners and arched, nearly straight, edges. In other embodiments, the device 800 has an elongate front-facing profile in the compact configuration. The elongate profile can take on a variety of different shapes such that a vertical length of the device 800 is greater than a horizontal width of the device 800 in the compact configuration. As described before, this elongate profile can take the form of a dog bone, hour-glass, FIG. 8, bowtie, diamond, triangle, or other suitable shape.

When the display panel 804 is rotated to the expanded configuration from the compact configuration, the handheld device 800 has a generally T-shaped front-facing profile. This T-shaped profile can be an upside down (inverted or bottom-crossed) T-shape or right-side up (top-crossed) T-shape, as shown in FIGS. 5 and 34, respectively.

In the expanded configuration, the exposed keyboard 820 facilitates the typing of text messages. As shown in FIG. 34, the operator can hold the expanded device 800 in one hand and can use the thumb of that same hand to actuate the keys of the keyboard 820 on the keyboard panel 802. A navigation row is shown above the keyboard 820 that facilitates operator navigation on the display screen 806 of the device 800. The navigation keys can include a select key, call key, end key, cancel key, menu key, escape/back key, and a navigational tool that enables the operator to direct on screen cursor navigation. The navigation keys typified as trackball 808 and input keys 852, can also be located on the front face of the display panel 804 as shown in FIG. 33. Additional keys can be provided on the display panel 804 as well. Furthermore, while the navigation keys have been described as arranged in a row, other possible arrangements are considered within the scope of the present disclosure.

As described above, in order to allow the elongate display panel 804 to transition from the compact configuration to the expanded configuration, the rotary connection 826 must be appropriately located and configured to limit/allow appropriate movement of the respective panels. The location of the rotary connection 826 can be described relative to quadrant areas of the respective panels. In one embodiment, the rotary connection interconnects the keyboard panel 802 to the display panel 804 in an upper left-hand quadrant area of the front face of the keyboard panel 802. The upper left-hand quadrant area refers to the area of the keyboard panel 802 bounded by the horizontal 866 and vertical centerlines 864 at the bottom and right sides of the quadrant, respectively. It is also bounded by the left and top sides of the device 800. When located in the upper left-hand quadrant area, it is preferable to have the rotary connection 826 limit the display panel 804 to counter-clockwise rotation relative to the keyboard panel 802 when transitioning the handheld device 800 from the compact configuration to the expanded configuration.

Alternatively, the rotary connection 826 can interconnect the keyboard panel 802 in an upper right-hand quadrant area of the front face of the keyboard panel 802. The upper right-hand quadrant area refers to the area of the keyboard panel 802 bounded by the horizontal 866 and vertical centerlines 864, on the bottom and left sides, respectively. It is also bounded by the right and top sides of the device 800. When located in the upper right-hand quadrant area, it is preferable to have the rotary connection 826 limit the display panel 804 to clockwise rotation relative to the keyboard panel 802 when transitioning the handheld device 800 from the compact configuration to the expanded configuration. Furthermore, the rotary connection 826 can be configured to limit the display panel 804 to a single-direction of rotation relative to the keyboard panel 802 when transitioning the device 800 from the compact configuration to the expanded configuration. While this is described as single-direction rotation, it is only single-direction in the sense that opposite direction rotation from the compact configuration is prohibited. Furthermore, opposite direction rotation is allowed to transition the handheld device 800 from the expanded configuration to the compact configuration.

Additionally, the relation of the keyboard panel 802 and display panel 804 can be described relative to further alternative embodiments. For example, the keyboard panel 802 can be configured such that keyboard 820 is located on the front-face of the keyboard panel 802 and is at least partially, but not necessarily entirely obscured from the view in the compact configuration. However, in the expanded configuration the keyboard 820 is entirely exposed. When the keyboard 820 is entirely exposed, it enables the operator of the handheld device 800 to fully utilize all keys and input devices provided on the handheld device 800. In some embodiments, the keyboard 820 is completely obscured from view, such as the one shown in FIG. 33. Furthermore, the lengthwise oriented centerline 860 of the display panel 804 and/or display screen 806 is vertically oriented in the compact configuration. Thus, the display panel 804 is oriented such that the longer side of the display panel 804 is oriented in a vertical fashion in the compact orientation.

The rotary connection 826 has been generally described above as a single point of rotation interconnecting the display panel 804 and keyboard panel 802, however a plurality of rotary connections can be provided such that the display panel 804 is enabled to be selectively rotated about the several rotary connection points, but only one at a time. For example as shown in FIG. 35, two rotary connections 925, 927 are depicted relative a back and side view of the device 900. The rotary connections 925, 927 allow the display panel 904 to rotate about either of the respective axis 926, 928. Each of the rotary connections 925, 927 are located in a respective upper quadrant area on the front face of the keyboard panel 902. For example, a right rotary connection 927 is located in the upper right quadrant area on the front face of the keyboard panel 902 and a left rotary connection 925 is located in an upper left quadrant area on the front face of the keyboard panel 902. The right rotary connection 927 and left rotary connection 925 are located at a distance away from a vertical centerline 964 of the front face of the keyboard panel 902.

As before, the right connection 927 and left connection 925 enable relative rotation between the display panel 904 and keyboard panel 902 while maintaining the panels 902, 904 in parallel orientation to one another through out the relative rotation that occurs during transition from the compact configuration to the expanded configuration. The utilization of one or the other of the provided rotary connections, such as the right connection 927 and left connection 925, can be operator selected. While this portion of the description focuses on the implementation and utilization of a pair of rotary connections, in other embodiments more than two connections are provided on the handheld device 900. The selection of the particular rotary connection to be utilized can be made by the direction the display panel 904 is urged out of the compact configuration. It is also contemplated that other modes of activation or selection of the desired rotary connection can also be utilized.

When the device 900 of FIGS. 35 and 36 is oriented in the expanded configuration (FIG. 36), the display screen 906 is above and wider than the alphabetic, text-entry keyboard 920 on the front face of the elongate keyboard panel 902. When the device 900 is oriented such that it is in a compact configuration, the keyboard 920 is obscured from view and exposed in the expanded configuration. The keyboard 920 of FIG. 36 is a full alphabetic keyboard that is exposed in its entirety when the device 900 is in the expanded configuration. The keyboard 920 is referred to as being a full keyboard in that each alphabetic key has only a single alphabetic letter associated therewith. The keyboard 920 as shown in FIG. 36 has other characters and numbers associated with the keys as well. These other characters and numbers may be arranged such that two characters (including letters, numbers) are arranged on a single key. When the device 800 shown in FIG. 34 is in the expanded configuration, the keyboard 820 is that of a reduced alphabetic keyboard such that more than one letter is provided on a single key. Additionally the keyboard 820 can have other numbers and characters associated therewith. While the layout of the alphabetic letters is shown in the figures as being a QWERTY arrangement, other known arrangements of the letters are also possible such as QWERTZ, AZERTY, and Dvorak arrangements.

The embodiments described above relative to FIGS. 33-36 utilize rotary connections to enable transition between the compact and expanded device configurations. Therein, rotation of a display panel with respect to a keyboard panel is addressed. The present disclosure also contemplates the utilization of an interconnection between panels that accommodates rotation and translation of the elongate display panel relative the elongate keyboard panel as depicted in FIGS. 37-40. As before, when the handheld device is configured in the compact configuration, the elongate display panel is positioned adjacent to and in substantial parallel orientation with the elongate keyboard panel. The interconnection is configured to maintain the display panel and keyboard panel in a substantially parallel orientation to one another through out the transition between the compact and expanded configurations. The interconnection is configured such that the display panel which is mounted above the keyboard panel is capable of being translated in relation to the keyboard panel, as well as being rotated with respect to the keyboard panel.

Figure 40:
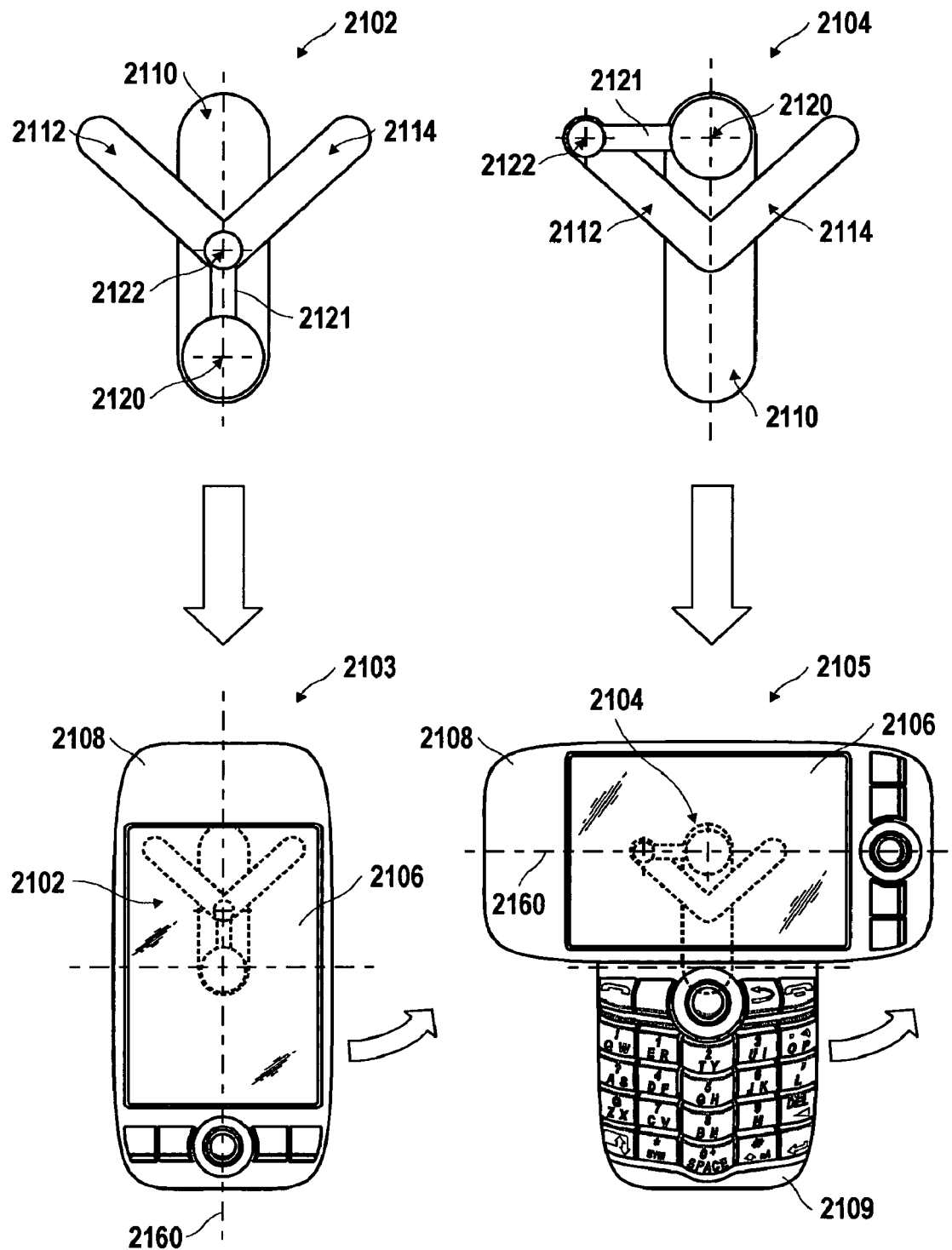
FIG. 40 illustrates an example handheld device in compact and expanded configurations and the corresponding orientations of the interconnections for the compact and expanded configurations.

An example of the transition from the compact configuration 2103 to the expanded configuration 2105 is shown in FIG. 40. When the device is oriented in the compact configuration 2103 (left-hand illustrations), the elongate display 2108 is overlaid in substantial registration with the elongate keyboard panel 2019. When the device is oriented in the expanded configuration 2105 (right-hand illustrations), the elongate display panel 2108 is rotated predominately out of registration with the elongate keyboard panel 2109. As shown in FIG. 40, it can be seen that the device has an oblong front-facing profile in the compact configuration 2103. The lengthwise oriented centerline 2160 of the display screen is vertically oriented in the compact configuration 2103.

Figure 37:
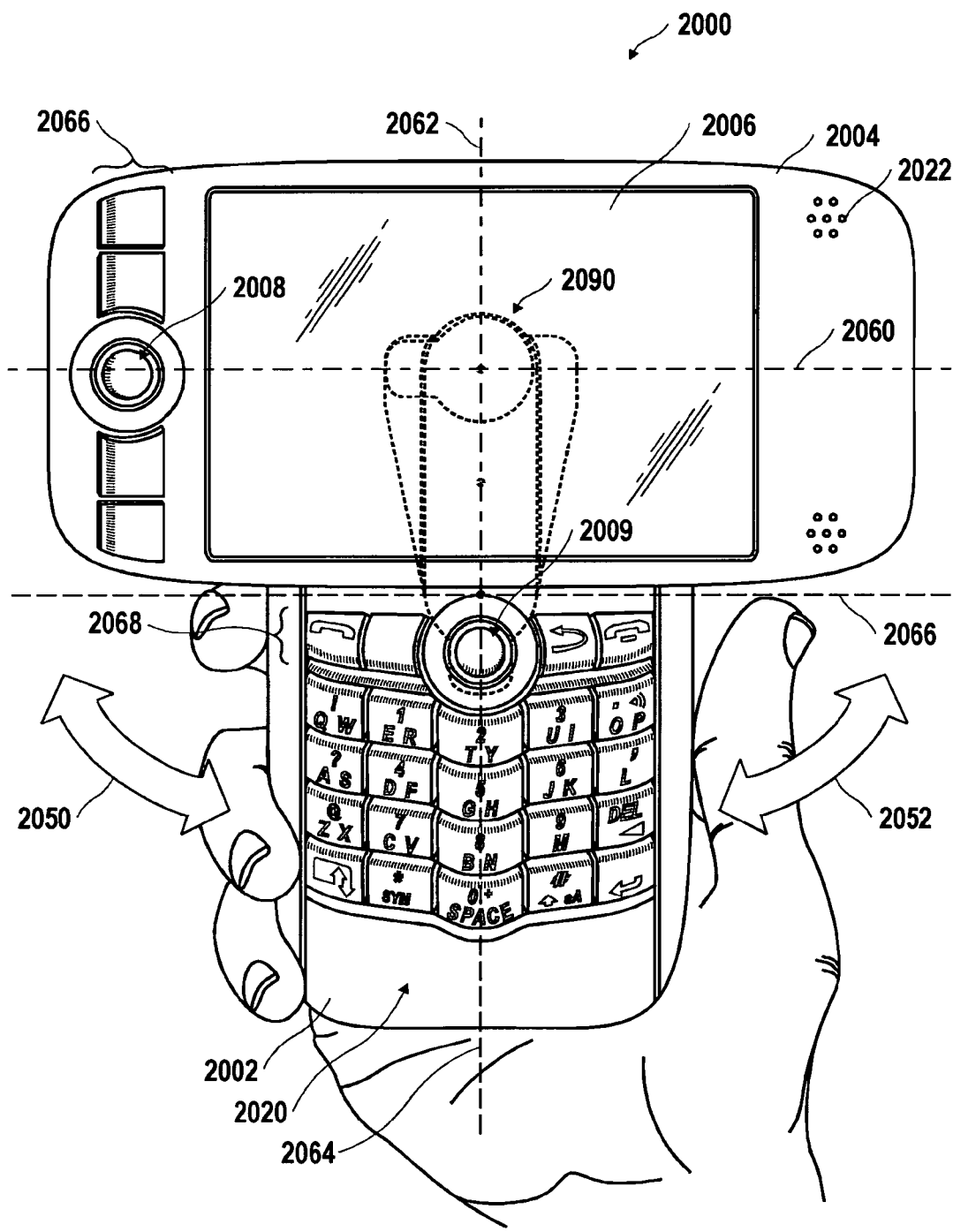
FIG. 37 is yet another example handheld electronic device oriented in an expanded configuration.

Further aspects of the relationships between the display panel and keyboard panel can be understood in relation to FIG. 37 which illustrates the device 2000 in its expanded configuration. An alphabetic text-entry keyboard 2020 is located on a lower portion of the front-face of the keyboard panel 2002. The alphabetic text-entry keyboard 2020 is at least partially obscured from view when the device is oriented in the compact configuration. When the device is oriented in the expanded configuration as shown in FIG. 37, the alphabetic text-entry keyboard 2020 is entirely exposed. As shown in FIG. 40, the alphabetic text-entry keyboard is entirely obscured from view in the compact configuration 2103 and is entirely exposed in the expanded configuration 2105.

When the device is oriented in the expanded configuration as shown in FIG. 37, the display screen 2006 is located above the alphabetic text-entry keyboard 2020. The display screen 2006 in this expanded configuration is also wider than the alphabetic text-entry keyboard 2020. As described above, this expanded orientation facilitates the operator inputting text data into the handheld device 2000. As shown, the lower portion of the front-face of the keyboard panel 2002 is single-handedly graspable by the operator of the device. The alphabetic text-entry keyboard 2020 located on the keyboard panel 2002 is configured to be single-handedly operable. The operator can use thumb typing for inputting text to the device 2000 using the same hand in which the device 2000 is grasped and held.

As illustrated in FIG. 40, the handheld device has an elongate front-facing profile in the compact configuration 2103 (left-hand side) and a generally top-crossed T-shaped front-facing profile in the expanded configuration 2105 (right-hand side). The elongate display panel 2108 includes a display screen 2106 that has a length that is greater than its width. Likewise, in at least one embodiment, the display panel 2108 also has a length that is greater than its width. The display screen 2106 and display panel 2108 have a lengthwise oriented centerline 2160. In at least one embodiment, the lengthwise oriented centerline 2160 of the display screen 2106 and display panel 2108 are aligned. In other embodiments, the lengthwise oriented centerline of the display screen 2106 is not aligned but substantially parallel with the lengthwise oriented centerline of the display panel 2108.

When the display panel 2004 is provided with such an interconnection 2090 as described in relation to the device 2000 shown in FIG. 37, the display panel 2004 is capable of translating (sliding) linearly in a motion that is parallel to the centerline 2064 of the keyboard panel 2002. (This relative translational motion between the constituent panels of the device is not directly illustrated in the figures.) When the handheld device 2000 is held such that the lengthwise centerline 2064 of the keyboard panel 2002 is vertically oriented, the translation of the display panel 2004 in relation to the keyboard panel 2002 is in an upward motion. This exposes the keyboard 2020 which is at least partially obscured by the display panel 2004 in the compact configuration. When the display panel 2004 only engages in translation, the lengthwise centerlines (2060, 2064) of both the display panel 2004 and keyboard panel 2002 remain substantially parallel to each other.

Figure 38:
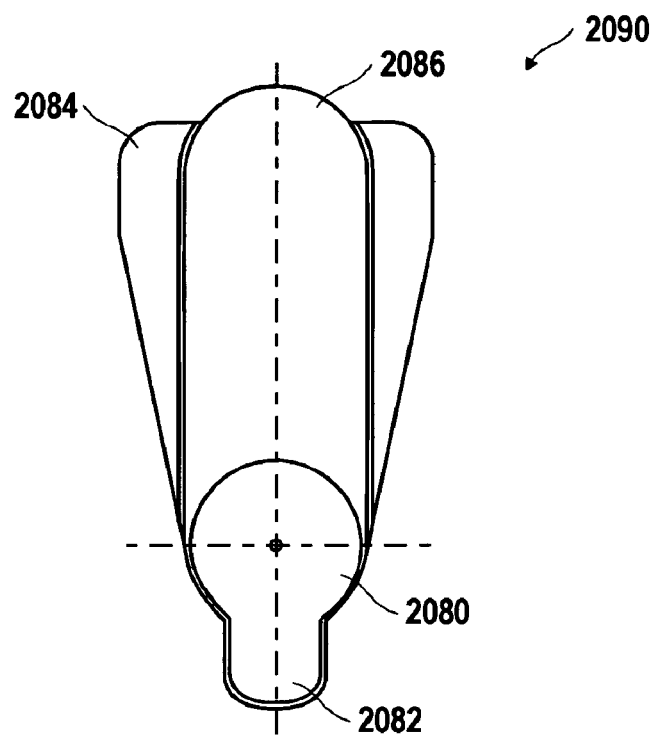
FIG. 38 is an example of an interconnection configured such that the corresponding device will be in a compact configuration.
Figure 39:
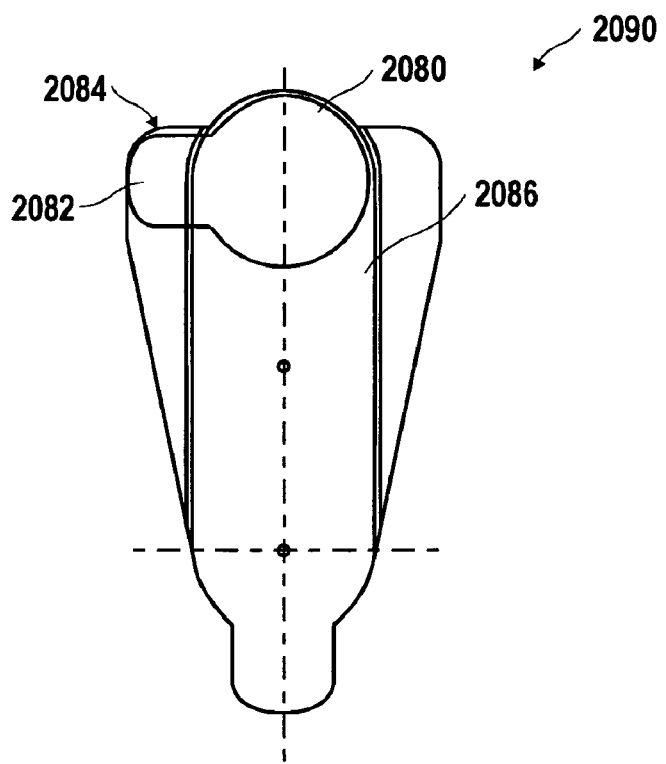
FIG. 39 is an example of an interconnection configured such that the corresponding device will be in an expanded configuration.

Several different embodiments of the translation and rotation interconnection are presented below and described in relation to FIGS. 37-40. In at least the embodiment illustrated in FIGS. 37-39, an elongate track 2086 is associated with either one of the display panel 2004 or the keyboard panel 2002. The interconnection 2090 is illustrated in phantom lines in FIG. 37 since it is obscured from view. Detailed embodiments of the interconnection 2090 are illustrated in FIGS. 38 and 39. In FIG. 38, the interconnection 2090 is shown as it would be oriented if the device were in the compact configuration. In FIG. 39, the interconnection 2090 is shown as it would be oriented if the device was in an expanded configuration. Additionally, a key 2080 is located on the panel 2002, 2004 that does not have the track 2086 associated therewith. Thus, if the keyboard panel 2002 is provided with the track 2086, the display panel 2004 will be equipped with the key 2080.

The key 2080 has an insert portion that is restrained within the track 2086. In one embodiment, the insert portion of the key 2080 is horizontally restrained. The insert portion of the key 2080 can be permitted to vertically translate within the track 2086. Vertical translation within the track 2086 refers to the ability of the insert portion of the key 2080 to travel along a path substantially parallel to a lengthwise centerline 2064 of the keyboard panel 2002,1 if the track is provided in the keyboard panel 2002. (As described herein, the track is presented as being located on the keyboard panel 2002, but in other embodiments the track can be located on the display panel 2004.) Alternatively, the insert portion can be described as being permitted to translate longitudinally within the track 2086. In this case, the insert portion is permitted to move in a direction that the insert portion traverses along the long axis of the track 2086, and which can correspond to the lengthwise centerline 2064 of the keyboard panel 2002.

The track 2086 and the corresponding key 2080 are constructed such that they cooperate with one another to allow the motion of the display panel 2004 in relation to the keyboard panel 2002. In one embodiment, the track 2086 is vertically oriented and parallel to the lengthwise oriented centerline 2060 of the elongate display panel 2004 when the display panel 2004 is in the compact configuration (not shown). Furthermore, the track 2086 can be arranged such that it is widthwise centered with respect to the elongate front-facing profile of the device 2000 in the compact configuration. When the device 2000 is oriented such that it is in the expanded configuration, the track 2086 is widthwise centered with respect to the T-shaped front-facing profile of the device 2000.

In order for the key 2086 to further cooperate and move within the track 2086 in a restrained fashion, it is equipped with features as presented below. The insert portion of the key 2080 can have a periphery that is at least partially rounded and laterally bounded by internal sides of the track 2086. Thus, the key 2080 is capable of being rotated relative to the track 2086 about an axis of rotation of the key 2086. In order to restrict the motion of the panels, the key 2080 is provided with a stop portion 2082 that transversely extends relative to the axis of rotation of the key 2080. The panel, for instance the keyboard panel 2002, in which the track 2086 is located has a stop receiving space 2084 which has a delimiter surface against which the stop portion 2082 abuts when the elongate display panel 2004 reaches a horizontal orientation relative to a vertically oriented keyboard panel 2002 upon transition from the compact configuration to the expanded configuration. Furthermore, the panel with the track 2086 can be provided with a latching mechanism (not shown) that is configured to releasably engage the key 2080 once the elongate display panel 2004 reaches the horizontal orientation relative to the vertically oriented keyboard panel 2002. The latching mechanism maintains the horizontal orientation of the display panel 2004 relative to the vertically oriented keyboard panel 2002. When the display panel 2004 is latched into place, it prevents the display 2006 from rotating while the operator of the device 2000 operates the device 2000 during text entry. In at least one embodiment, the latch can be released by the operator supplying a predetermined amount of force to the keyboard panel 2002 and the display panel 2004 such that the latch releases its engagement. In a device 2000 configured to rotate both clockwise and counterclockwise, as signified by arrows 2050 and 2052, from the compact configuration to the expanded configuration, a pair of stop receiving spaces are provided on the panel with which the elongate track 2086 is associated. Each of the stop receiving spaces has a delimiter surface against which the stop portion abuts when the elongate display panel 2004 reaches a horizontal orientation relative to the vertically oriented keyboard panel 2002 upon transition from the compact configuration to the expanded configuration.

In yet another embodiment, as illustrated in FIG. 40, the elongated track 2110 and key 2120 are arranged differently. The key 2120 includes a track follower 2122 located at a distance from the axis of rotation of the key. The track follower 2122 can be offset from the key 2120 by a connecting member 2121. The panel with which the elongated track 2110 is associated further includes a follower-receiving track, such as follower-receiving tracks 2112 and 2114, each of which is oriented at an outwardly directed incline relative to the elongate track 2110. While two follower-receiving tracks 2112 and 2114 are illustrated, in certain embodiments only one of the tracks 2112 or 2114 is provided. When the device is transitioned from the compact configuration 2103 to the expanded configuration 2105, the follower-receiving track terminates in a delimiter surface against which the track follower 2122 abuts when the display panel 2108 reaches a horizontal orientation relative to the vertically oriented keyboard panel, as illustrated in the lower right corner of FIG. 40. Furthermore, it is contemplated that a latching mechanism (not shown) is to be provided and which is configured to releasably engage the track follower 2122 once the display panel reaches this horizontal orientation. Thus, the latching mechanism maintains the display panel 2108 in this orientation until the operator of the device releases its engagement. The engagement of the latching mechanism may simply require operator force input or pressing a release button.

In a device equipped to allow rotation of the display panel in a clockwise and counterclockwise direction from the compact configuration to the expanded configuration, a pair of follower-receiving tracks 2112, 2114 can be provided. The follower-receiving tracks 2112, 2114 are associated with the panel with which the elongate track 2110 is associated. The pair of follower-receiving tracks 2112, 2114 are oriented at an outwardly directed incline relative to the elongate track 2110 and located opposite one another relative to the elongate track 2110. In one embodiment, the pair of follower-receiving tracks 2112, 2114 are mirrored about the elongate track. Each of the pair of follower-receiving tracks 2112, 2114 terminates in a delimiter surface. The track follower 2122 abuts the delimiter surface when the display panel 2108 is in the expanded configuration 2105 with respect to the keyboard panel 2109.

Furthermore, the particular orientations of the key 2120 and track follower 2122 can be further understood by reviewing FIG. 40 in its totality. As illustrated in the top right corner of FIG. 40, the interconnection 2102 is oriented according to the compact configuration 2103, as shown in the bottom left corner of FIG. 40. Likewise, the configuration of the interconnection 2104 is that of an expanded configuration 2105 of the device.

Additional input devices are exemplified with respect to FIG. 37. The device is equipped with two sets of navigation rows 2068 and 2066. The navigation row 2066 enables the operator of the device to navigate when the device is in the compact configuration and the keyboard panel is completely obscured from view. The navigation row 2066 features a trackball navigation tool 2008, which can be other types of navigation tools, and four buttons that can be programmed according to operator or designer need. Similarly, the navigation row 2068 is provided such that it is only viewable by the operator when the device 2000 is oriented in the expanded configuration. This navigation row 2068 also features a trackball navigation tool and four buttons. Additionally, speakers 2022 are illustrated on the display panel 2004. These speakers 2022 are capable of playing audio files as well as being used as speakers for the telephone functionality of the device 2000.

Figure 41:
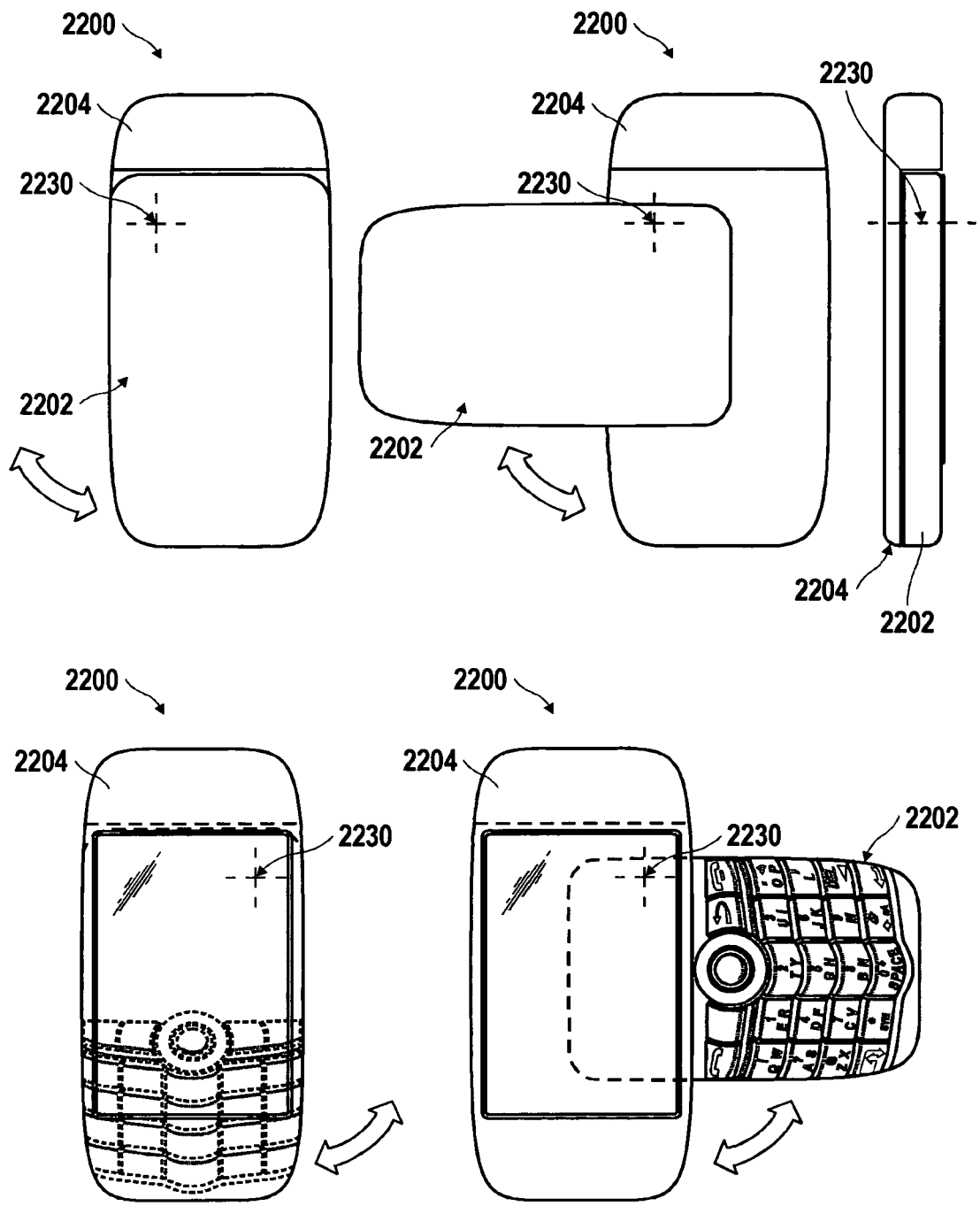
FIG. 41 illustrates yet another example handheld device configured in compact and expanded configurations.

In yet another embodiment, a handheld device 2220 is provided with a keyboard panel 2202 that is rotatably connected to a display panel 2204 as illustrated in FIG. 41. As illustrated, the keyboard panel 2202 does not run the entire length of the display panel 2204. The keyboard panel rotates about an axis 2230. When the handheld device 2200 is oriented in a compact configuration as illustrated on the right hand side of FIG. 41, the keyboard panel 2002 is entirely obscured from view. However, it is possible to locate the axis of rotation 2230 such that a portion of the keyboard panel 2002 is exposed when the handheld device 2000 is in the compact configuration. When the device is oriented in the expanded configuration, the keyboard panel 2202 with a keyboard is exposed to the operator for data entry as an example. The device 2200 may be equipped with software as described herein that is capable of determining the configuration of the device and running a corresponding application software that has been predetermined.

The term substantially, as used herein, is a term of approximation. The term size as used in reference to the visual output of the display screen encompasses the aspect ratio of the visual output.

While various features of the claimed invention are presented above, it should be understood that the features may be used singly or in any combination thereof. Therefore, the claimed invention is not to be limited to only the specific examples depicted herein. The scope of the present invention is accordingly defined as set forth in the appended claims.

The invention claimed is:

1. A handheld electronic communication device transitionable between compact and expanded configurations, said device comprising:
   an elongate display panel positioned adjacent to and in substantial parallel orientation with an elongate keyboard panel when the device is configured in the compact configuration, said display panel and keyboard panel being coupled together by a rotation and translation accommodating interconnection, said interconnection configured to maintain said panels in parallel orientation to one another through out transition between the compact and expanded configurations, and further comprising an elongate track associated with one of said display and keyboard panels and a key associated with the other of said display and keyboard panels, said key having an insert portion restrained within said track and which is permitted to translate longitudinally within said track;
   said device having an elongate front-facing profile in the compact configuration and a generally top-crossed T-shaped front-facing profile in the expanded configuration; and
   said elongate display panel comprising a display screen having a greater length than width and a lengthwise oriented centerline, said lengthwise oriented centerline being horizontally oriented when said device is configured in the expanded configuration whereby said elongate display panel forms a top-cross portion of said T-shaped front-facing profile in the expanded configuration.

2. The handheld electronic communication device as recited in claim 1, wherein said track is vertically oriented and parallel to the lengthwise oriented centerline of said elongate display panel in the compact configuration.

3. The handheld electronic communication device as recited in claim 2, wherein said track is widthwise centered with respect the elongate front-facing profile of said device in the compact configuration.

4. The handheld electronic communication device as recited in claim 3, wherein said track is widthwise centered with respect the T-shaped front-facing profile of said device in the expanded configuration.

5. The handheld electronic communication device as recited in claim 1, said key further comprising:
   said insert portion having a periphery that is at least partially rounded and that is laterally bounded by internal sides of said track thereby facilitating rotation of said key relative to said track about an axis of rotation of said key.

6. The handheld electronic communication device as recited in claim 1, wherein said elongate display panel is overlaid in substantial registration with said elongate keyboard panel in the compact configuration and said elongate display panel is rotated predominantly out of registration with said elongate keyboard panel in the expanded configuration.

7. The handheld electronic communication device as recited in claim 1, wherein said device has an oblong front-facing profile in the compact configuration.

8. The handheld electronic communication device as recited in claim 1, further comprising an alphabetic text-entry keyboard located on a lower portion of a front-face of said keyboard panel, said alphabetic text-entry keyboard being at least partially obscured from view in the compact configuration and being entirely exposed in said expanded configuration.

9. The handheld electronic communication device as recited in claim 8, wherein said display screen is above and wider than the alphabetic text-entry keyboard in the expanded configuration.

10. The handheld electronic communication device as recited in claim 9, wherein said alphabetic, text-entry keyboard is entirely obscured from view in the compact configuration and is entirely exposed to view in the expanded configuration.

11. The handheld electronic communication device as recited in claim 8, wherein the lower portion of the front-face of the keyboard panel where the alphabetic text-entry keyboard is located is single-handedly graspable by an operator of the device in the expanded configuration and said alphabetic text-entry keyboard is configured to be single-handedly operable utilizing thumb typing for inputting text to the device using the same hand in which the device is grasped.

12. The handheld electronic communication device as recited in claim 1, wherein said lengthwise oriented centerline of said display screen is vertically oriented in the compact configuration.

13. The handheld electronic communication device as recited in claim 1, said key further comprising a track follower located at a distance from said axis of rotation of said key.

14. The handheld electronic communication device as recited in claim 13, further comprising a follower-receiving track associated with said panel with which said elongate track is associated, said follower-receiving track being oriented at an outwardly directed incline relative to said elongate track.

15. The handheld electronic communication device as recited in claim 14, wherein said follower-receiving track terminates in a delimiter surface against which said track follower abuts when said elongate display panel reaches a horizontal orientation relative to a vertically oriented keyboard panel upon transition from the compact configuration to the expanded configuration.

16. The handheld electronic communication device as recited in claim 15, further comprising a latching mechanism configured to releasably engage said track follower when said elongate display panel reaches the horizontal orientation relative to the vertically oriented keyboard panel and to maintain said orientation between said panels until operator released.

17. The handheld electronic communication device as recited in claim 13, further comprising a pair of follower-receiving tracks associated with said panel with which said elongate track is associated, each of said follower-receiving track being oriented at an outwardly directed incline relative to said elongate track and located opposite one another relative said elongate track.

18. The handheld electronic communication device as recited in claim 17, wherein each of said pair of follower-receiving tracks terminates in a delimiter surface against which said track follower abuts when said elongate display panel reaches a horizontal orientation relative to a vertically oriented keyboard panel upon transition from the compact configuration to the expanded configuration.

19. A handheld electronic communication device transitionable between compact and expanded configurations, said device comprising:
   an elongate display panel positioned adjacent to and in substantial parallel orientation with an elongate keyboard panel when the device is configured in the compact configuration, said display panel and keyboard panel being coupled together by a rotation and translation accommodating interconnection, said interconnection configured to maintain said panels in parallel orientation to one another through out transition between the compact and expanded configurations, and further comprising an elongated track associated with one of said display and keyboard panels and a key associated with the other of said display and keyboard panels, said key having an insert portion restrained within said track and which is permitted to translate longitudinally within said track, and said key further comprising a track follower located at a distance from said axis of rotation of said key;
   said device having an elongate front-facing profile in the compact configuration and a generally top-crossed T-shaped front-facing profile in the expanded configuration; and
   said elongate display panel comprising a display screen having a greater length than width and a lengthwise oriented centerline, said lengthwise oriented centerline being horizontally oriented when said device is configured in the expanded configuration whereby said elongate display panel forms a top-cross portion of said T-shaped front-facing profile in the expanded configuration.

20. The handheld electronic communication device as recited in claim 19, further comprising a follower-receiving track associated with said panel with which said elongate track is associated, said follower-receiving track being oriented at an outwardly directed incline relative to said elongate track.

21. The handheld electronic communication device as recited in claim 20, wherein said follower-receiving track terminates in a delimiter surface against which said track follower abuts when said elongate display panel reaches a horizontal orientation relative to a vertically oriented keyboard panel upon transition from the compact configuration to the expanded configuration.

22. The handheld electronic communication device as recited in claim 21, further comprising a latching mechanism configured to releasably engage said track follower when said elongate display panel reaches the horizontal orientation relative to the vertically oriented keyboard panel and to maintain said orientation between said panels until operator released.

23. The handheld electronic communication device as recited in claim 19, further comprising a pair of follower-receiving tracks associated with said panel with which said elongate track is associated, each of said follower-receiving track being oriented at an outwardly directed incline relative to said elongate track and located opposite one another relative said elongate track.

24. The handheld electronic communication device as recited in claim 23, wherein each of said pair of follower-receiving tracks terminates in a delimiter surface against which said track follower abuts when said elongate display panel reaches a horizontal orientation relative to a vertically oriented keyboard panel upon transition from the compact configuration to the expanded configuration.

\* \* \* \* \*

UNITED STATES PATENT AND TRADEMARK OFFICE
CERTIFICATE OF CORRECTION

PATENT NO. : 8,185,169 B2
APPLICATION NO. : 12/302602
DATED : May 22, 2012
INVENTOR(S) : Jason T. Griffin, Todd Wood and Norman M. Ladouceur It is certified that error appears in the above-identified patent and that said Letters Patent is hereby corrected as shown below:

On the Cover Page

Under Item 30 "Foreign Application Priority Data," please insert the following before the EP priority data:

--May 31, 2006 (US)......................11/421,185
  May 31, 2006 (US)......................11/421,254
  May 31, 2006 (US)......................11/421,272
  May 31, 2006 (US)......................11/421,175--.

On the Cover Page

Under "Foreign Application Priority Data," please delete "2005" and insert --2006-- for EP06114793.

Signed and Sealed this
Ninth Day of October, 2012

David J. Kappos
*Director of the United States Patent and Trademark Office*